(12) United States Patent
Kawata et al.

(10) Patent No.: US 10,755,869 B2
(45) Date of Patent: Aug. 25, 2020

(54) POWER STORAGE DEVICE, LIGHT-EMITTING DEVICE, AND ELECTRONIC DEVICE

(71) Applicant: Semiconductor Energy Laboratory Co., Ltd., Atsugi-shi, Kanagawa-ken (JP)

(72) Inventors: Takuya Kawata, Atsugi (JP); Kei Takahashi, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 769 days.

(21) Appl. No.: 15/049,644

(22) Filed: Feb. 22, 2016

(65) Prior Publication Data

US 2016/0254500 A1 Sep. 1, 2016

(30) Foreign Application Priority Data

Feb. 27, 2015 (JP) .................................. 2015-038094

(51) Int. Cl.
| | |
|---|---|
| H01M 2/02 | (2006.01) |
| H01G 11/78 | (2013.01) |
| H01M 2/10 | (2006.01) |
| H01G 11/82 | (2013.01) |
| G02F 1/1333 | (2006.01) |

(Continued)

(52) U.S. Cl.
CPC ............. *H01G 11/78* (2013.01); *H01G 11/82* (2013.01); *H01M 2/1061* (2013.01); *H01M 2/1094* (2013.01); *G02F 1/133305* (2013.01); *H01M 2/0207* (2013.01); *H01M 2/347* (2013.01); *H01M 2002/0205* (2013.01); *H01M 2220/30* (2013.01); *H02J 7/025* (2013.01); *H02J 50/12* (2016.02)

(58) Field of Classification Search
CPC ..... H01M 2002/0205; H01M 2220/30; H01M 2/0207; H01M 2/1061; H01M 2/1094; H01M 2/347; H02J 50/12; H02J 7/025
See application file for complete search history.

(56) References Cited

U.S. PATENT DOCUMENTS

| | | | |
|---|---|---|---|
| 7,787,097 B2 | 8/2010 | Satoh | |
| 9,713,271 B2 | 7/2017 | Hiroki et al. | |

(Continued)

FOREIGN PATENT DOCUMENTS

| | | |
|---|---|---|
| EP | 1830336 A | 9/2007 |
| JP | 06-267515 | 9/1994 |

(Continued)

*Primary Examiner* — Victoria H Lynch
(74) *Attorney, Agent, or Firm* — Robinson Intellectual Property Law Office; Eric J. Robinson

(57) ABSTRACT

To provide a flexible, highly reliable power storage device or light-emitting device. The device includes a battery unit or a light-emitting unit and a member with rubber elasticity. The battery unit includes a secondary battery. The light-emitting unit includes a light-emitting element. The member with rubber elasticity is provided with a first projection and a second projection. The first projection and the second projection are arranged on a first surface of the battery unit or the light-emitting unit. The first projection and the second projection come in contact with each other when the power storage device is bent such that the first surface of the battery unit faces inward.

18 Claims, 55 Drawing Sheets

(51) Int. Cl.
*H01M 2/34* (2006.01)
*H02J 7/02* (2016.01)
*H02J 50/12* (2016.01)

(56) References Cited

U.S. PATENT DOCUMENTS

| | | |
|---|---|---|
| 10,096,803 B2 | 10/2018 | Iseri et al. |
| 2012/0307423 A1 | 12/2012 | Bohn et al. |
| 2013/0101884 A1* | 4/2013 | Ueda .................. H01M 10/052 |
| | | 429/127 |
| 2013/0154556 A1* | 6/2013 | Takahashi ................ G05F 3/08 |
| | | 320/108 |
| 2013/0224562 A1 | 8/2013 | Momo |
| 2013/0299789 A1 | 11/2013 | Yamazaki et al. |
| 2015/0155528 A1 | 6/2015 | Takahashi et al. |
| 2015/0349375 A1 | 12/2015 | Takahashi et al. |
| 2017/0347471 A1 | 11/2017 | Hiroki et al. |

FOREIGN PATENT DOCUMENTS

| | | |
|---|---|---|
| JP | 2000-173559 | 6/2000 |
| JP | 2004-199994 A | 7/2004 |
| JP | 2012-035864 A | 2/2012 |
| JP | 2012-043732 A | 3/2012 |
| JP | 2013-161691 A | 8/2013 |
| JP | 2013-211262 | 10/2013 |
| JP | 2014-197522 | 10/2014 |
| JP | 2015-038868 A | 2/2015 |
| JP | 2016-157549 A | 9/2016 |
| WO | WO-2006/090434 | 8/2006 |
| WO | WO-2015/008716 | 1/2015 |

* cited by examiner

FIG. 1A
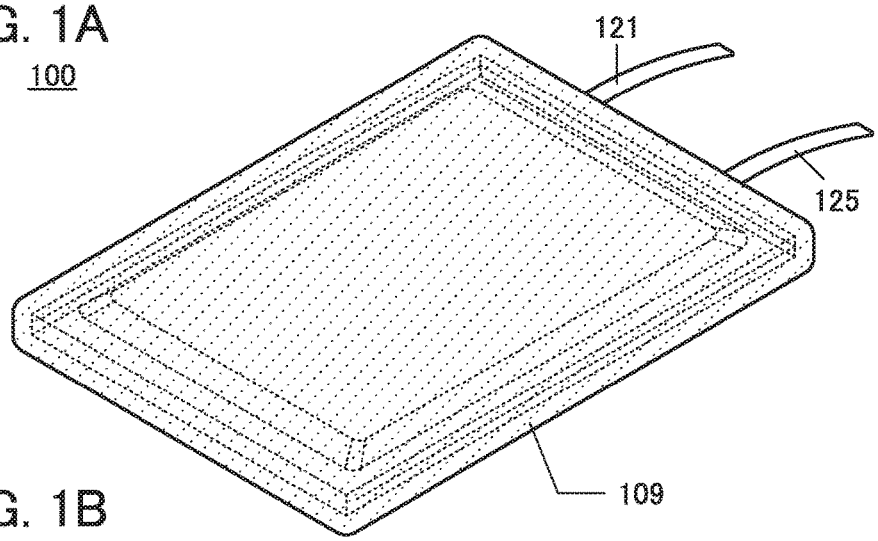
FIG. 1B
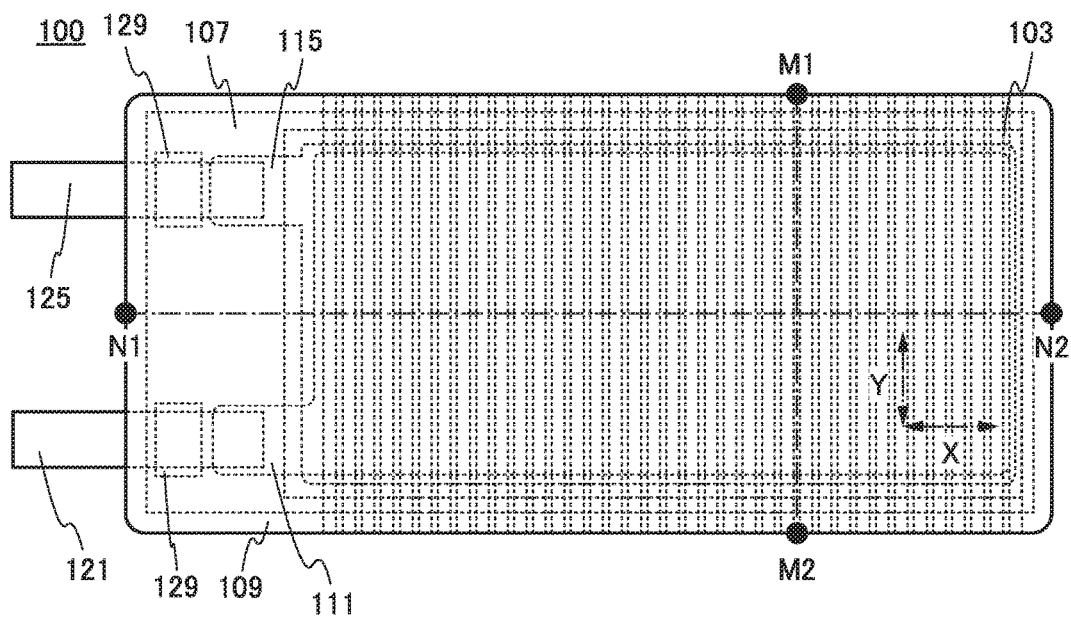
FIG. 1C
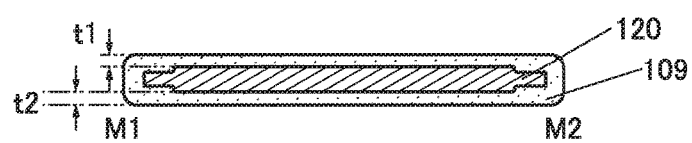
FIG. 1D

FIG. 22A
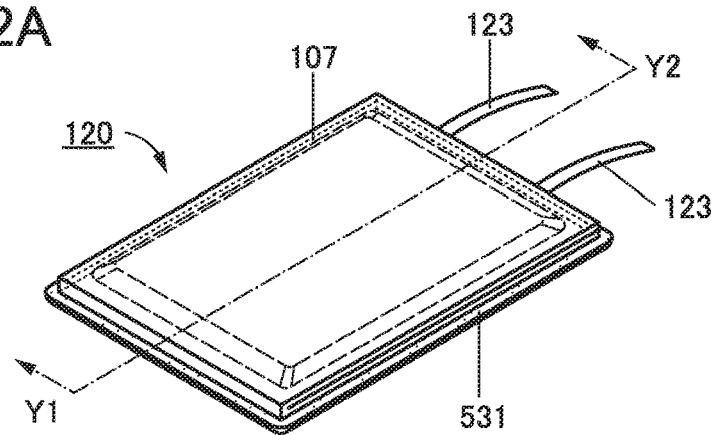
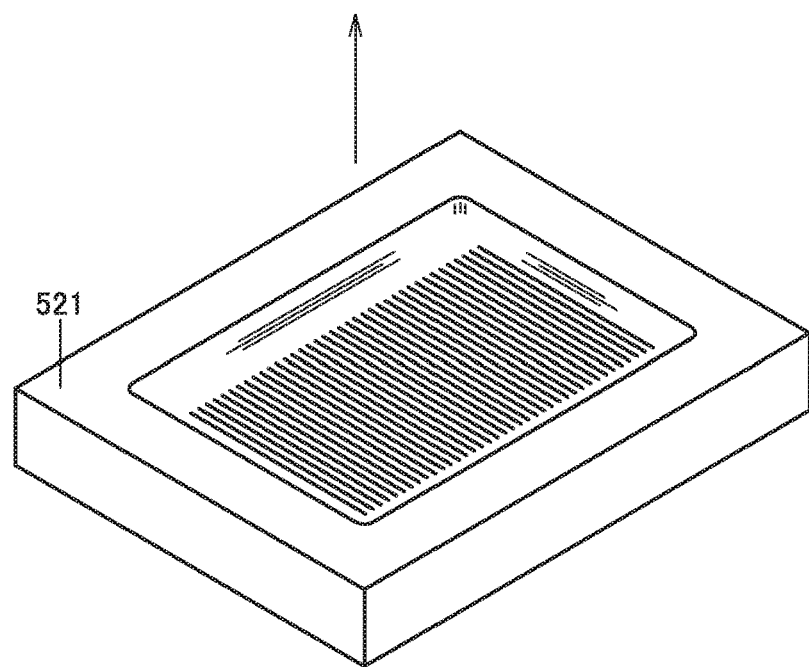
FIG. 22B
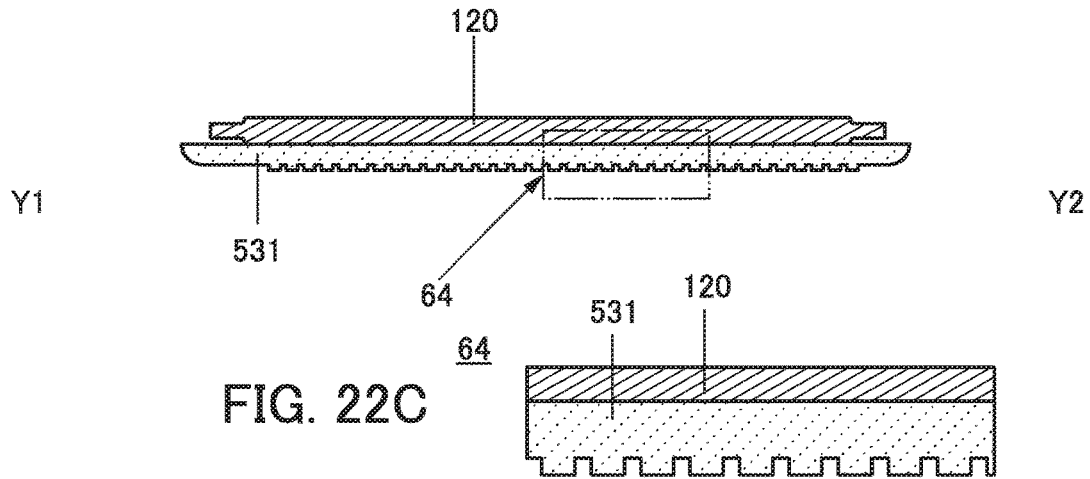
FIG. 22C

FIG. 23
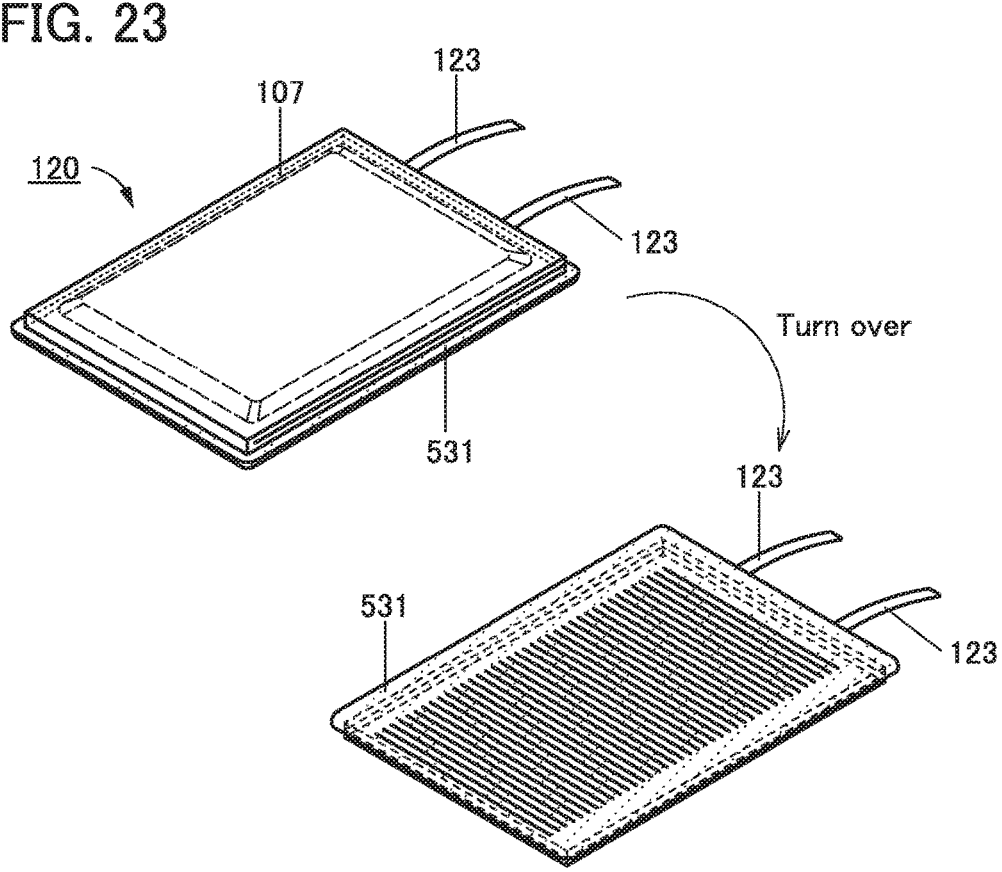
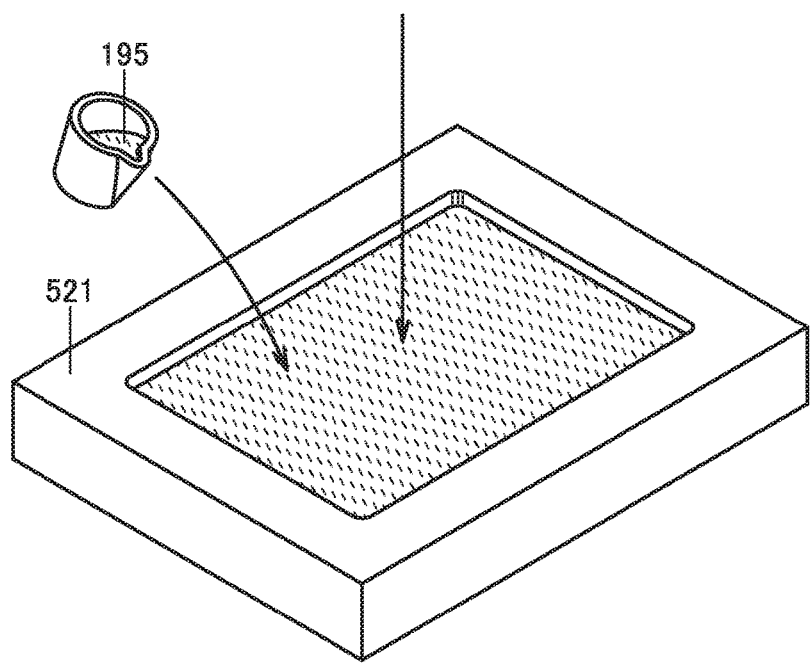

FIG. 25A
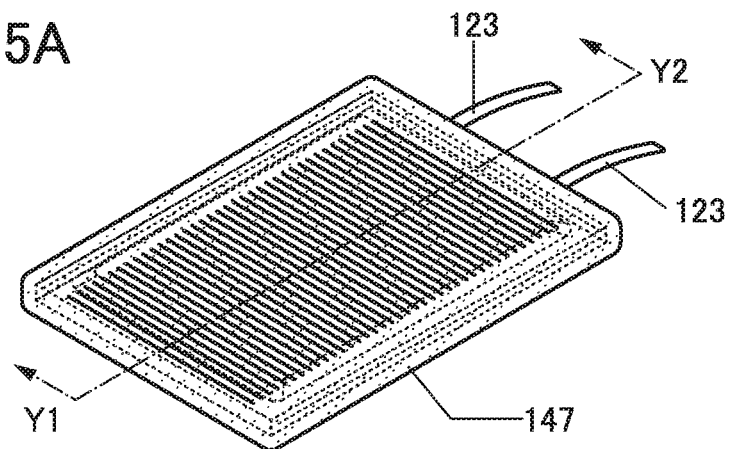
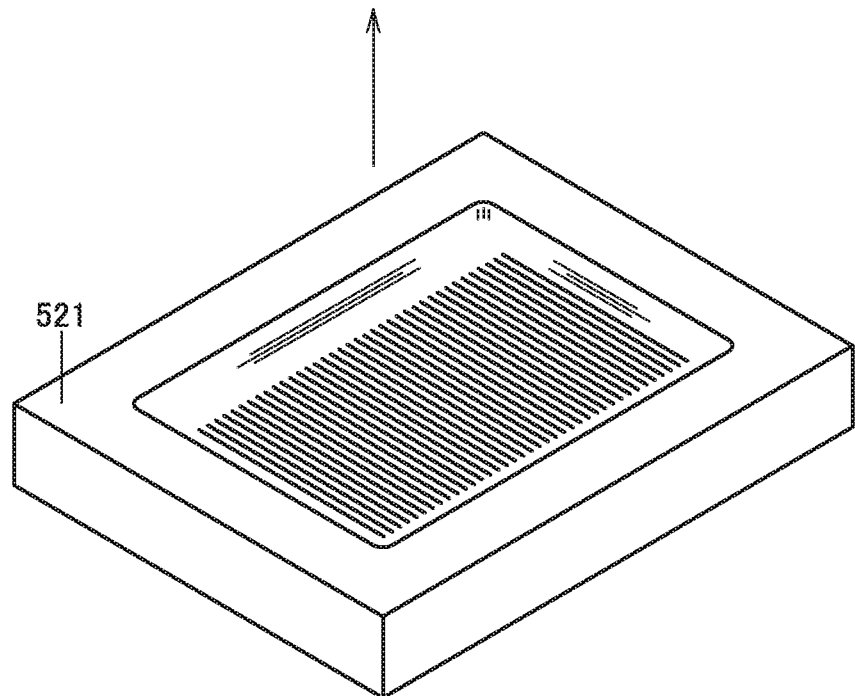
FIG. 25B
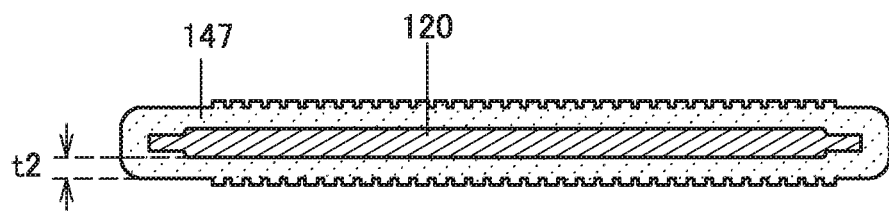

FIG. 31A
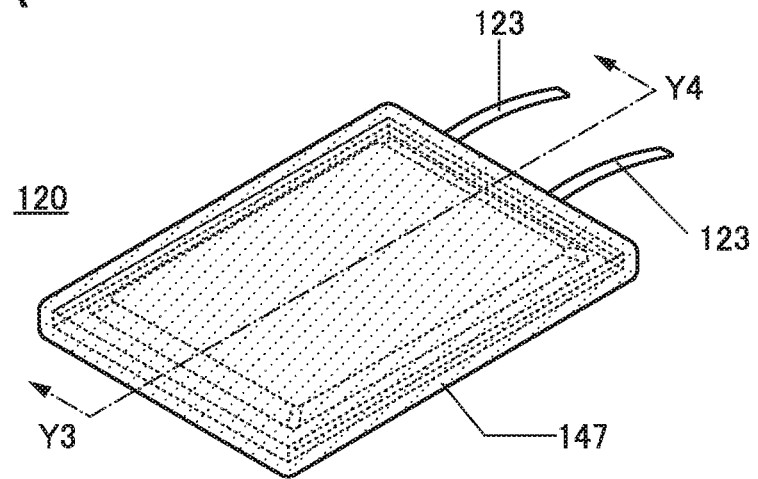
FIG. 31B
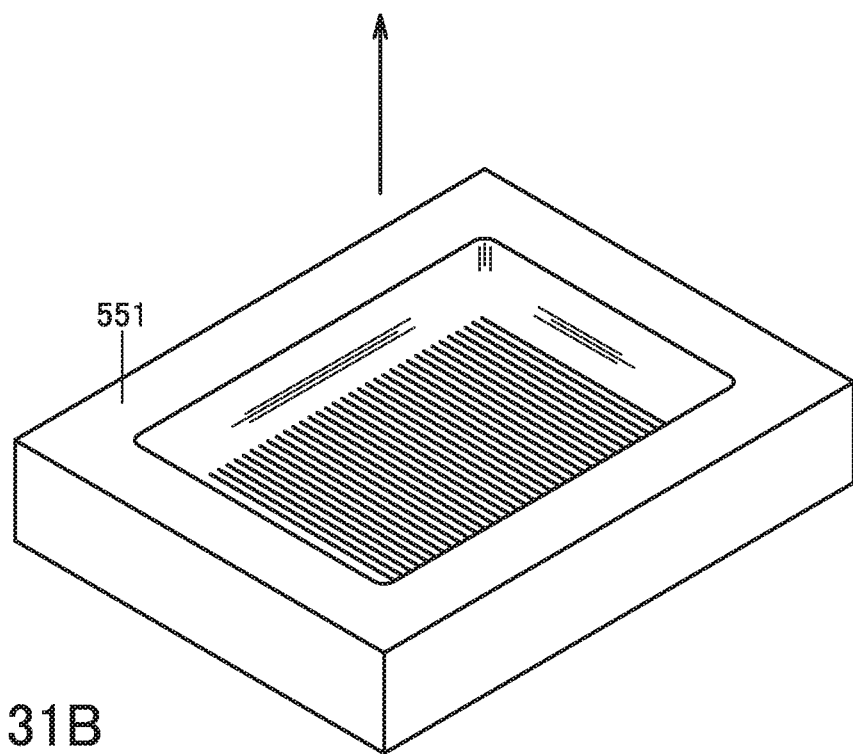
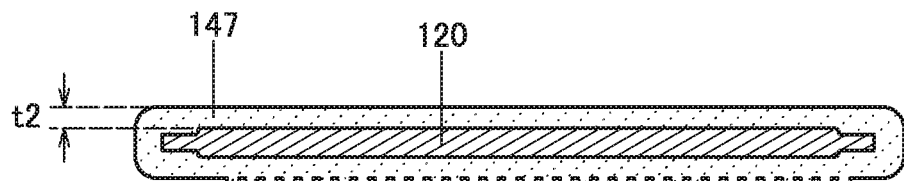

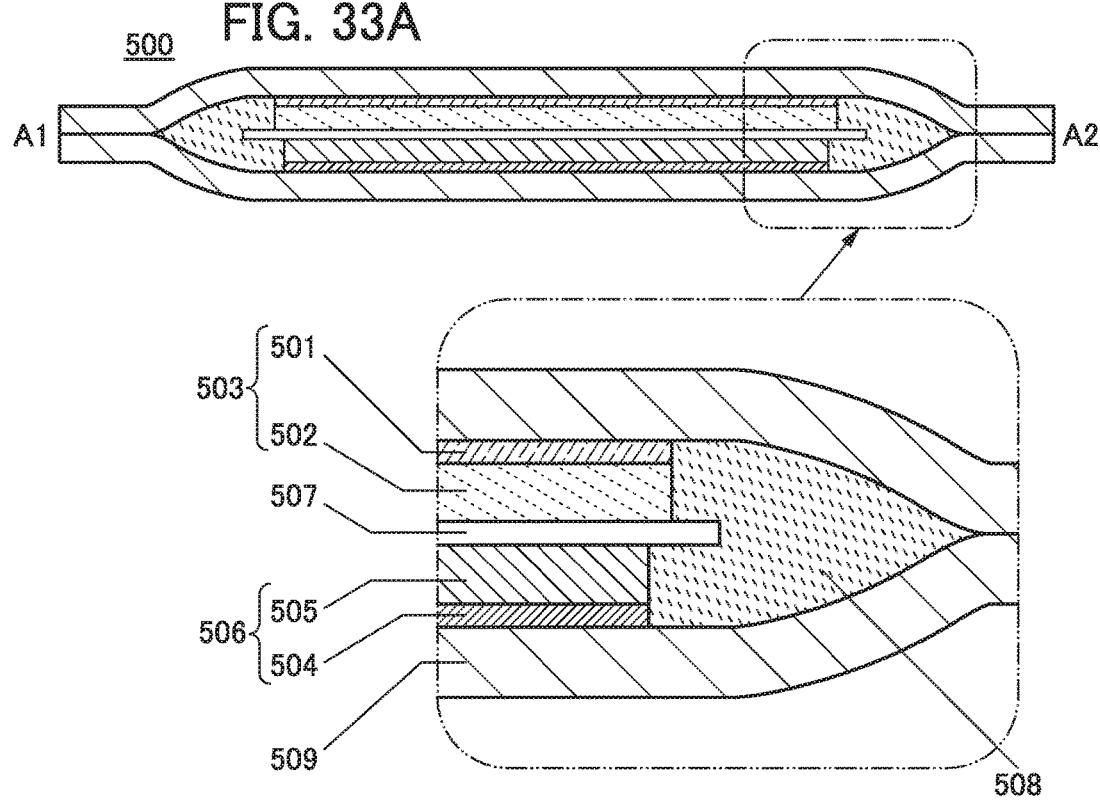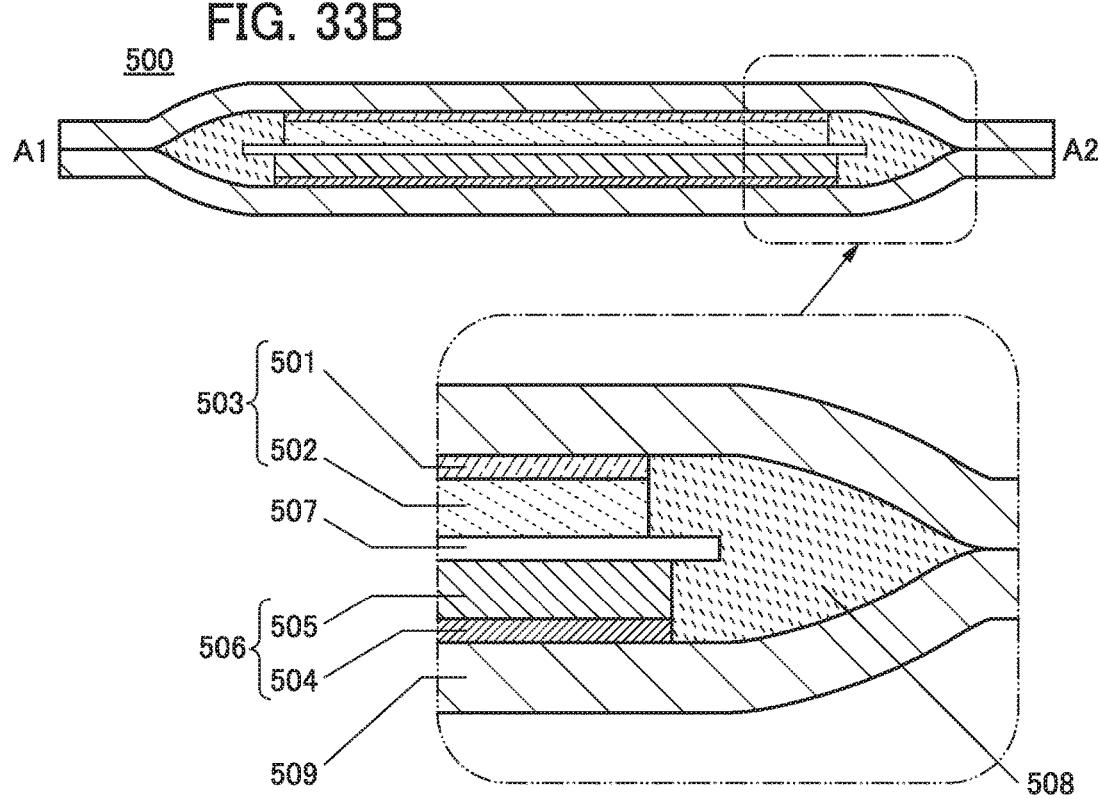

FIG. 40A
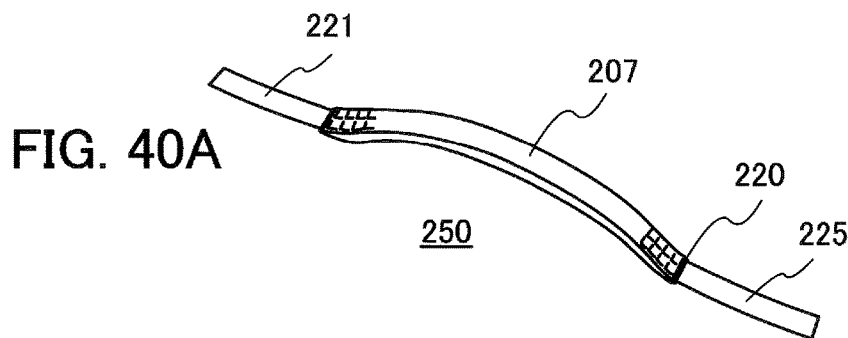
FIG. 40B
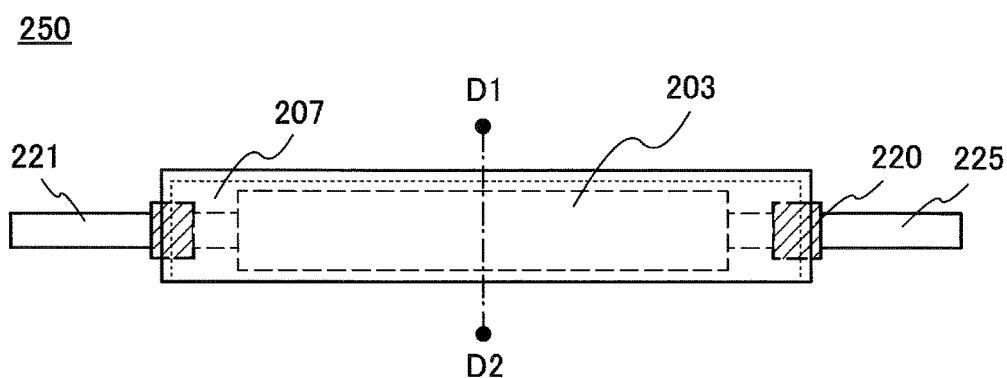
FIG. 40C1
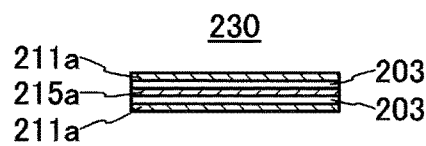
FIG. 40C2
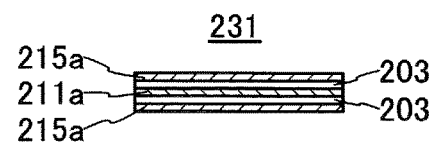

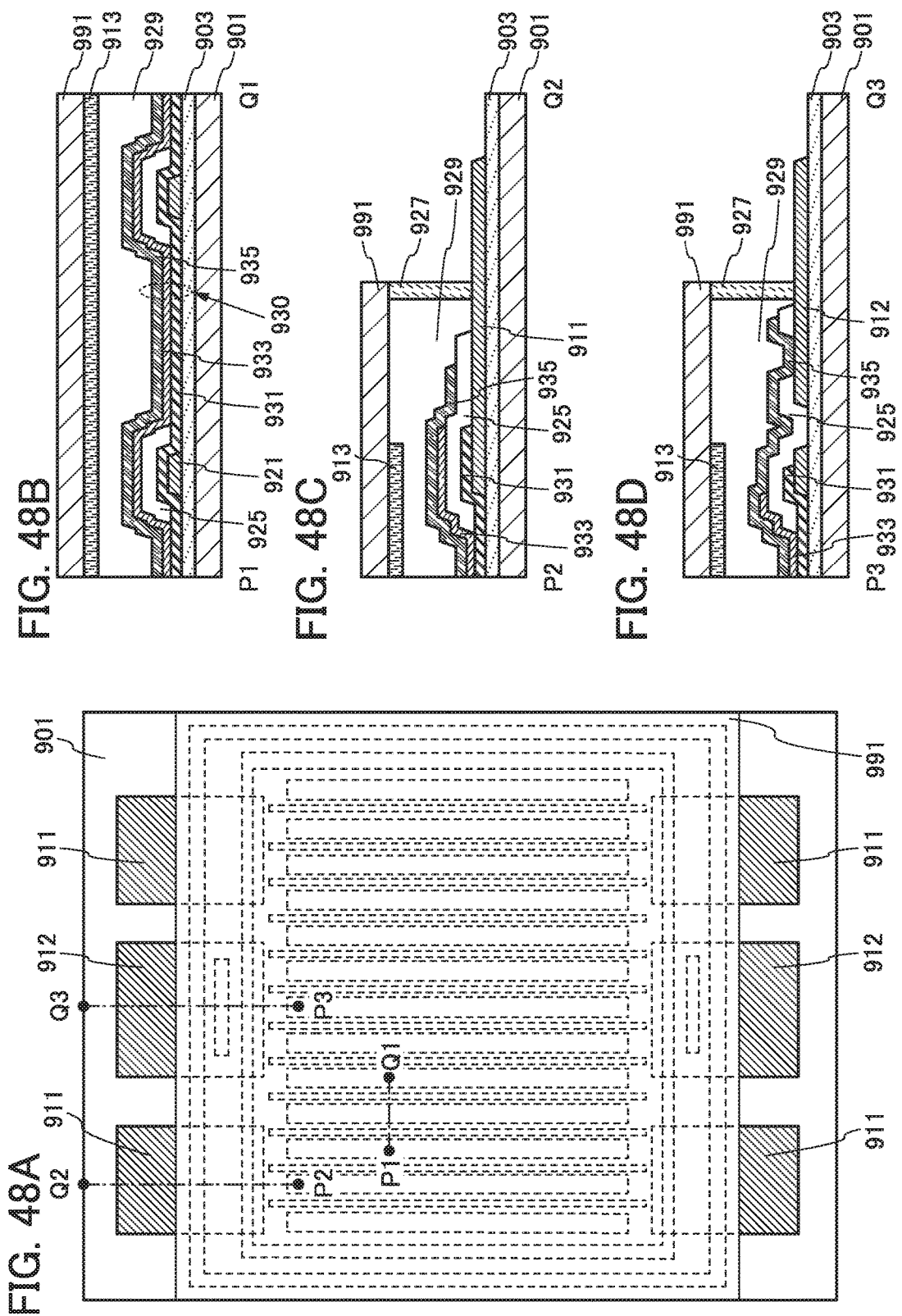

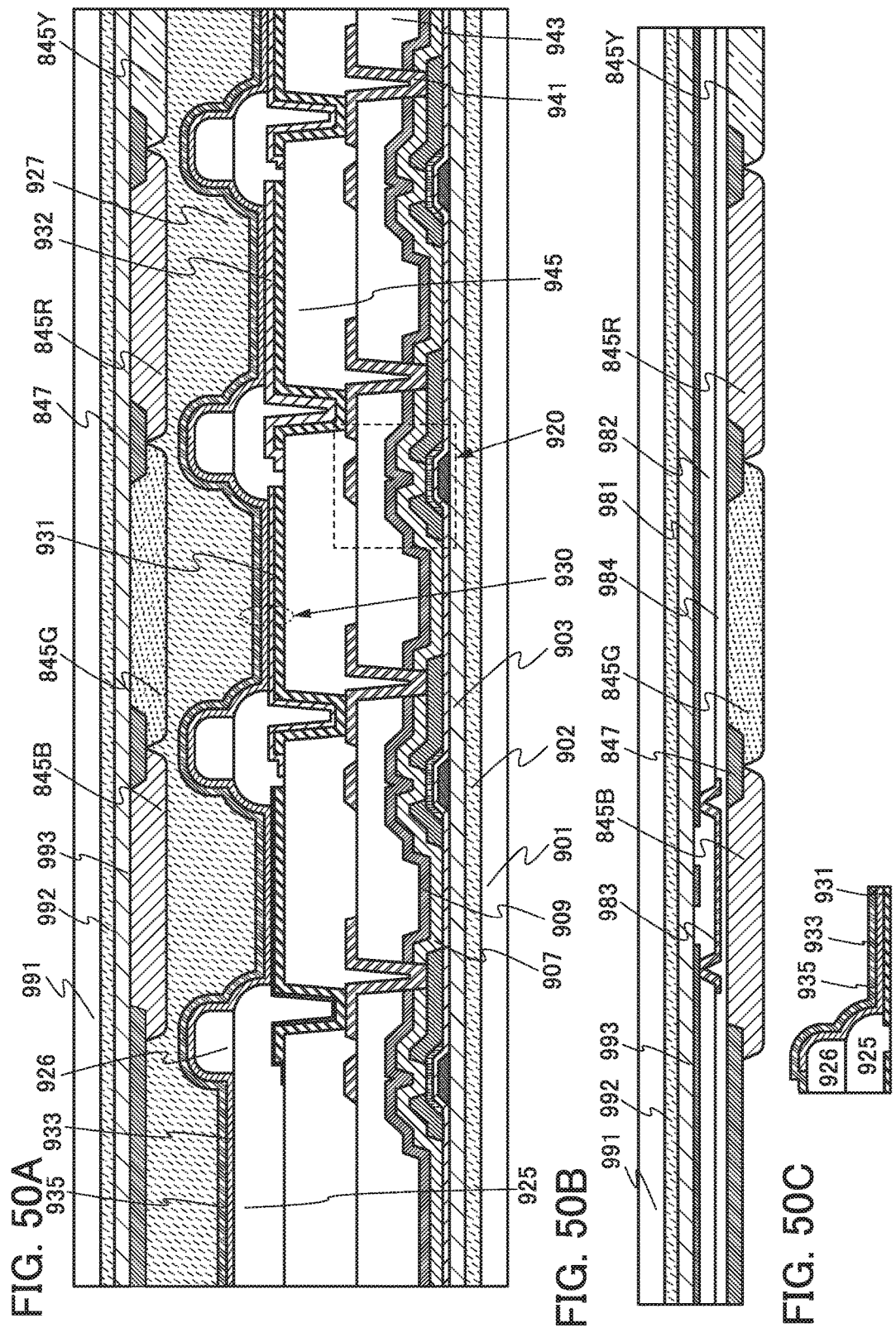

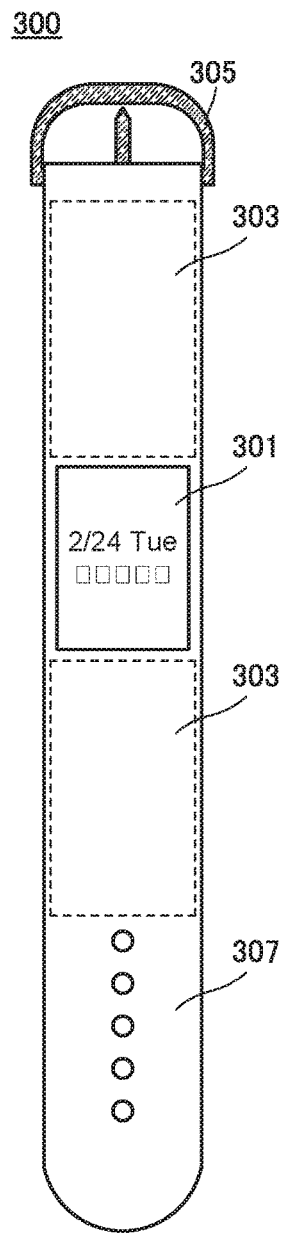
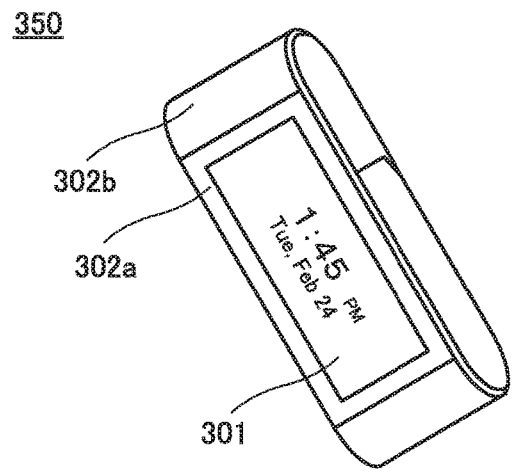
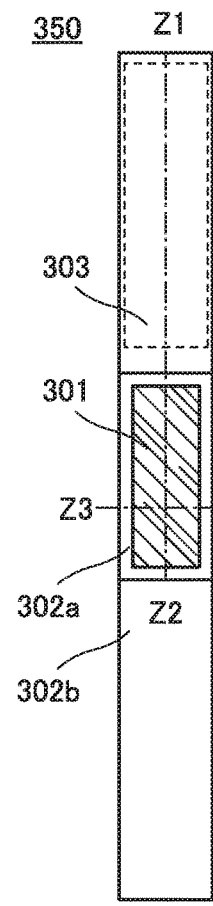
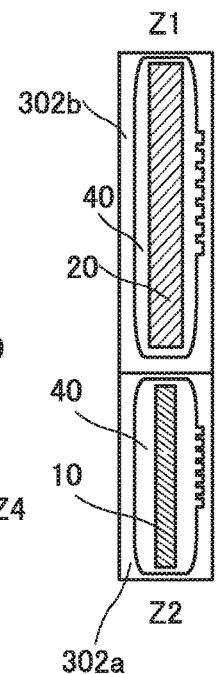
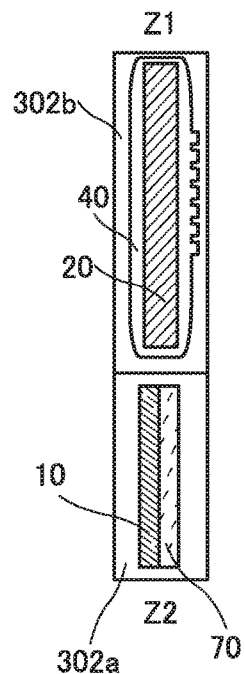
FIG. 53A
FIG. 53B
FIG. 53C
FIG. 53D
FIG. 53E

POWER STORAGE DEVICE, LIGHT-EMITTING DEVICE, AND ELECTRONIC DEVICE

BACKGROUND OF THE INVENTION

1. Field of the Invention

Embodiments of the present invention relate to a power storage device, a light-emitting device, an electronic device, and a method for fabricating any of them.

Note that one embodiment of the present invention is not limited to the above technical field. Examples of the technical field of one embodiment of the present invention include a semiconductor device, a display device, a light-emitting device, an input/output device, a power storage device, a storage device, an imaging device, a driving method thereof, and a manufacturing method thereof.

In this specification, the power storage device is a collective term describing elements and devices that have a power storage function. For example, a storage battery (also referred to as a secondary battery) such as a lithium-ion secondary battery, a lithium-ion capacitor, and an electric double layer capacitor are included in the category of the power storage device.

2. Description of the Related Art

In recent years, wearable devices have been under active development. Since a feature of wearable devices is that they are carried on one's body, it is preferred that they are contoured to fit a curved surface of the body or can be curved conforming to the movement of the body. Thus, power storage devices and display devices provided in wearable devices are required to have flexibility.

For example, Patent Document 1 discloses a sheet-like power storage device that can be curved in at least one axis direction.

Display devices for wearable devices and mobile devices and the like are required to be thin, lightweight, and less likely to be broken, for example.

Light-emitting elements utilizing electroluminescence (also referred to as EL elements) have features of the ease of being thinner and lighter, high-speed response to input signals, and capability of DC low voltage driving, and their application to wearable devices and portable devices has been examined.

For example, Patent Document 2 discloses a flexible light-emitting device using an organic EL element.

REFERENCE

Patent Document

[Patent Document 1] Japanese Published Patent Application No. 2013-211262
[Patent Document 2] Japanese Published Patent Application No. 2014-197522

SUMMARY OF THE INVENTION

An object of one embodiment of the present invention is to provide a flexible power storage device, a flexible light-emitting device, or a flexible electronic device. Another object of one embodiment of the present invention is to provide a highly safe or highly reliable power storage device, a highly safe or highly reliable light-emitting device, or a highly safe or highly reliable electronic device. Another object of one embodiment of the present invention is to provide a power storage device, light-emitting device, or electronic device that is less likely to be broken. Another object of one embodiment of the present invention is to reduce the weight or thickness of a power storage device, light-emitting device, electronic device, or the like. Another object of one embodiment of the present invention is to provide a novel power storage device, a novel light-emitting device, a novel electronic device, or a fabrication method therefor.

Note that the description of these objects do not disturb the existence of other objects. In one embodiment of the present invention, there is no need to achieve all the objects. Other objects can be derived from the description of the specification, the drawings, and the claims.

One embodiment of the present invention is to a power storage device including a battery unit and a member with rubber elasticity. The member with rubber elasticity is provided with a first projection and a second projection. The first projection and the second projection are preferably arranged on a first surface of the battery unit. The first projection and the second projection preferably come in contact with each other when the power storage device is bent such that the first surface of the battery unit faces inward.

In the above structure, the first surface and a second surface of the battery unit are preferably opposite to each other, and the member with rubber elasticity is preferably located on both the first surface and the second surface of the battery unit. The member with rubber elasticity is preferably provided with a third projection and a fourth projection. The third projection and the fourth projection are arranged on the second surface of the battery unit. The third projection and the fourth projection come in contact with each other when the power storage device is bent such that the second surface of the battery unit faces inward.

Another embodiment of the present invention is a power storage device including a battery unit and a member with rubber elasticity. The member with rubber elasticity is provided with a first projection and a second projection. The first projection and the second projection are arranged on a first surface of a battery unit. A cross-sectional shape of the first projection is in contact with three sides of a first isosceles triangle and is included in the first isosceles triangle. A cross-sectional shape of the second projection is in contact with three sides of a second isosceles triangle and is included in the second isosceles triangle. The first isosceles triangle and the second isosceles triangle have the same shape, have their bases on the same line, and are in contact with each other at one point. The curvature radius of the first surface of the battery unit is the sum of the shortest distance from the first surface to the bottom surface of the first projection and the length of an equilateral of the first isosceles triangle when the power storage device is bent such that the first surface of the battery unit faces inward. In this case, a first side of the first projection is preferably located on a first equilateral of the first isosceles triangle. A second side of the second projection is preferably located on a second equilateral of the second isosceles triangle. The first equilateral and the second equilateral are preferably in contact with each other at one point. The first projection and the second projection may have the same cross-sectional shape.

In any of the above structures, the member with rubber elasticity is preferably located on the first surface and the second surface of the battery unit, and the first surface and the second surface of the battery unit are preferably opposite to each other.

In any of the above structures, the member with rubber elasticity is preferably provided with a third projection and a fourth projection. The third projection and the fourth projection are preferably arranged on the second surface of the battery unit. A cross-sectional shape of the third projection is preferably in contact with three sides of a third isosceles triangle and is included in the third isosceles triangle. A cross-sectional shape of the fourth projection is preferably in contact with three sides of a fourth isosceles triangle and is included in the fourth isosceles triangle. The third isosceles triangle and the fourth isosceles triangle preferably have the same shape, have their bases on the same line, and are preferably in contact with each other at one point. The curvature radius of the second surface of the battery unit is preferably the sum of the shortest distance from the second surface to the bottom surface of the third projection and the length of an equilateral of the third isosceles triangle when the power storage device is bent such that the second surface of the battery unit faces inward. In this case, a third side of the third projection is preferably located on a third equilateral of the third isosceles triangle. A fourth side of the fourth projection is preferably located on a fourth equilateral of the fourth isosceles triangle. The third equilateral and the fourth equilateral are preferably in contact with each other at one point. The third projection and the fourth projection may have the same cross-sectional shape.

In any of the above structures, the battery unit is preferably contained in the member with rubber elasticity.

In any of the above structures, it is preferred that the power storage device can be reversibly changed in its shape from a first state where the first projection and the second projection are not in contact with each other to a second state where the first projection and the second projection are in contact with each other.

In any of the above structures, the power storage device preferably includes a power-receiving resonance coil, a power-receiving coil, a rectifier circuit, and a DC-DC converter. In the power-receiving resonance coil, a high-frequency voltage is preferably induced by magnetic field resonance. In the power-receiving coil, a high-frequency voltage is preferably induced by electromagnetic induction with the power-receiving resonance coil. The rectifier circuit preferably rectifies the high-frequency voltage induced in the power-receiving coil. A DC voltage output from the rectifier circuit is preferably input to the DC-DC converter.

In particular, the DC-DC converter preferably includes an input power determination portion and a voltage conversion portion. A first DC voltage is preferably input to the input power determination portion. The voltage conversion portion preferably converts the first DC voltage into a second DC voltage and outputs the second DC voltage. The input power determination portion preferably includes a load, a first means, and a second means. The first means preferably determines a first voltage proportional to the first DC voltage. The second means preferably determines a second voltage proportional to a current generated in the load. The voltage conversion portion preferably includes a switch and a third means. The switch preferably controls the current generated in the load by being turned on and off. The third means preferably keeps the ratio of the first voltage to the second voltage constant by controlling the switch in accordance with the first voltage and the second voltage.

Another embodiment of the present invention is a light-emitting device including a light-emitting unit and a member with rubber elasticity. The light-emitting unit includes a light-emitting panel. The light-emitting panel includes a light-emitting element. The light-emitting unit is contained in the member with rubber elasticity. At least part of the member with rubber elasticity transmits light emitted from the light-emitting element. The member with rubber elasticity is provided with a first projection and a second projection. The first projection and second projection are arranged on a first surface of the light-emitting unit. The light-emitting element has a function of emitting light to the second surface side of the light-emitting unit. The first surface and the second surface of the light-emitting unit are opposite to each other. The first projection and the second projection come in contact with each other when the light-emitting device is bent such that the first surface of the light-emitting unit faces inward.

In the above structure, the light-emitting unit preferably includes a secondary battery and a circuit. The secondary battery preferably has a function of supplying power to the light-emitting element. The circuit preferably includes an antenna and preferably has a function of charging the secondary battery on the basis of a signal received by the antenna.

In any of the above structures, the secondary battery preferably include a portion overlapping with the light-emitting panel.

In any of the above structures, the antenna preferably includes a portion overlapping with the light-emitting panel. At least part of the antenna is preferably located between the light-emitting panel and the secondary battery.

In any of the above structures, the light-emitting unit preferably includes a pressure-sensing element. The pressure-sensing element is located closer to the second surface than the light-emitting element is.

In any of the above structures, a capacitive sensor is preferably provided. The capacitive sensor is preferably located outside the member with rubber elasticity, and light emitted from the light-emitting element is preferably extracted to the outside through the sensor.

One embodiment of the present invention can also be used for a display device with a display panel. A display device can be fabricated using a display panel instead of the light-emitting panel of the light-emitting device in any of the above structures.

Note that one embodiment of the present invention is a module, e.g., a module that includes the light-emitting device or the display device with any of the above structures and that is provided with a connector such as a flexible printed circuit (FPC) or a tape carrier package (TCP) or a module that is directly mounted with an integrated circuit (IC) by a chip on glass (COG) method or the like.

An electronic device or a lighting device that includes the light-emitting device, display device, module, or power storage device having any of the above structures is also one embodiment of the present invention.

For example, one embodiment of the present invention is an electronic device including the light-emitting device having any of the above structures and a sensor, a housing, a speaker, a microphone, an operation switch, or an operation button.

One embodiment of the present invention can provide a flexible power storage device, a flexible light-emitting device, or a flexible electronic device. One embodiment of the present invention can provide a highly safe or highly reliable power storage device, a highly safe or highly reliable light-emitting device, or a highly safe or highly reliable electronic device. One embodiment of the present invention can provide a power storage device, light-emitting device, or electronic device that is less likely to be broken. One embodiment of the present invention can reduce the weight or thickness of a power storage device, light-emitting device, electronic device, or the like. One embodiment of the present invention can provide a novel power storage device, a novel light-emitting device, a novel electronic device, or a fabrication method therefor.

Note that the description of these effects does not disturb the existence of other effects. One embodiment of the present invention does not necessarily have all the effects listed above. Other effects can be derived from the description of the specification, the drawings, and the claims.

BRIEF DESCRIPTION OF THE DRAWINGS

FIGS. 1A to 1D illustrate an example of a power storage device.
FIGS. 22A to 22C illustrate an example of a method for fabricating a power storage device.
FIG. 23 illustrates an example of a method for fabricating a power storage device.
FIGS. 25A and 25B illustrate an example of a method for fabricating a power storage device.
FIGS. 31A and 31B illustrate an example of a method for fabricating a power storage device.
FIGS. 33A and 33B illustrate examples of power storage devices.
FIGS. 40A, 40B, 40C1, and 40C2 illustrate examples of power storage devices.
FIGS. 48A to 48D illustrate an example of a light-emitting panel.
FIGS. 50A to 50C illustrate examples of light-emitting panels.
FIGS. 53A to 53E illustrate examples of electronic devices.

DETAILED DESCRIPTION OF THE INVENTION

Figure 2A:
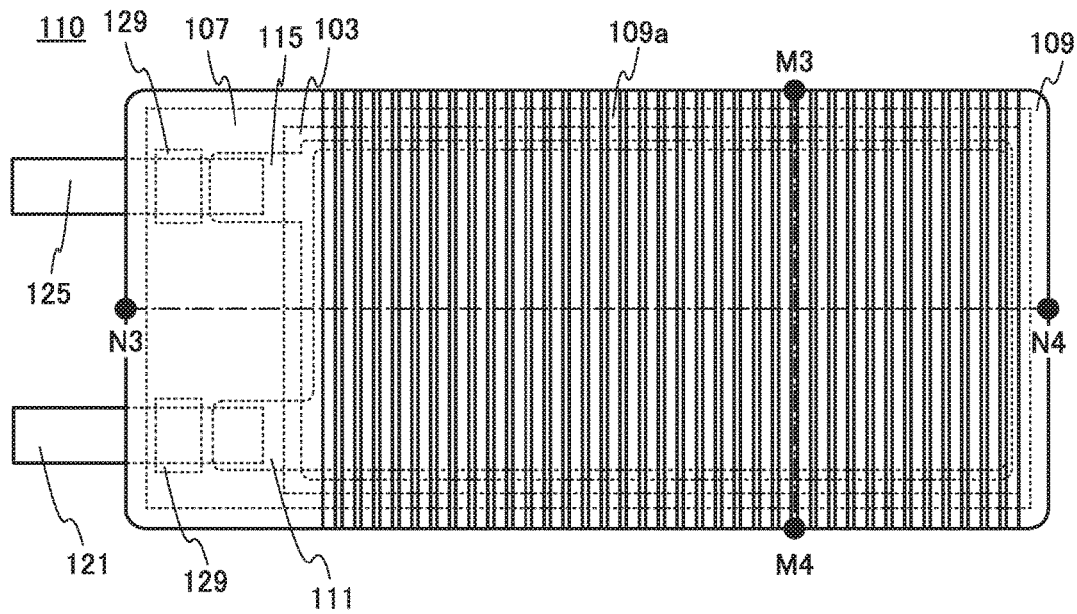
FIGS. 2A to 2C illustrate an example of a power storage device.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and the descriptions of such portions are not repeated. Furthermore, the same hatching pattern is applied to portions having similar functions, and the portions are not specially denoted by reference numerals in some cases.

In addition, the position, size, range, or the like of each structure illustrated in drawings is not accurately represented in some cases for easy understanding. Therefore, the disclosed invention is not necessarily limited to the position, size, range, or the like disclosed in the drawings.

Note that the terms "film" and "layer" can be interchanged with each other depending on the case or circumstances. For example, the term "conductive layer" can be changed into the term "conductive film". Also, the term "insulating film" can be changed into the term "insulating layer".

Embodiment 1

In this embodiment, power storage devices of embodiments of the present invention will be described with reference to FIGS. 1A to 1D to FIGS. 8A to 8E.

Although lithium-ion secondary batteries will be described as examples in this embodiment, one embodiment of the present invention is not limited thereto.

One embodiment of the present invention is a power storage device including a battery unit and a member with rubber elasticity. The member with rubber elasticity is provided with a first projection and a second projection. The first projection and the second projection are arranged on a first surface of the battery unit. The first projection and the second projection come contact with each other when the power storage device is bent such that the first surface of the battery unit faces inward.

The member with rubber elasticity can protect the battery unit. The member with rubber elasticity has flexibility, and thus, can protect the battery unit without impairing the flexibility of the power storage device including the battery unit having flexibility. Furthermore, the use of a member with rubber elasticity that is provided with a plurality of projections can prevent a user from excessively bending the battery unit because adjacent two projections come into contact with each other when the battery unit is bent to some extent. In addition, the battery unit can be prevented from being bent at a position other than a predetermined position. Applying one embodiment of the present invention in such a manner enables fabrication of a flexible power storage device that is highly reliable and highly safe.

Note that rubber elasticity refers to elasticity that allows energy to be absorbed under external force and to be stored as energy for restoration. The member with rubber elasticity can be reversibly changed in its shape.

Specific examples of power storage devices of embodiments of the present invention will be described below.

FIG. 1A is a perspective view of a power storage device 100. FIG. 1B is a top view of the power storage device 100. FIG. 1C is a cross-sectional view along dashed-dotted line M1-M2 in FIG. 1B. FIG. 1D is a cross-sectional view along dashed-dotted line N1-N2 in FIG. 1B.

Figure 2B:
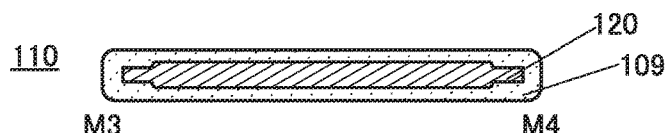
Figure 2C:
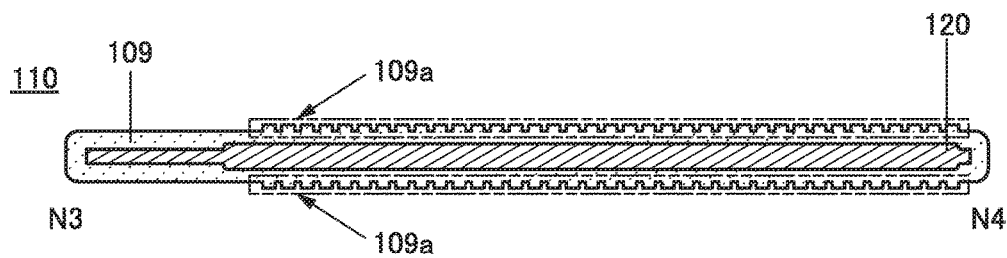

FIG. 2A is a top view of a power storage device 110. FIG. 2B is a cross-sectional view along dashed-dotted line M3-M4 in FIG. 2A, and FIG. 2C is a cross-sectional view along dashed-dotted line N3-N4 in FIG. 2A.

The power storage device 100 and the power storage device 110 each include a battery unit 120 and a member 109 with rubber elasticity.

The battery unit 120 includes a secondary battery. Specifically, the battery unit 120 includes a positive electrode 111, a negative electrode 115, a separator 103, an electrolyte (not illustrated), an exterior body 107, and the like. The battery unit 120 does not necessarily include the exterior body 107.

The battery unit 120 may further include a protective circuit. The protective circuit has a function of preventing overcharge and overdischarge of the secondary battery.

The battery unit 120 may further include an antenna and a circuit having a function of wirelessly charging a secondary battery.

For the components of the battery unit, Embodiment 4 can be referred to.

Although an example in which the battery unit 120 is not bent is described in this embodiment, the battery unit 120 may be curved. The power storage device 100 may include an exterior body where the member 109 with rubber elasticity and the battery unit 120 are contained.

A positive electrode lead 121 is electrically connected to the positive electrode 111. A negative electrode lead 125 is electrically connected to the negative electrode 115. The positive electrode lead 121 and the negative electrode lead 125 partly extend out from the exterior body 107, and the extended portions extend out from the member 109 with rubber elasticity. The positive electrode lead 121 and the negative electrode lead 125 are each provided with a sealing layer 129. The sealing layer 129 can fix the lead and the exterior body 107 so that adhesion therebetween is increased.

The member 109 with rubber elasticity is provided with an uneven structure 109a on at least one of its surfaces. The power storage device 100 illustrated in FIGS. 1A to 1D is an example in which the member 109 with rubber elasticity is provided with the uneven structure 109a on one surface. The power storage device 110 illustrated in FIGS. 2A to 2C is an example in which the member 109 with rubber elasticity is provided with the uneven structure 109a on each of its two opposite surfaces.

When the power storage device of one embodiment is bent such that the uneven structure 109a faces inward, adjacent two projections come in contact with each other, and the power storage device is difficult to bend further. Thus, it is possible to prevent the power storage device from being bent excessively and damaged.

For example, it is preferred that the height, width, pitch, and the like of the projections are set such that the projections of the uneven structure 109a come in contact with each other when the power storage device is bent with a curvature smaller than or equal to the largest curvature with which the power storage device can be bent (for example, smaller than the curvature with which the battery unit 120 might be damaged).

It is preferred that the power storage device can be bent with a curvature radius of, for example, 10 mm to 150 mm, inclusive.

As illustrated in FIG. 1B, in the uneven structure 109a of the power storage device 100, a plurality of rows of projections provided long in a Y direction are arranged in an X direction. A portion of the member 109 with rubber elasticity on which the uneven structure 109a is provided is thicker than the other portion and thus is not easily bent. Therefore, it is more difficult to bend the power storage device 100 such that a shorter side thereof (here, a side parallel to the Y direction) describes an arc than to bend the power storage device 100 such that a longer side thereof (here, a side parallel to the X direction) describes an arc. That is to say, providing the uneven structure enables the ease of bending of the power storage device to depend on the direction in which the power storage device is bent. For example, the power storage device that is not easily bent in the direction in which the battery unit 120 is susceptible to bending damage is less likely to be broken and has higher reliability.

In the cases of the power storage device 100 and the power storage device 110, the battery unit 120 is entirely covered with the member 109 with rubber elasticity. With this structure, the power storage device can be less likely to be broken even when repeatedly bent and stretched. Particularly in the case where the member 109 with rubber elasticity is a seamless body, the power storage device can have higher reliability.

A thickness t1 of the member 109 with rubber elasticity formed on one surface of the battery unit 120 is preferably substantially equal to a thickness t2 of the member 109 with rubber elasticity formed on the other surface of the battery unit 120, in FIGS. 1C and 1D. In that case, each of the thickness t1 and the thickness t2 does not include the thickness of the uneven structure 109a. That is to say, the thickness t2 corresponds to the shortest distance from the other surface of the battery unit 120 to the bottom surface of the projection. When the thickness t1 is equal to the thickness t2, the battery unit 120 can be disposed in the neutral plane. Therefore, compressive stress and tensile stress due to bending are less likely to be imposed on the battery unit 120, reducing damage to the battery unit 120.

The thickness t1 and the thickness t2 can be larger than or equal to 10 µm and smaller than or equal to 5 cm, larger than or equal to 100 µm and smaller than or equal to 1 cm, or larger than or equal to 500 µm and smaller than or equal to 1 mm, for example. When the thickness t1 and the thickness t2 are smaller, the thickness and weight of the power storage device can be more lightweight. When the thickness t1 and the thickness t2 are larger, the power storage device can be protected more reliably.

FIGS. 3A to 3F illustrate other examples of power storage devices. FIGS. 3A to 3F illustrate modification examples of the power storage device 110 in FIG. 2C.

Figure 3A:
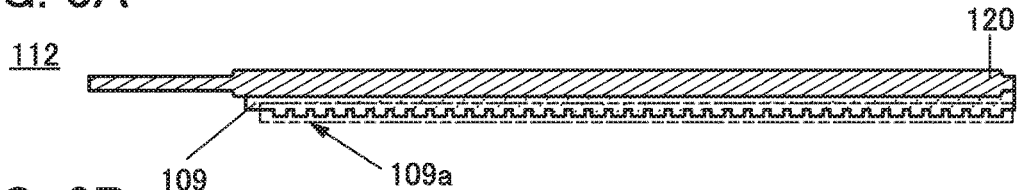
FIGS. 3A to 3F illustrate examples of power storage devices.
Figure 3B:
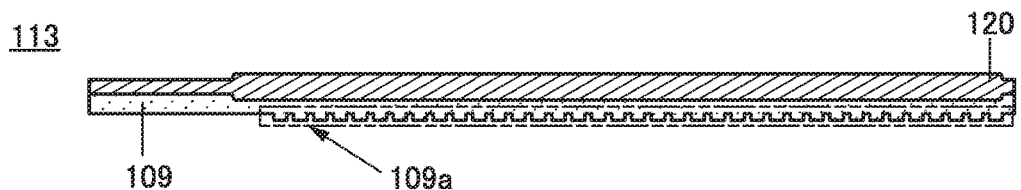

A power storage device 112 in FIG. 3A and a power storage device 113 in FIG. 3B are each provided with the member 109 with rubber elasticity on one surface of the battery unit 120. The member 109 with rubber elasticity is not necessarily provided on the entire region of one surface of the battery unit 120 as in the power storage device 112 in FIG. 3A. Providing the member 109 with rubber elasticity in a smaller region allows the power storage device to be more lightweight. Meanwhile, providing the member 109 with rubber elasticity on the entire region of one surface of the battery unit 120 as in the power storage device 113 in FIG. 3B permits more effective protection of the battery unit 120.

Figure 3C:
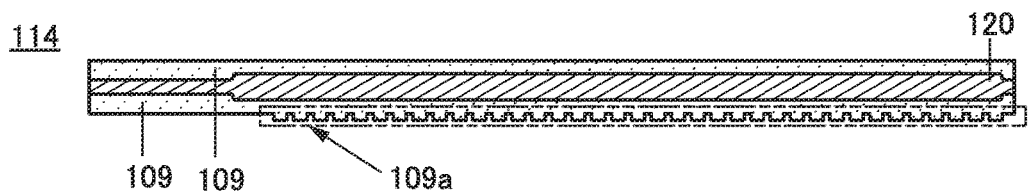
Figure 3D:
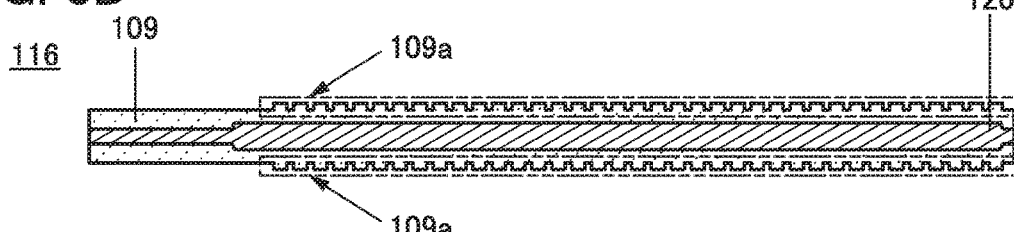

A power storage device 114 in FIG. 3C and a power storage device 116 in FIG. 3D are each provided with the members 109 with rubber elasticity on two opposite surfaces of the battery unit 120. At least one of the members 109 with rubber elasticity on the two opposite surfaces has the uneven structure 109a. In the power storage device 114 in FIG. 3C, the member 109 with rubber elasticity on one surface has the uneven structure 109a. In the power storage device 116 in FIG. 3D, the members 109 with rubber elasticity on two opposite surfaces each have the uneven structure 109a. In the case of the power storage device 114, only when it is bent such that the lower surface thereof in the drawing faces inward, two adjacent projections come in contact with each other and thus the power storage device 114 is not easily bent any further. Meanwhile, in the case of the power storage device 116, when it is bent such that the lower surface thereof faces either inward or outward, two adjacent projections come in contact with each other and thus the power storage device 116 is not easily bent any further. In one embodiment of the present invention, a surface on which the uneven structure 109a is provided can be determined according to the use or the like of the power storage device.

Figure 3E:
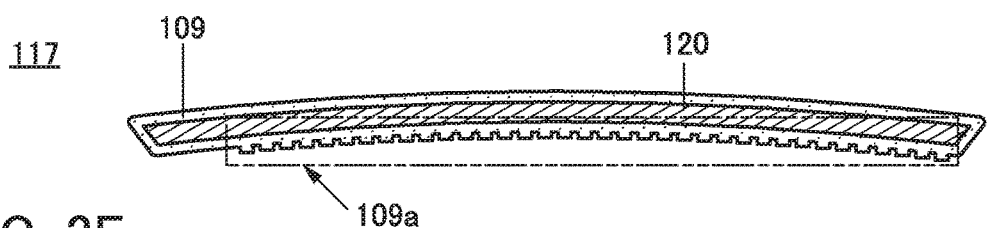
Figure 3F:
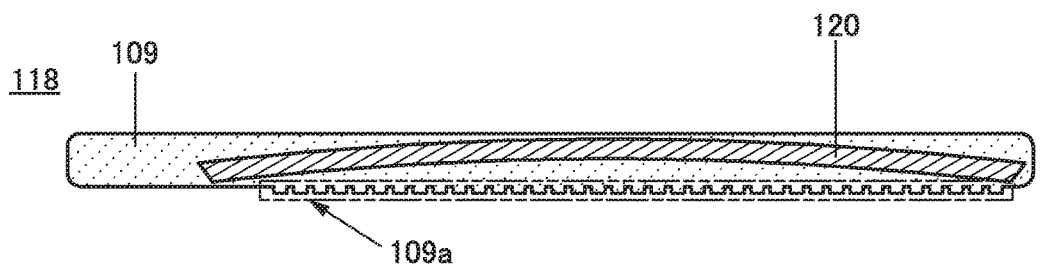

When the member 109 with rubber elasticity is formed to fit the shape of the battery unit 120 curved in advance, a power storage device 117 in FIG. 3E can be fabricated. As in a power storage device 118 in FIG. 3F, the member 109 with rubber elasticity may have a flat surface and hold the curved battery unit 120. In FIGS. 3E and 3F, the battery unit 120 is curved but two adjacent projections are not in contact with each other. When the curved battery unit or power storage device is further bent, two adjacent projections come in contact with each other, so that the battery unit or power storage device is not easily changed in its shape any further. Thus, the power storage device is less likely to be broken. Note that in the case where the structures in FIGS. 3E and 3F are modified such that the uneven structure 109a is provided on each of two opposite surfaces, when the curved battery unit or power storage device is changed in its shape such that it becomes flat, two adjacent projections come in contact with each other and thus the battery unit or power storage device is not easily changed in its shape any further. Thus, the power storage device is less likely to be broken.

The member 109 with rubber elasticity preferably has high heat resistance. Specifically, it is preferred that the member 109 with rubber elasticity can be used at higher than or equal to 100° C., more preferably higher than or equal to 150° C., still more preferably higher than or equal to 200° C.

When the battery unit 120 is contained in the member 109 with rubber elasticity that has high heat resistance, the battery unit 120 can operate even at high temperatures. Furthermore, the power storage device can be reversibly bent even at high temperatures.

Furthermore, the member 109 with rubber elasticity preferably has high cold resistance. Specifically, the member 109 with rubber elasticity preferably has flexibility even at lower than or equal to −25° C., more preferably lower than or equal to −50° C., still more preferably lower than or equal to −100° C.

When the battery unit 120 is contained in the member 109 with rubber elasticity having high cold resistance, the battery unit 120 can operate even at low temperatures. Furthermore, the power storage device can be reversibly bent even at low temperatures.

Moreover, the member 109 with rubber elasticity preferably has both high heat resistance and high cold resistance, in which case the power storage device can be used and reversibly bent at a wide range of temperatures. In the power storage device of one embodiment of the present invention, the battery unit 120 is preferably capable of operating at higher than or equal to 0° C. and lower than or equal to 80° C., more preferably higher than or equal to −25° C. and lower than or equal to 100° C., still more preferably higher than or equal to −50° C. and lower than or equal to 150° C., yet still more preferably higher than or equal to −100° C. and lower than or equal to 200° C. Furthermore, the power storage device is preferably capable of being reversibly bent at the above range of temperatures. The power storage device of one embodiment of the present invention can be used either indoors or outdoors.

The member 109 with rubber elasticity particularly preferably has lower heat conductance, in which case the battery unit 120 is less likely to be adversely affected by the ambient temperature. Note that the heat conductance of the member 109 with rubber elasticity is not necessarily set low in the case where the battery unit 120 can operate in the usage environment, for example, in the case where it can operate at wide range of temperatures.

Furthermore, the member 109 with rubber elasticity has high resistance to solvents such as an organic solvent and an electrolyte, high chemical stability, and high weather resistance. Depending on the material and the usage environment of the battery unit 120, degradation of the member 109 with rubber elasticity can be suppressed. Furthermore, sealing with the member 109 with rubber elasticity can be prevented from being broken. Thus, a higher level of safety of the power storage device can be achieved.

Furthermore, the member 109 with rubber elasticity preferably has low moisture permeability and low gas permeability. In many cases, the battery unit 120 contains a material that is likely to be degraded by impurities such as moisture. In the case where the member 109 with rubber elasticity is less likely to allow passage of moisture and gas, entry of moisture and gas in the air into the battery unit 120 can be inhibited, so that deterioration of the battery unit 120 can be inhibited. Thus, the reliability of the power storage device can be improved. Furthermore, the member 109 with rubber elasticity may have high water repellency.

It is preferred that the power storage device can be used in water. The battery unit 120 of the power storage device of one embodiment of the present invention is preferably capable of operating in water at higher than or equal to 0° C. and lower than or equal to 100° C., for example. Furthermore, the power storage device is preferably capable of being reversibly bent in water at higher than or equal to 0° C. and lower than or equal to 100° C.

Examples of materials of the member 109 with rubber elasticity include thermosetting elastomers. Specifically, natural rubber, silicone rubber, fluorine rubber, acrylic rubber, ethylene-propylene rubber (EPM), ethylene-propylene-diene rubber (EPDM), urethane rubber, acrylonitrile-butadiene rubber, styrene-butadiene rubber (SBR), chloroprene rubber, and butyl rubber can be given, for example.

As a material of the member 109 with rubber elasticity, a thermosetting elastomer can be used as long as it has resistance to heat at temperatures of the usage environment. For example, a polyester-based or polyamide-based thermosetting elastomer is preferably used because it has high heat resistance.

To increase the flame resistance, heat resistance, moldability, stability, or the like of the member 109 with rubber elasticity, an additives such as a flame retardant, a plasticizer, an antioxidant, an photodegradation inhibitor, a repellent, an anti-static agent, a lubricant, or a colorant may be added.

The member 109 with rubber elasticity may contain, for example, a filler, specifically, carbon fiber, glass fiber, aramid fiber, metal fiber, or the like.

The member 109 with rubber elasticity does not necessarily transmit visible light. In the case where there is a component to be seen by a user of the power storage device in the member 109 with rubber elasticity, the member 109 with rubber elasticity is formed using a material that transmits visible light.

The internal stress that is generated when the member 109 with rubber elasticity is changed in its shape is easily dispersed. Thus, the member 109 with rubber elasticity can relieve stress locally imposed on a bent portion of the power storage device when the power storage device is bent, and the power storage device can be prevented from being broken. The member 109 with rubber elasticity can also serve as a buffer that disperses external physical pressure or impact. The member 109 with rubber elasticity preferably has a smaller Young's modulus than the exterior body 107, for example.

There is no limitation on the method for molding the member 109 with rubber elasticity; for example, extrusion molding, compression molding, injection molding, or the like can be employed. For the fabrication method of the power storage device, Embodiment 3 can be referred to.

FIGS. 4A to 4C and FIGS. 5A to 5C illustrate examples of the planar layout of the uneven structure 109a.

Figure 4A:
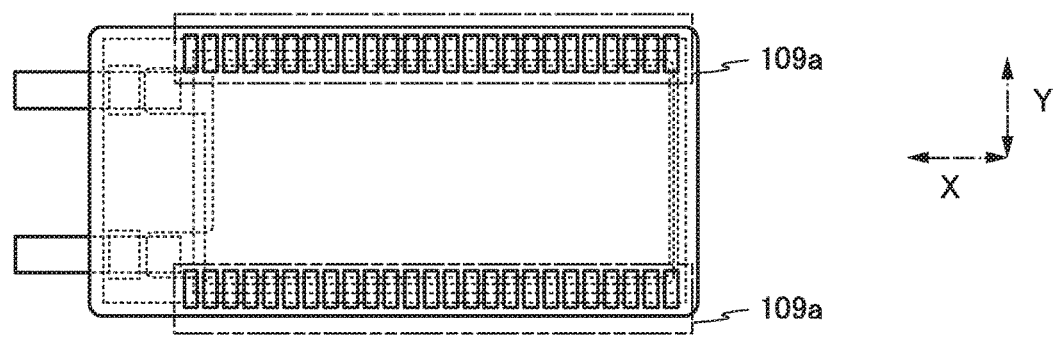
FIGS. 4A to 4C illustrate examples of power storage devices.
Figure 4B:
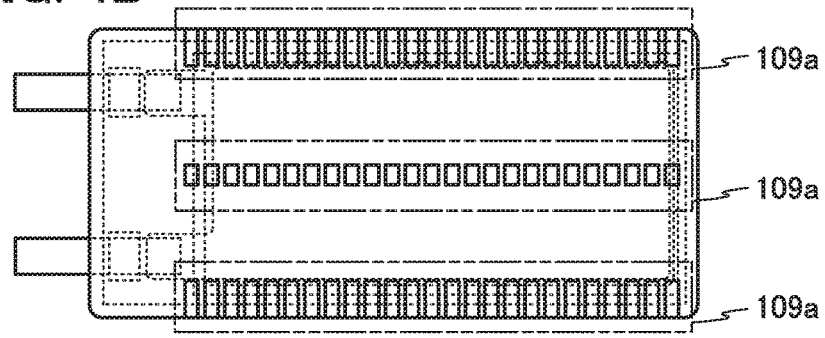

As illustrated in FIG. 4A, the uneven structure 109a may be provided only in the vicinity of end portions of a power storage device and is not necessarily provided in the center portion thereof. Alternatively, as illustrated in FIG. 4B, the uneven structure 109a can be provided in each of the center portion and the vicinity of end portions of a power storage device. In this manner, a plurality of projections may thus be provided in one direction (in the Y direction here). The lengths of the projections in the Y direction can be either equal to or different from each other. In FIG. 4B, the lengths of the projections of the uneven structure 109a in the Y direction in the vicinity of the end portions are smaller than those of the projections of the uneven structure 109a in the center portion.

Figure 4C:
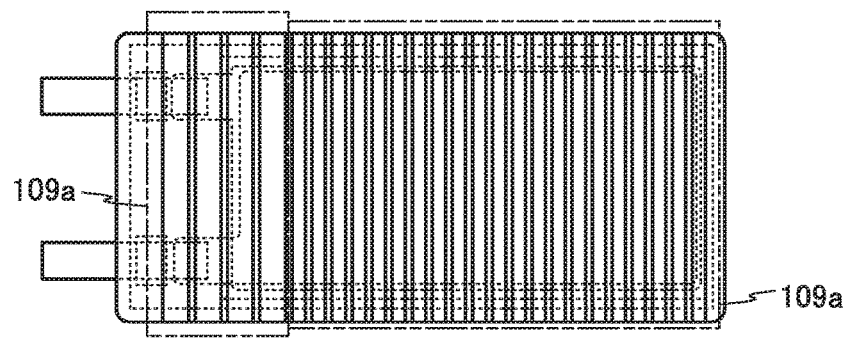

Furthermore, the lengths in the X direction of the projections can be either equal to or different from each other. In FIG. 4C, the lengths in the X direction of the projections in the vicinity of a connection portion between an electrode lead and an electrode are larger than those of the projections in the other portion. In this manner, the lengths in the X direction of the projections may be varied such that the projections can come in contact with each other with a larger curvature radius in a portion susceptible to bending damage than in the other portion.

Figure 5A:
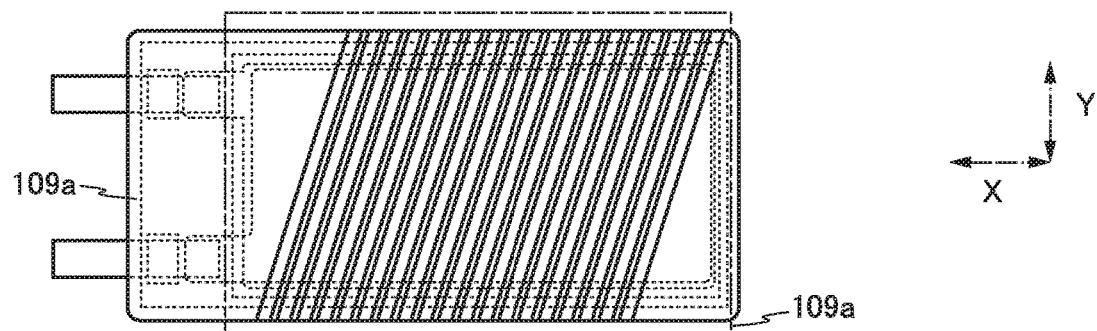
FIGS. 5A to 5C illustrate examples of power storage devices.
Figure 5B:
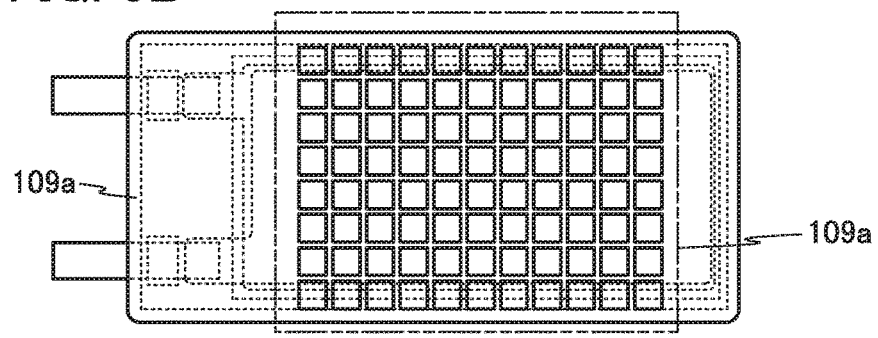

As illustrated in FIG. 5A, projections that are long in the direction not parallel to a longer side and a shorter side of a power storage device can be provided. The projections can be formed in consideration of the direction in which the power storage device is to be bent.

In the case where a power storage device is to be bent in two directions, projections may be provided in a matrix. Although projections are provided in the X and Y directions perpendicular to each other in FIG. 5B, projections may be arranged in two directions not perpendicular to each other. Alternatively, projections may be arranged in three or more directions.

Figure 5C:
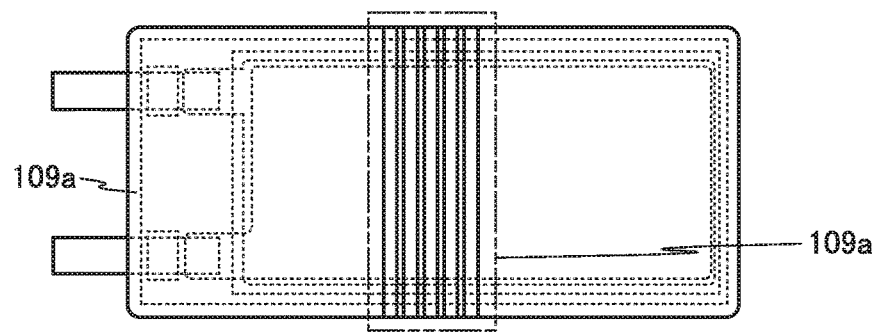

The uneven structure 109a may be provided in part of a power storage device so that a bendable portion of the power storage device is limited. FIG. 5C illustrates an example where a power storage device can be bent only in the center portion. To obtain a power storage device that can be bent in various positions, the uneven structure 109a is preferably formed in a wide area.

In one embodiment of the present invention, the ease of bending of the power storage device or the curvature radius of the power storage device when projections come in contact with each other can be controlled by the height of the projections, the lengths of the projections in the X or Y direction, the interval between the projections, or the like.

Next, the uneven structure 109a will be described with reference to FIGS. 6A to 6F to FIGS. 8A to 8E.

Figure 6A:
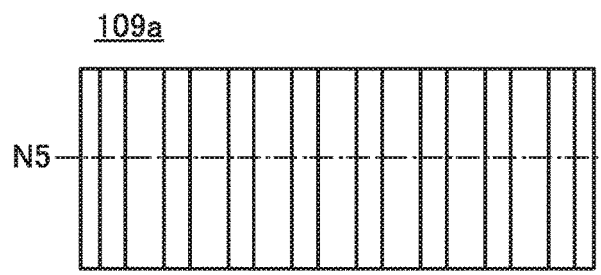
FIGS. 6A to 6F illustrate examples of power storage devices.
Figure 6C:
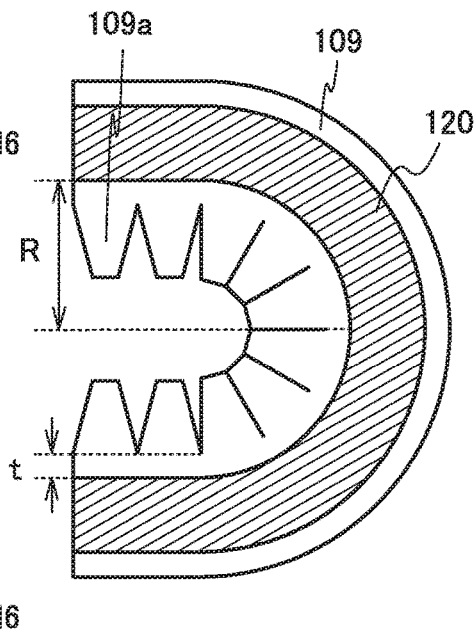
Figure 6B:
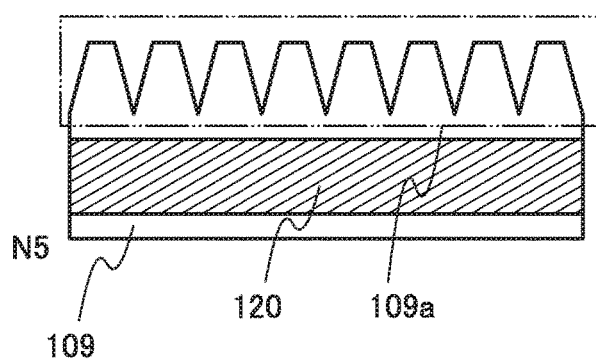

FIG. 6A is a top view of the uneven structure 109a, and FIG. 6B is a cross-sectional view along dashed dotted line N5-N6 in FIG. 6A.

In FIG. 6B, the battery unit 120 is provided with the members 109 with rubber elasticity on two opposite surfaces; the member 109 with rubber elasticity on one surface (hereinafter referred to as a first surface) has the uneven structure 109a.

As illustrated in FIG. 6C, when the power storage device is bent such that the first surface of the battery unit 120 faces inward, two adjacent projections come in contact with each other and thus the power storage device is difficult to bend further. This can prevent the power storage device from being bent excessively and damaged.

Figure 6D:
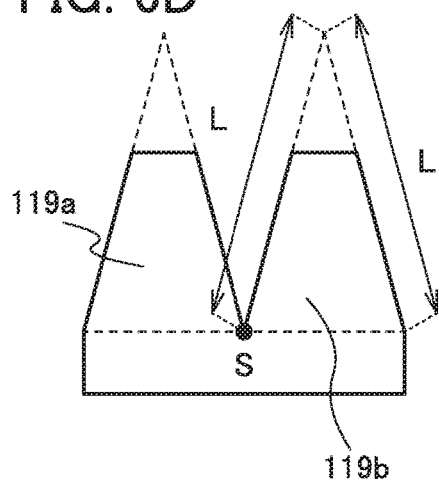
Figure 6E:
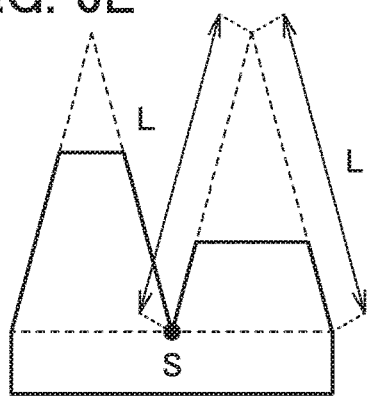

FIG. 6D is an enlarged view of two projections of the uneven structure 109a. A cross-sectional shape of the first projection 119a is in contact with three sides of a first isosceles triangle and is included in the first isosceles triangle. Similarly, a cross-sectional shape of the second projection 119b is in contact with three sides of a second isosceles triangle and is included in the second isosceles triangle. The first isosceles triangle and the second isosceles triangle have the same shape, have their bases on the same line, and are in contact with each other at one point (a point S in FIG. 6D).

When the power storage device is bent such that the first surface of the battery unit 120 faces inward and two adjacent projections come in contact with each other, a curvature radius R of the first surface of the battery unit 120 is the sum of a shortest distance t from the first surface to the bottom surface of the projection and a length L of an equilateral of the isosceles triangle (see FIGS. 6C and 6D). The curvature radius R can be, for example, larger than or equal to 5 mm and smaller than or equal to 150 mm, preferably larger than or equal to 10 mm and smaller than or equal to 50 mm.

As illustrated in FIG. 6D, the first projection 119a and the second projection 119b preferably have the same shape. In the case where a first side of the first projection 119a is located on a first equilateral of the first isosceles triangle, a second side of the second projection 119b is located on a second equilateral of the second isosceles triangle, and the first and second equilaterals are in contact with each other at one point (the point S in FIG. 6E), the first projection 119a and the second projection 119b may have different shapes.

Note that when projections come in contact with each other, the projections are deformed in some cases. The shapes of projections described in this embodiment may correspond to, for example, the shapes when bending stress is not applied to the projections or when the projections are not in contact with each other. Alternatively, the shapes of projections described in this embodiment may correspond to the shapes when bending stress is applied to the projections or when the projections are in contact with each other.

Figure 6F:
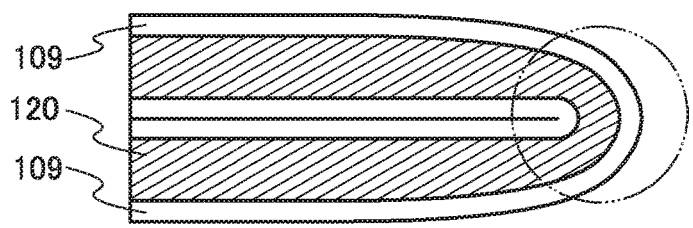

When a power storage device is excessively bent and stress is locally imposed on the bent portion shown by the dotted line in FIG. 6F, the battery unit 120 or the member 109 with rubber elasticity might be broken. In one embodiment of the present invention, the projections described above are provided on the member 109 with rubber elasticity, whereby the power storage device can be prevented from being broken by being excessively bent.

Figure 7A:
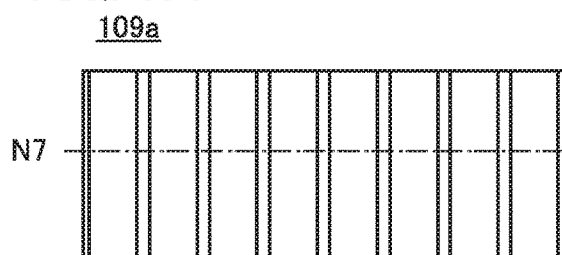
FIGS. 7A to 7G illustrate examples of power storage devices.
Figure 7B:
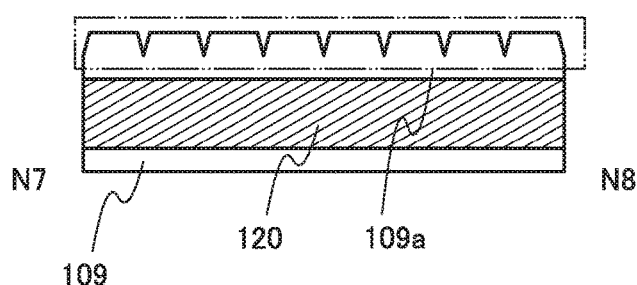

FIG. 7A is a top view of the uneven structure 109a different from that in FIG. 6A, and FIG. 7B is a cross-sectional view along dashed-dotted line N7-N8 in FIG. 7A.

Depressions of the uneven structure 109a in FIG. 7A are narrower than those in FIG. 6A. This contributes to the better appearance of a power storage device.

Figure 7C:
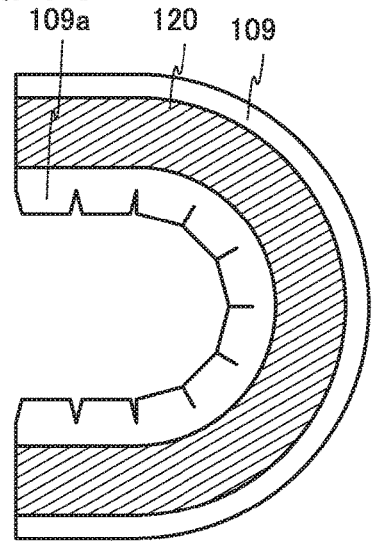

Furthermore, the height of projections of the uneven structure 109a in FIG. 7B is smaller than that of the projections of the uneven structure 109a in FIG. 6B. The smaller height of the projections is preferred because the thickness of a power storage device can be reduced. As shown by the comparison between FIG. 6C and FIG. 7C, the height of projections is preferably larger, in which case the contact area of the two projections increases and the power storage device is more difficult to bend further after the projections come in contact with each other.

The cross-sectional shape of the projection is not limited to a trapezoid and can be any of a variety of shapes, for example, polygons such as quadrangles (e.g., a square and a rectangle), triangles, and pentagons, shapes with curves such as a shape with an arc.

Figure 7D:
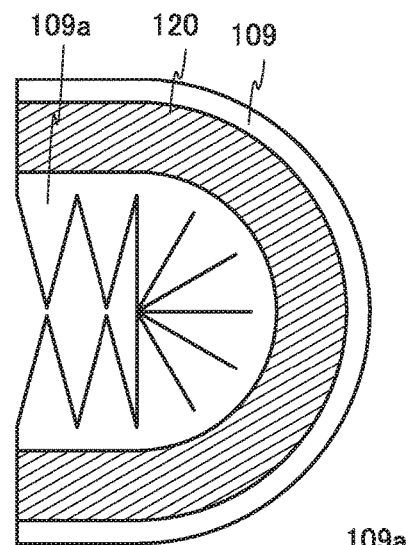
Figure 7E:
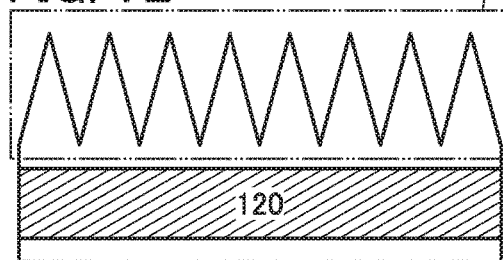

The cross-sectional shape of the projection may be, for example, an isosceles triangle as illustrated in FIGS. 7D and 7E. That is, the first projection and the first isosceles triangle may have the same shape.

Figure 7F:
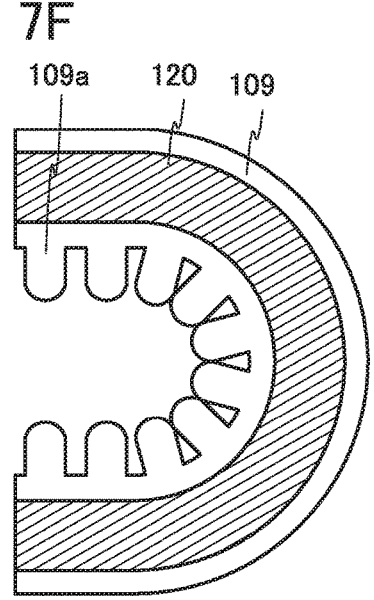
Figure 7G:
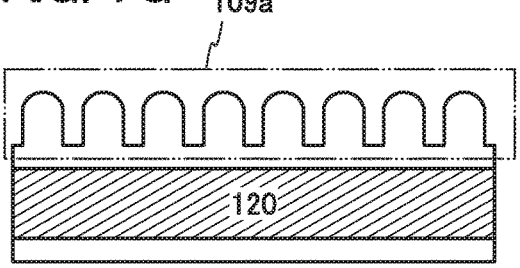

As illustrated in FIGS. 7F and 7G, the cross-sectional shape of the projection may be round.

Figure 8A:
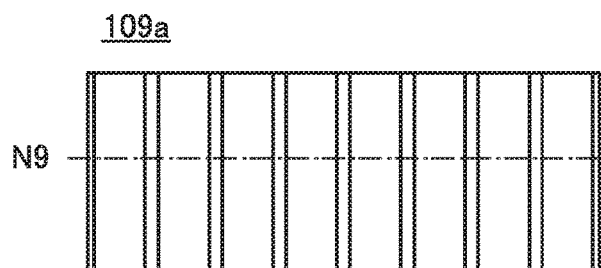
FIGS. 8A to 8E illustrate examples of power storage devices.
Figure 8C:
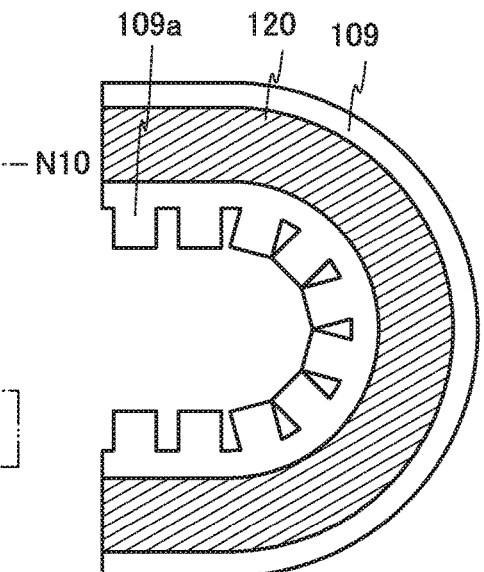
Figure 8B:
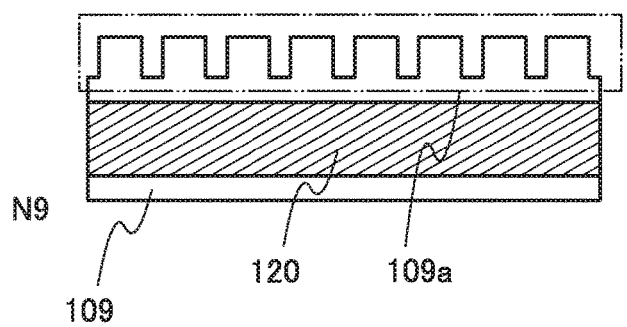

FIG. 8A is a top view of the uneven structure 109a with a shape different from that of the uneven structure 109a illustrated in FIG. 6A, and FIG. 8B is a cross-sectional view along dashed dotted line N9-N10 in FIG. 8A.

In FIG. 7F and FIG. 8C, two adjacent projections are in contact with each other at one or more points.

Figure 8D:
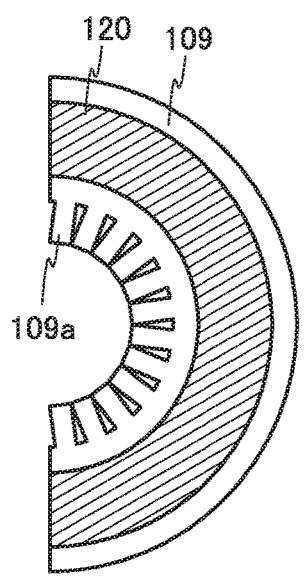

The pitch of the uneven structure 109a in FIG. 8D is narrower than that of the uneven structure 109a in FIG. 8C, and thus a power storage device can be bent more smoothly, which is preferable.

Figure 8E:
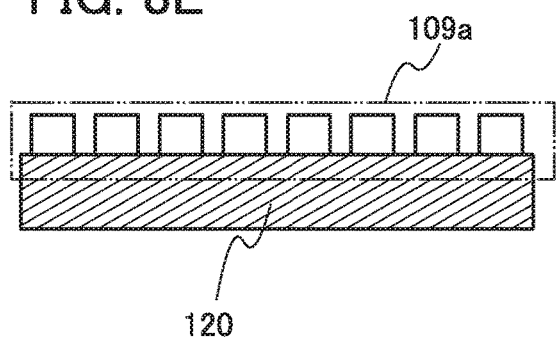

Note that the uneven structure 109a can be provided in contact with a first surface of the battery unit 120 as illustrated in FIG. 8E. That is to say, the shortest distance t from the first surface of the battery unit 120 to the bottom surface of a projection is larger than or equal to 0 µm, for example, preferably larger than or equal to 100 µm and smaller than or equal to 10 mm, more preferably larger than or equal to 500 µm and smaller than or equal to 5 mm, still more preferably larger than or equal to 1 mm and smaller than or equal to 3 mm. When the shortest distance t is smaller, a power storage device can be thinner and more lightweight. When the shortest distance t is larger, a power storage device can be protected more reliably.

It is preferred that the power storage device of one embodiment of the present invention can be reversibly changed in its shape from a first state where two projections are not in contact with each other to a second state where they are in contact with each other. Alternatively, the power storage device may be capable of maintaining the second state when changed in its shape from the first state to the second state.

Note that a member with crystal elasticity can be used instead of the member with rubber elasticity for the power storage device or the like of one embodiment of the present invention in the case where the power storage device or the like does not need to be returned to its original shape after being bent. In one embodiment of the present invention, an uneven structure of a member with crystal elasticity can prevent a power storage device (a battery unit and the like) from being broken by being excessively bent. Thus, the power storage device or the like can be more reliable. Note that crystal elasticity refers to elasticity that does not allow energy to be stored and makes energy be used for plastic deformation. Examples of a member with crystal elasticity include metals.

Although an example where a battery unit is contained in a member with rubber elasticity is described in this embodiment, one embodiment of the present invention is not limited to this example. Examples of other components that can be contained in a member with rubber elasticity include a display unit with a display panel and the like and a light-emitting unit with a light-emitting panel and the like.

As described above, the power storage device of one embodiment of the present invention includes a battery unit, a plurality of projections, and a member with rubber elasticity, and when the power storage device is bent, two adjacent projections come in contact with each other, preventing a user from excessively bending the power storage device. Thus, the power storage device is not easily broken and is highly safe and highly reliable.

A curved power storage device, a flexible power storage device, a power storage device that can be changed in its shape are given as embodiments of the present invention, and one embodiment of the present invention can also be used for power storage devices with various shapes and power storage devices with various levels of hardness. For example, one embodiment of the present invention can be used for a power storage device that is not curved and has a flat shape, a power storage device with a cylindrical shape, a power storage device that is not flexible and cannot be changed in its shape, or the like.

This embodiment can be combined with any of the other embodiments as appropriate.

Embodiment 2

In this embodiment, a light-emitting device of one embodiment of the present invention will be described with reference to FIGS. 9A to 9D to FIGS. 11A to 11F.

Although a light-emitting device with a light-emitting panel will be described as an example in this embodiment, one embodiment of the present invention is not limited to this example. The contents of this embodiment can also be used for a display device with a display panel, for example.

One embodiment of the present invention is a light-emitting device including a light-emitting unit and a member with rubber elasticity. The light-emitting unit includes a light-emitting panel that includes a light-emitting element. The light-emitting unit is contained in the member with rubber elasticity. At least part of the member with rubber elasticity transmits light emitted from the light-emitting element. The member with rubber elasticity is provided with a first projection and a second projection arranged on a first surface of the light-emitting unit. The light-emitting element has a function of emitting light to the second surface side of the light-emitting unit. The first surface and the second surface of the light-emitting unit are opposite to each other. The first projection and the second projection come in contact with each other when the light-emitting device is bent such that the first surface of the light-emitting unit faces inward.

The use of the member with rubber elasticity can protect the light-emitting unit. The member with rubber elasticity has flexibility and thus can protect the light-emitting unit without loss of the flexibility of the light-emitting device using the flexible light-emitting unit. Furthermore, the use of the member with rubber elasticity provided with a plurality of projections can prevent the light-emitting unit from being excessively bent or being bent at a position other than a predetermined position. Applying one embodiment of the present invention in this manner allows the light-emitting device to have high reliability, a high level of safety, and flexibility.

In the light-emitting device of this embodiment, the light-emitting unit is entirely covered with the member with rubber elasticity. This enables the light-emitting device to be less likely to be broken even when repeatedly bent and stretched. Particularly in the case where the member with rubber elasticity is a seamless body, entry of impurities from the outside can be inhibited, so that the light-emitting device can have higher reliability. Furthermore, the use of the member with rubber elasticity that can transmit visible light enables fabrication of the light-emitting device that has favorable display quality.

Furthermore, the light-emitting unit preferably includes a secondary battery. The secondary battery has a function of supplying power to the light-emitting element.

In the light-emitting device of one embodiment of the present invention, the light-emitting panel and the secondary battery can be covered and sealed with the member with rubber elasticity. Thus, the light-emitting device that is highly reliable can be simply obtained.

Furthermore, the light-emitting unit preferably includes a circuit having a function of wirelessly charging a secondary battery. The circuit includes an antenna.

In the light-emitting device of one embodiment of the present invention, a secondary battery can be charged by non-contact power transmission. Therefore, the secondary battery does not need to be taken out from the member with rubber elasticity in charging. This allows the light-emitting unit to be entirely covered with the member with rubber elasticity, further enhancing sealing capability.

The use of the member with rubber elasticity that has high heat resistance enables the light-emitting unit to operate even at high temperatures. In addition, the light-emitting device can be reversibly bent even at high temperatures. In that case, the light-emitting element and the secondary battery preferably have high heat resistance.

Note that in one embodiment of the present invention, at least part of the light-emitting unit has flexibility. For example, the light-emitting panel may have flexibility. Alternatively, the light-emitting panel may have no flexibility and the secondary battery may have flexibility. The layout of the projections of the member with rubber elasticity can be determined in accordance with the region and the position of the flexible portion of the light-emitting unit.

Although the light-emitting unit is entirely covered with the member with rubber elasticity in this embodiment, one embodiment of the present invention is not limited thereto. The member with rubber elasticity can be provided on one or more surfaces of the light-emitting unit.

Specific examples of light-emitting devices of embodiments of the present invention will be described below.

Figure 9A:
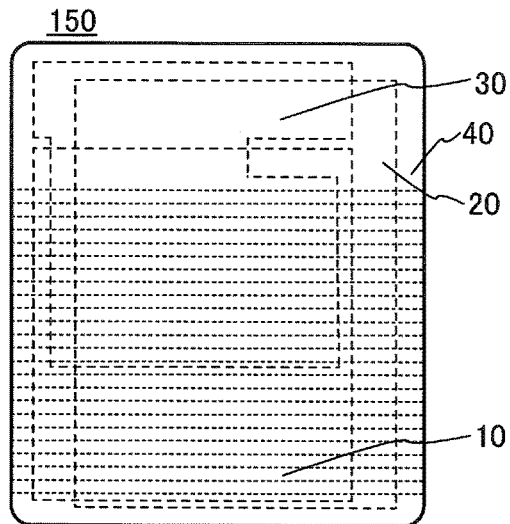
FIGS. 9A to 9D illustrate examples of light-emitting devices.

A light-emitting device 150 illustrated in FIG. 9A includes a light-emitting unit and a member 40 with rubber elasticity. The light-emitting unit is contained in the member 40 with rubber elasticity. In other words, the light-emitting unit is sealed with the member 40 with rubber elasticity. The light-emitting unit includes a light-emitting panel 10, a secondary battery 20, and a circuit 30.

Figure 9B:
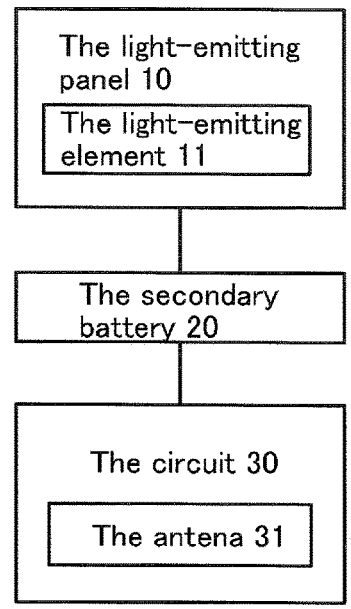

FIG. 9B is a block diagram illustrating an example of the connection relation of the light-emitting unit.

The light-emitting panel 10 includes a light-emitting element 11. The light-emitting element 11 has a function of emitting light with power supplied from the secondary battery 20.

Note that the light-emitting panel 10 may have a function of emitting light with power supplied from a component other than the secondary battery 20.

The secondary battery 20 includes a portion overlapping with the light-emitting panel 10.

Note that the secondary battery 20 may have a function of supplying power to a component other than the light-emitting panel 10.

The secondary battery 20 corresponds to the battery unit 120 described as an example in Embodiment 1, and includes a positive electrode, a negative electrode, a separator, an electrolyte, an exterior body, and the like.

The circuit 30 includes an antenna 31. The antenna 31 includes a portion overlapping with the light-emitting panel 10. The circuit 30 can charge the secondary battery 20 wirelessly (without contact).

Providing at least one of the portion where the light-emitting panel 10 and the circuit 30 overlap with each other and the portion where the light-emitting panel 10 and the secondary battery 20 overlap with each other enables a reduction in size of the light-emitting device 150. In particular, it is preferred that a portion where the light-emitting panel 10, the secondary battery 20, and the circuit 30 overlap with one another is provided.

It is preferred that the secondary battery 20 includes a portion overlapping with the circuit 30. For example, at least part of the antenna 31 may overlap with the secondary battery 20. The light-emitting panel 10, the secondary battery 20, and the circuit 30 preferably overlap with one another such that the user of the light-emitting device hardly perceives the antenna 31, e.g., the antenna 31 is provided between the light-emitting panel 10 and the secondary battery 20, in which case the appearance of the light-emitting device can be maintained. The antenna 31 provided between the light-emitting panel 10 and the secondary battery 20 receives power from an external antenna through the light-emitting panel 10.

In the case where the usage environment of the light-emitting device is determined, a light-emitting element capable of emitting light in the environment and a secondary battery capable of supplying power to the light-emitting panel in the environment are used.

It is preferred that the light-emitting device of one embodiment of the present invention can be used at low temperatures and at high temperatures. The light-emitting device of one embodiment of the present invention can be used in a wide temperature range (e.g., higher than or equal to 0° C. and lower than or equal to 100° C., preferably higher than or equal to −25° C. and lower than or equal to 150° C., more preferably higher than or equal to −50° C. and lower than or equal to 200° C.). The light-emitting device of one embodiment of the present invention can be used either indoors or outdoors.

It is preferred that a light-emitting element of the light-emitting device of one embodiment of the present invention can emit light at both temperatures of 0° C. and 100° C. Furthermore, it is preferred that a secondary battery of the light-emitting device of one embodiment of the present invention can supply power to the light-emitting panel at both temperatures of 0° C. and 100° C.

Figure 9C:
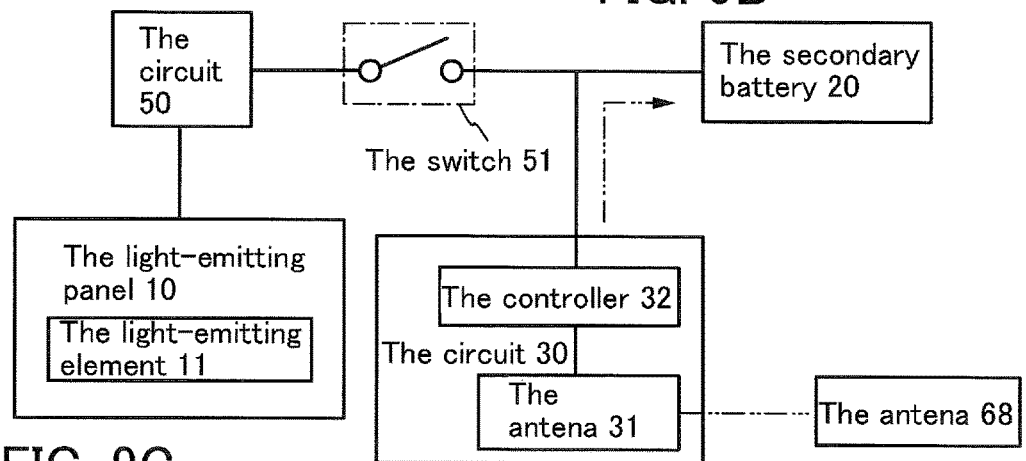
Figure 9D:
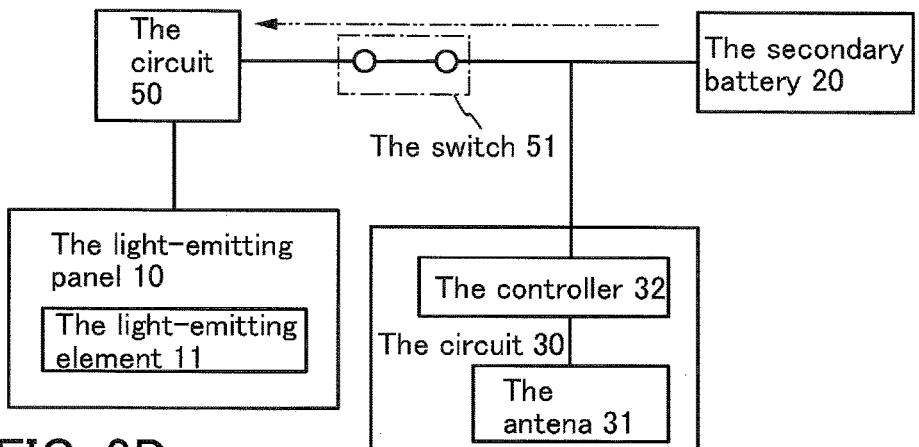

The light-emitting device may include a switch. In FIGS. 9C and 9D, the light-emitting panel 10, the secondary battery 20, the circuit 30, a circuit 50, and a switch 51 are illustrated as components of a light-emitting unit.

As illustrated in FIG. 9C, the circuit 30 can charge the secondary battery 20 wirelessly when the switch 51 is off.

As illustrated in FIG. 9D, the secondary battery 20 can supply power to the light-emitting panel 10 when the switch 51 is on.

Components of the light-emitting device of one embodiment of the present invention will be described in detail below.

<Light-Emitting Panel 10>

The light-emitting panel 10 includes the light-emitting element 11. The light-emitting panel may include a sensing element such as a touch sensor. Structural examples of the light-emitting panel 10 will be detailed in Embodiment 6.

In the light-emitting panel 10, an active matrix method in which an active element (a non-linear element) is included in a pixel or a passive matrix method in which an active element is not included in a pixel can be used.

The light-emitting panel 10 may be flexible. For example, when a film is used for at least one of a supporting substrate and a sealing substrate of the light-emitting element 11, the flexibility of the light-emitting panel 10 can be increased.

It is preferred that an element capable of emitting light at low temperatures and at high temperatures is used as the light-emitting element 11. The range of low temperatures is, for example, higher than or equal to −100° C. and lower than or equal to 0° C., preferably higher than or equal to −100° C. and lower than or equal to −25° C., more preferably higher than or equal to −100° C. and lower than or equal to −50° C. The range of high temperatures is, for example, higher than or equal to 100° C. and lower than or equal to 300° C., preferably higher than or equal to 150° C. and lower than or equal to 300° C., more preferably higher than or equal to 200° C. and lower than or equal to 300° C. Note that the light-emitting element 11 can emit light at higher than 0° C. and lower than 100° C., in addition to at low temperatures and at high temperatures. For example, the light-emitting element 11 can emit light at a room temperature (higher than or equal to 20° C. and lower than or equal to 30° C.).

As the light-emitting element 11, a self-luminous element can be used, and an element whose luminance is controlled by current or voltage is included in the category of the light-emitting element 11. For example, a light-emitting diode (LED), an organic EL element, an inorganic EL element, or the like can be used. A display element can be used without limitation to the light-emitting element.

It is preferred that the heat resistance of the light-emitting element 11 is as high as possible. For example, in the case where an organic EL element is used as the light-emitting element 11, the glass transition temperature of each of organic compounds contained in the organic EL element is preferably higher than or equal to 100° C. and lower than or equal to 300° C., more preferably higher than or equal to 150° C. and lower than or equal to 300° C.

It is preferred that since an antenna receives power from an external antenna through a light-emitting panel in the light-emitting device of one embodiment of the present invention, the thickness of a pair of electrodes in the light-emitting element 11 is as small as possible. For example, the total thickness of the pair of electrodes is less than or equal to 1 μm, preferably less than or equal to 500 nm, more preferably less than or equal to 350 nm, still more preferably less than or equal to 250 nm.

<Secondary Battery 20>

As examples of the secondary battery 20, a lithium-ion secondary battery such as a lithium polymer battery (lithium-ion polymer battery) using a gel electrolyte, a lithium-ion battery, a nickel-hydride battery, a nickel-cadmium battery, an organic radical battery, a lead storage battery, an air secondary battery, a nickel-zinc battery, and a silver-zinc battery can be given.

A lithium-ion secondary battery which achieves a high energy density is preferably used because the light-emitting device can be lightweight and small.

For example, a secondary battery containing a nonaqueous electrolyte can be used. The nonaqueous electrolyte contains an ionic liquid (room temperature molten salt) and an alkali metal salt. A secondary battery with high heat resistance can be obtained because the ionic liquid has non-flammability and non-volatility.

A secondary battery using a gel electrolyte and an all-solid-state secondary battery using a solid electrolyte are preferable because the heat resistance and the level of safety are high.

As the secondary battery 20, any of secondary batteries with a variety of shapes, such as a coin-type (single-layer flat type) secondary battery, a cylindrical secondary battery, a thin secondary battery, a square-type secondary battery, and a sealed secondary battery can be used. Furthermore, a structure in which a plurality of positive electrodes, a plurality of negative electrodes, and a plurality of separators are stacked or a structure in which a positive electrode, a negative electrode, and a separator are wound (winding structure) may be employed.

The secondary battery 20 may be flexible. For example, when a film is used as an exterior body, the flexibility of the secondary battery 20 can be increased. In a region surrounded by the exterior body, at least a positive electrode, a negative electrode, and an electrolyte (or an electrolytic solution) are provided.

In the light-emitting device, the light-emitting element 11 and the secondary battery 20 may be provided to overlap with each other. As the area where the light-emitting element 11 and the secondary battery 20 overlap with each other is larger, the secondary battery 20 can be made warm in a wider area by utilizing heat of the light-emitting element 11. The reliability of the light-emitting device can be increased even in the case where a secondary battery which operates more hardly at low temperatures than at high temperatures is used.

Structural examples of the secondary battery 20 will be detailed in Embodiment 4.

<Circuit 30>

The circuit 30 includes the antenna 31. The circuit 30 may include a controller 32.

The antenna 31 can receive power from an external antenna (e.g., an antenna 68 of a charger). The antenna 31 may receive power from an external antenna through the light-emitting panel 10. Alternatively, the antenna 31 may receive power from an external antenna through the secondary battery 20.

The controller 32 has a function of converting power received with the antenna 31 into power to be supplied to the secondary battery 20 and outputting the power to the secondary battery 20. For example, the controller 32 may function as an AC-DC converter. In that case, the controller 32 converts power received with the antenna 31 into DC power and outputs the DC power to the secondary battery 20.

The light-emitting device of one embodiment of the present invention is charged in the following manner: by an electromagnetic induction method in which the antenna 68 of a charger (primary coil) and the antenna 31 of the light-emitting device (secondary coil) are magnetically coupled and a voltage is generated at the secondary coil with an alternating magnetic field generated from the primary coil, power is transmitted to the secondary coil side without contact. Note that the power receiving method is not limited to an electromagnetic induction method.

The uses for the antenna of the light-emitting device are not limited to charging of a secondary battery without contact. For example, the light-emitting device may be provided with an antenna and a memory between which electronic data is transmitted and received. The light-emitting panel 10 may display an image, data, or the like in accordance with the received data. An antenna having a GPS function with which location information or GPS time can be obtained may be provided.

It is preferable for safety that input-output terminals for charging or discharging a secondary battery be not exposed on a surface of the light-emitting device. In the case where the input-output terminals are exposed, the input-output terminals might short-circuit by water such as rain, or the input-output terminals might be in contact with a human body and cause an electric shock. The use of the antenna 31 enables a structure in which the input-output terminals are not exposed on a surface of the light-emitting device because the secondary battery can be charged without contact.

<Member 40 with Rubber Elasticity>

In the member 40 with rubber elasticity, a light-emitting unit including the light-emitting panel 10, the secondary battery 20, the circuit 30, and the like is contained. The light-emitting unit is sealed with the member 40 with rubber elasticity and is isolated from the air outside the light-emitting device. For the member with rubber elasticity, Embodiment 1 can also be referred to.

<Circuit 50>

The circuit 50 has a function of converting power supplied from the secondary battery 20 into power which makes the light-emitting element 11 emit light. For example, the circuit 50 may have a function of converting (stepping up or stepping down) the output voltage of the secondary battery 20 into a voltage which makes the light-emitting element 11 emit light.

The circuit 50 may have a function of controlling timing when the light-emitting element 11 emits light. For example, the circuit 50 may have a function of driving the light-emitting element 11 such that the light-emitting element 11 blinks.

The circuit 50 may have a function of generating a signal for driving the light-emitting panel 10 and outputting the signal to the light-emitting panel 10. The circuit 50 may include a signal line driver circuit or a scan line driver circuit. The light-emitting panel 10 may include a signal line driver circuit or a scan line driver circuit.

<Switch 51>

The switch 51 is electrically connected to the circuit 50. The switch 51 is also electrically connected to the secondary battery 20. The switch 51 is also electrically connected to the circuit 30.

There is no particular limitation on the switch 51. For example, an electrical switch, a mechanical switch, or the like can be used. Specifically, a transistor, a diode, a magnetic switch, a mechanical contact switch, or the like can be used.

Figure 10A:
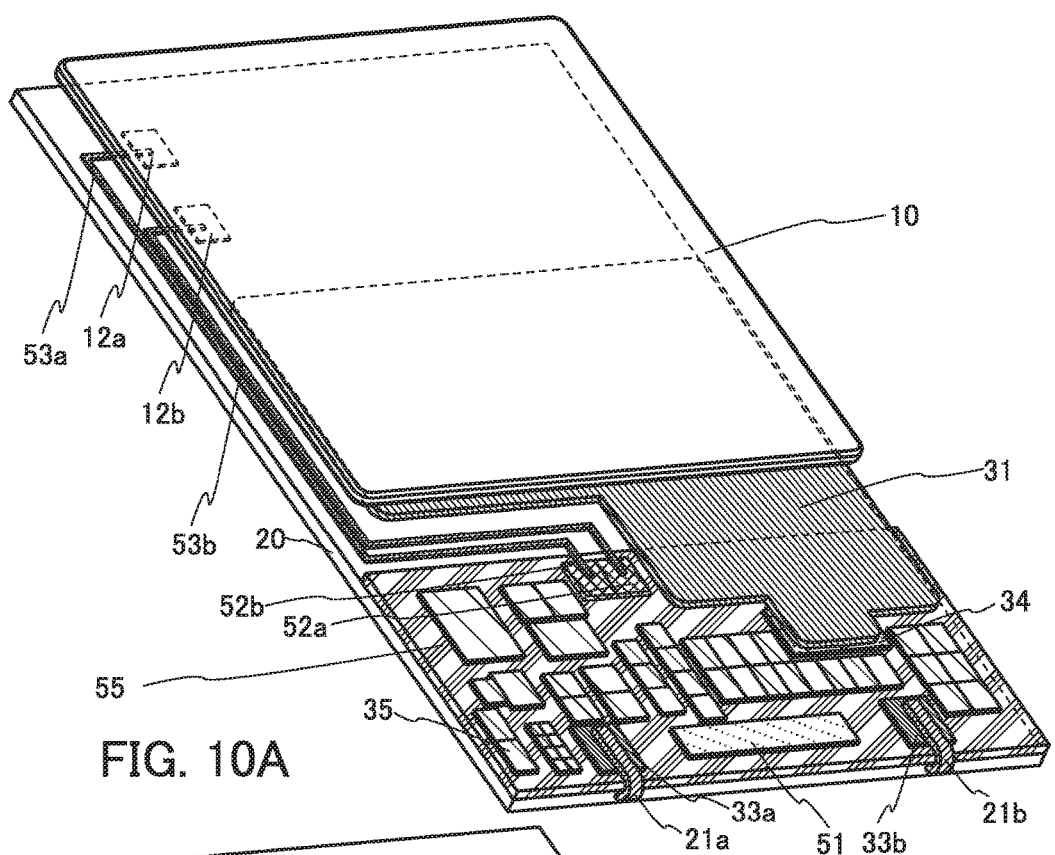
FIGS. 10A and 10B illustrate examples of light-emitting devices.
Figure 10B:
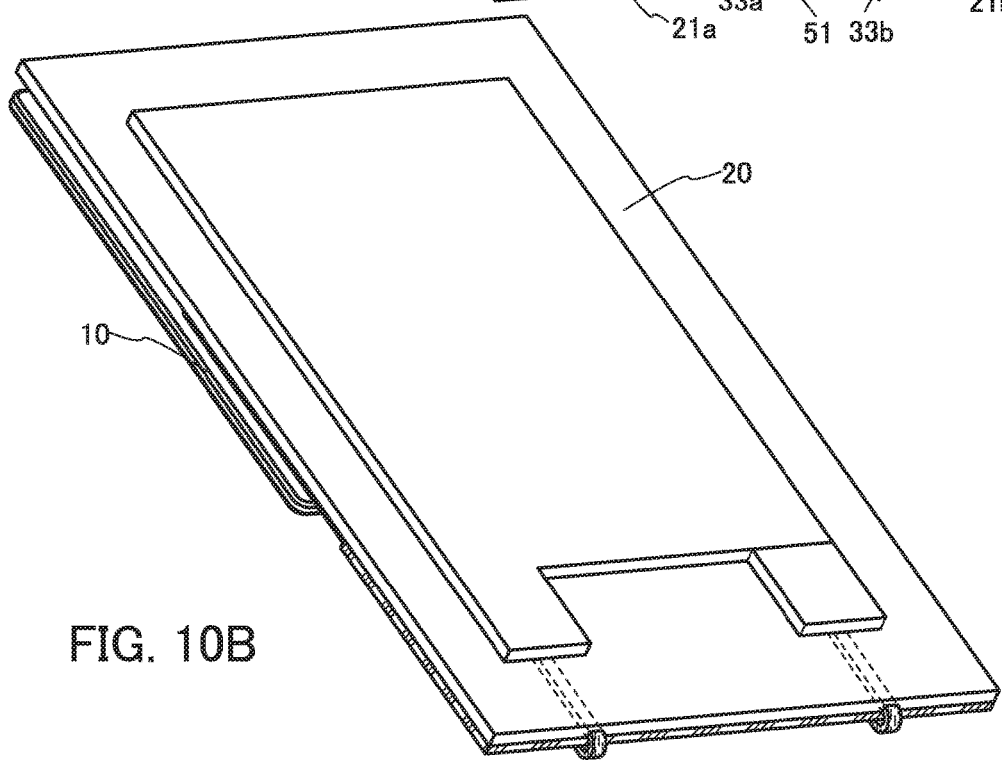

FIGS. 10A and 10B illustrate a specific example of the light-emitting unit. FIG. 10A illustrates the front side (light-emitting side) of the light-emitting unit, and FIG. 10B illustrates the back side of the light-emitting unit.

FIGS. 10A and 10B illustrate an example where a laminated secondary battery is used as the secondary battery 20. As illustrated in FIG. 10B, the central portion of the secondary battery 20 is a portion where a plurality of electrodes are stacked and has a larger thickness than an end portion.

An electrode 21a is electrically connected to one of a positive electrode and a negative electrode of the secondary battery. An electrode 21b is electrically connected to the other of the positive electrode and the negative electrode of the secondary battery.

The electrodes 21a and 21b are each bent so as to sandwich the circuit board 55 and are electrically connected to terminals 33a and 33b, respectively, over the circuit board 55.

The circuit board 55 is provided with elements (shown as electronic components 35) included in the circuit 30, the circuit 50, and the like illustrated in FIG. 9C and the like. The circuit board 55 is provided with electronic components, for example, a capacitor, a resistor, or a switching element. As the circuit board 55, a printed circuit board can be used, for example.

The circuit board 55 is provided with the switch 51. FIGS. 10A and 10B illustrate an example where a magnetic switch is used as the switch 51. By attaching or detaching the magnet, the on/off state of the switch can be switched.

The antenna 31 is electrically connected to a terminal 34 over the circuit board 55. Part of the antenna 31 is positioned between the secondary battery 20 and the light-emitting panel 10. That is, in the light-emitting device, the antenna 31 includes a portion overlapping with the light-emitting panel 10. Furthermore, the antenna 31 includes a portion overlapping with the secondary battery 20.

The antenna 31 can receive power from an external antenna through the light-emitting panel 10.

In the light-emitting panel 10, a terminal 12a is electrically connected to one of an anode and a cathode of the light-emitting element 11. A terminal 12b is electrically connected to the other of the anode and the cathode of the light-emitting element 11. The terminals 12a and 12b may each function as the anode or the cathode of the light-emitting element 11.

The terminal 12a is electrically connected to a terminal 52a over the circuit board 55 through a wiring 53a. The terminal 12b is electrically connected to a terminal 52b over the circuit board 55 through a wiring 53b.

In the light-emitting device of one embodiment of the present invention, the secondary battery and the antenna each independently includes a portion overlapping with the light-emitting panel. Furthermore, the secondary battery and the circuit partly overlap with each other. As illustrated in FIGS. 10A and 10B, part of the antenna may be positioned between the light-emitting panel and the secondary battery, for example.

When at least two of components of the light-emitting device, e.g., the secondary battery, the light-emitting panel, the circuit board, and the antenna, partly overlap with each other as described above, the size of the light-emitting device can be reduced, which is preferable.

For example, the secondary battery 20 preferably includes a portion overlapping with at least one of the light-emitting panel 10, the circuit board 55, and the antenna 31. It is particularly preferred that the secondary battery 20 includes respective portions overlapping with the light-emitting panel 10, the circuit board 55, and the antenna 31 as illustrated in FIGS. 10A and 10B.

An environment where the light-emitting device of one embodiment of the present invention can be used is not limited to an air atmosphere. The light-emitting device of one embodiment of the present invention can be used in water at temperatures of higher than or equal to 0° C. and lower than or equal to 100° C., for example. The light-emitting device of one embodiment of the present invention can have high reliability even when used in water since the light-emitting element and the secondary battery can be used in a wide temperature range and are sealed by a member with rubber elasticity, for example.

FIGS. 11A to 11F are each a schematic cross-sectional view of a light-emitting device of one embodiment of the present invention.

As illustrated in FIGS. 11A to 11F, the light-emitting panel 10, the secondary battery 20, and the circuit 30 are contained in the member 40 with rubber elasticity in the light-emitting device. Although the light-emitting panel 10, the secondary battery 20, and the circuit 30 are illustrated to have substantially equal thicknesses for simplicity in FIGS. 11A to 11F, they may have different thicknesses.

A space sealed by the member 40 with rubber elasticity is preferably in a reduced-pressure atmosphere or an inert atmosphere. By such an atmosphere, the reliability of the light-emitting panel 10 or the like can be increased compared with an air atmosphere.

The member 40 with rubber elasticity can transmit light emitted from a light-emitting element of the light-emitting panel 10. The user can perceive the light-emitting panel 10, the secondary battery 20, and the circuit 30 through the member 40 with rubber elasticity.

Figure 11A:
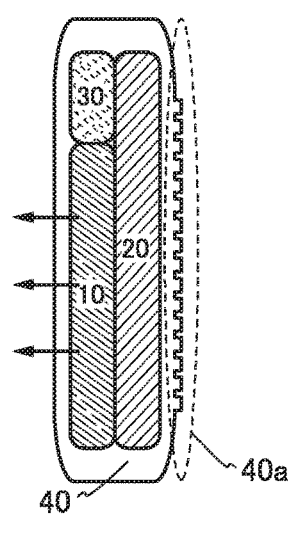
FIGS. 11A to 11F illustrate examples of light-emitting devices.
Figure 11B:
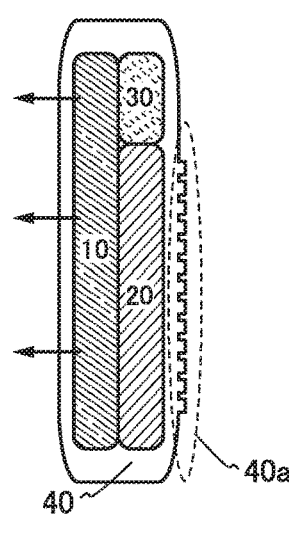

Although FIG. 11A illustrates an example where the secondary battery 20 and the light-emitting panel 10 overlap with each other and the secondary battery 20 and the circuit 30 overlap with each other when seen from a light-emitting surface of the light-emitting device, the light-emitting panel 10 and the circuit 30 may overlap with each other as illustrated in FIG. 11B. Instead of the circuit 30, the circuit board 55 illustrated in FIG. 10A may be provided.

The number of each of the light-emitting panels 10, the secondary batteries 20, and the circuits 30 of the light-emitting device is not limited to one, and may be two or more.

The uneven structure 40a is provided on the back side of the light-emitting surface of the light-emitting device.

Figure 11C:
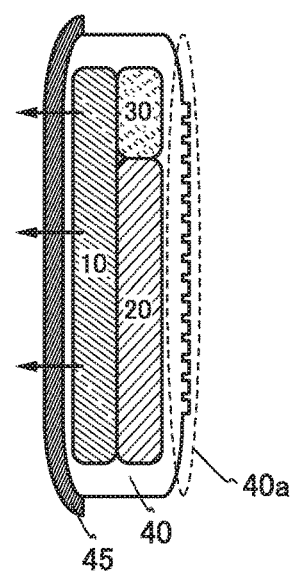

The light-emitting device may be provided with a touch panel. For example, as illustrated in FIG. 11C, a touch panel 45 may be provided on the member 40 with rubber elasticity. For example, a capacitive touch panel may be provided. Light emitted by the light-emitting element is extracted to the outside through a sensing element of the touch panel 45.

Figure 11D:
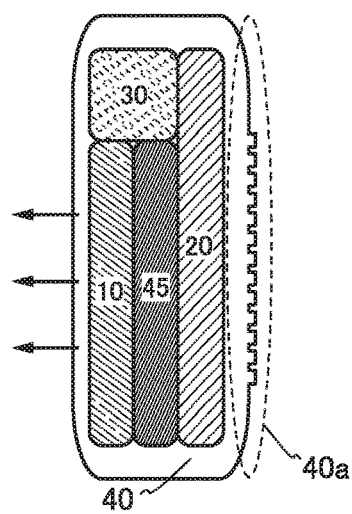

Alternatively, the light-emitting unit may be provided with a touch panel. For example, as illustrated in FIG. 11D, the touch panel 45 may be provided at the back of the light-emitting panel 10 when seen from the light-emitting surface, in which case the touch panel 45 does not need to transmit light emitted by the light-emitting element. Although the touch panel 45 is provided between the light-emitting panel 10 and the secondary battery 20 in FIG. 11D, the secondary battery 20 may be provided between the light-emitting panel 10 and the touch panel 45. For example, a pressure-sensitive touch panel may be provided.

Figure 11E:
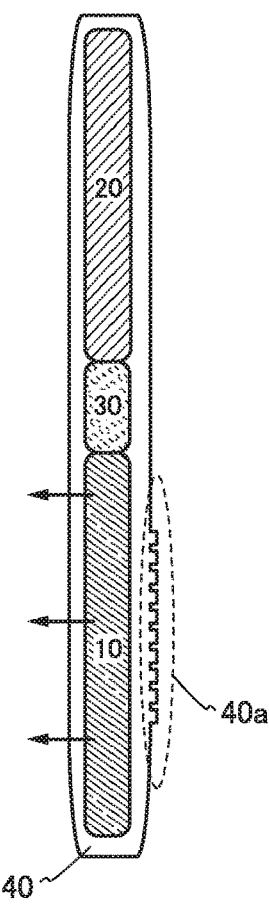
Figure 11F:
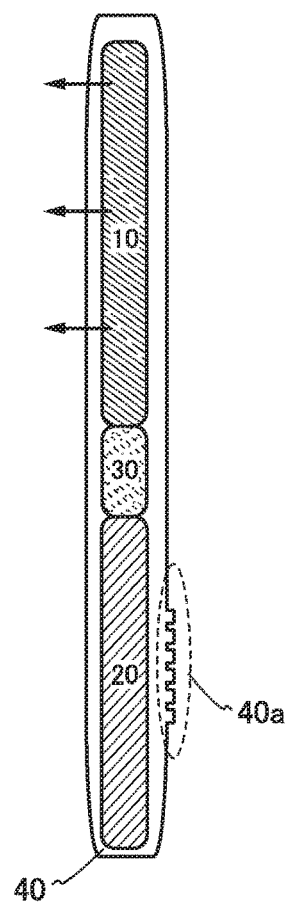

Alternatively, the uneven structure 40a may be provided so as to overlap with only one of the light-emitting panel 10 and the secondary battery 20. FIG. 11E illustrates an example where the light-emitting panel 10 and the uneven structure 40a overlap with each other, and FIG. 11F illustrates an example where the secondary battery 20 and the uneven structure 40a overlap with each other.

Note that the light-emitting device of one embodiment of the present invention may be used as a display device or as a lighting device. For example, the light-emitting device may be used as a light source such as a backlight or a front light, i.e., a lighting device for a display device.

The light-emitting device of one embodiment of the present invention may include another semiconductor circuit, e.g., a control circuit for preventing overcharge, an imaging element, a sensor such as a gyroscope sensor or an acceleration sensor, a touch panel, or the like. For example, when an imaging element is included, a taken image can be displayed on the light-emitting panel. When a touch panel is included, the electronic device can be operated or information can be input by touching a predetermined position of the touch panel. When a memory or a CPU is included, a computer which can be used in a wide temperature range can be provided.

The light-emitting device of one embodiment of the present invention may be provided with a belt or a clasp so as to be fixed to an arm or a wrist of a human body or a robot. A part on which the light-emitting device is worn is not particularly limited, and the light-emitting device may be worn on any part of a human body or a robot such as a waist or an ankle.

The light-emitting device of one embodiment of the present invention includes a secondary battery and can be used in a wide temperature range, for example; thus, it can be preferably used as a portable light-emitting device.

This embodiment can be combined with any of the other embodiments as appropriate.

Embodiment 3

In this embodiment, a method for fabricating the power storage device of one embodiment of the present invention will be described.

In this embodiment, an example where the power storage device of one embodiment of the present invention is fabricated will be described, and the light-emitting device, the display device, or the like of one embodiment of the present invention can be fabricated by a similar method. Furthermore, a method for fabricating the power storage device, the light-emitting device, the display device, or the like of one embodiment of the present invention is not limited to the method described as an example in this embodiment.

The case where a power storage device provided with uneven structures on two opposite surfaces that is similar to the power storage device 110 (see FIG. 2A and the like) described as an example in Embodiment 1 is fabricated will be described below as an example. The power storage device described in this embodiment can be easily fabricated at low cost because the fabrication can be performed in the air without complicated facilities.

Example 1 of Fabrication Method for Power Storage Device

Figure 12A:
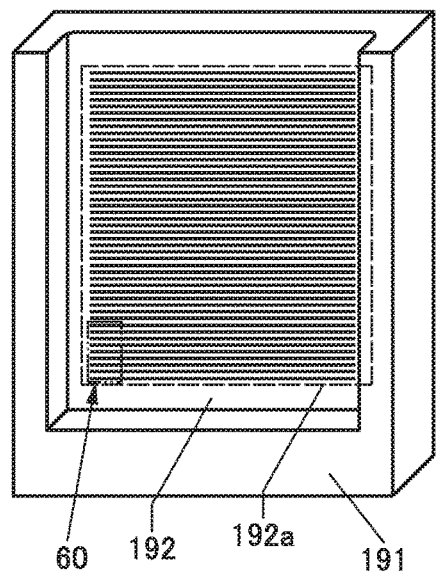
FIGS. 12A to 12D illustrate an example of a method for fabricating a power storage device.
Figure 12B:
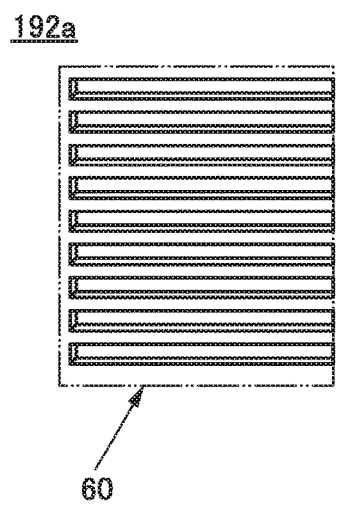

First, FIG. 12A illustrates a structure body 191 used for fabrication of a power storage device. FIG. 12B is an enlarged view of a region 60 illustrated in FIG. 12A.

The structure body 191 has a depression 192. The surface of the depression 192 is preferably polished to a mirror-smooth state to have improved planarity. The depression 192 is provided with an uneven structure 192*a*.

The depths, widths, and interval length of depressions of the uneven structure 192*a* can be determined in accordance with the heights, widths, and interval length of projections of the uneven structure to be formed on a member with rubber elasticity. Note that the depths, widths, and interval lengths of all the depressions can be either equal to or different from each other. For example, in the case where the battery unit 120 has both a portion resistant to bending stress and a portion susceptible to bending damage, the sizes and interval lengths of depressions are varied between the portions so that the portion susceptible to bending damage is prevented from being bent so much and the portion resistant to bending stress can be bent with an acute angle.

Note that the uneven structure 192*a* is not limited to the structure with a plurality of depressions. The uneven structure 192*a* may include a plurality of projections. In that case, the member with rubber elasticity can be provided with a plurality of depressions corresponding to the plurality of projections.

For example, a metallic mold can be used as the structure body 191. A material used for the structure body 191 is not limited to metal. For example, a material such as glass, ceramic, an organic resin, or wood may be used for the structure body 191.

Figure 12C:
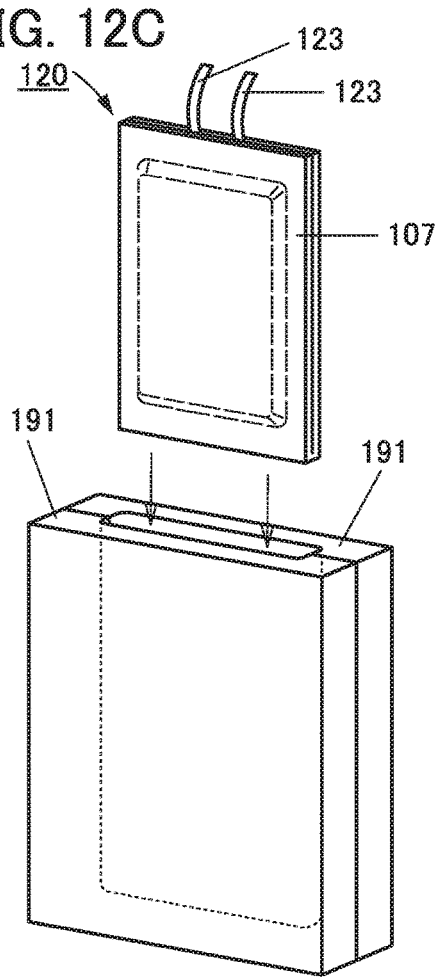

In fabricating a power storage device, two structure bodies 191 are made to overlap with each other such that the depressions 192 face each other as illustrated in FIG. 12C. Next, the battery unit 120 is disposed in a space surrounded by the two depressions 192.

Although two structure bodies 191 are used in FIG. 12C, one embodiment of the present invention is not limited to this example. Two structure bodies with different shapes may be used. The depressions 192 of the two structure bodies can have either the same shape or different shapes, for example. Furthermore, the uneven structures 192*a* of the two structure bodies can have either the same shape or different shapes. Note that the use of a structure body provided with the uneven structure 192*a* on the depression 192 and a structure body with the flat depression 192 enables formation of the uneven structure on only one surface of the power storage device. Thus, for example, the power storage device 100 in FIG. 1A and the like can be fabricated.

Figure 12D:
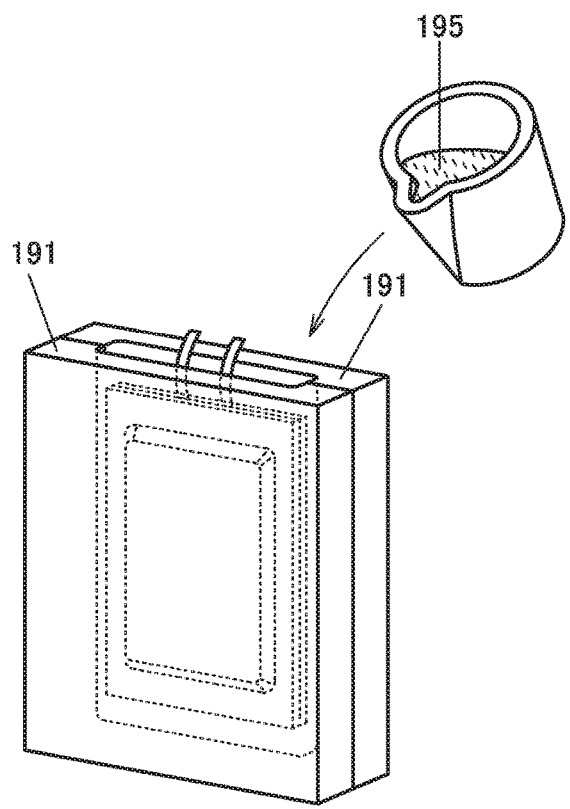

Part of the battery unit 120 may be exposed to the outside of the space surrounded by the two depressions 192. FIG. 12D illustrates an example where electrode leads 123 (a positive electrode lead and a negative electrode lead) of the battery unit 120 are exposed to the outside of the space surrounded by the two depressions 192. Furthermore, part of an exterior body and the like may be exposed. Furthermore, the whole battery unit 120 may be located inside the space surrounded by the two depressions 192. For example, the whole light-emitting unit is disposed inside the space surrounded by the two depressions 192, whereby the light-emitting device 150 (see FIG. 9A and the like) can be fabricated.

Next, the space surrounded by the two depressions 192 is filled with a liquid filler 195. As the filler 195, for example, a high molecular material can be used. The filler 195 may exhibit a light transmitting property after being cured. As the filler 195, a single-component-type material that does not need a curing agent or a two-component-type material that is cured by mixing a main agent and a curing agent can be used, for example. Alternatively, a material that is cured by heating, irradiation with light such as ultraviolet light can be used. The filler 195 may include a desiccant that inhibits passage of moisture.

In this embodiment, a two-component-type material that becomes light-transmitting silicone rubber after being cured is used as the filler 195.

The filler 195 is cured so as to reflect the shape of the two depressions 192, whereby the member 109 with rubber elasticity can be formed. After the formation of the member 109 with rubber elasticity, the two structure bodies 191 are separated. Note that it is preferable to apply a remover onto surfaces of the depressions 192 before the space is filled with the filler 195, in which case the member 109 with rubber elasticity can be separated easily from the structure bodies 191.

Example 2 of Fabrication Method for Power Storage Device

Next, a method for fabricating a power storage device such that the thickness t1 and the thickness t2 of the member 109 with rubber elasticity are equal to each other will be described.

First, spacers 165 are disposed on the side surfaces of the battery unit 120.

Figure 13A:
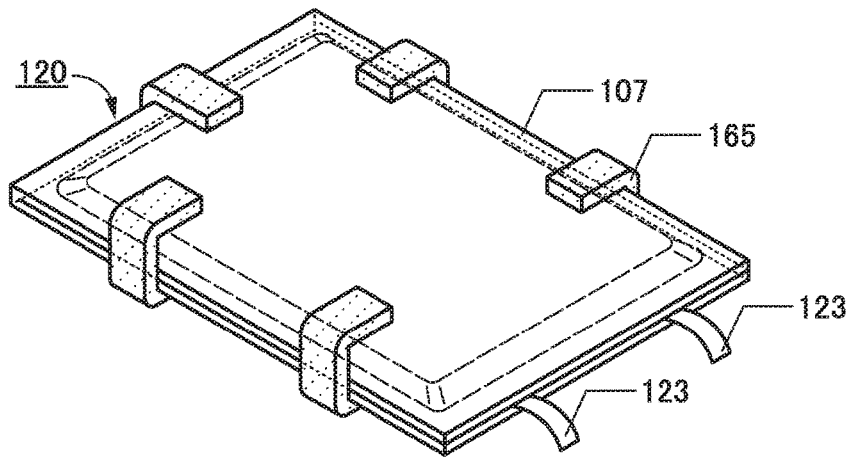
FIGS. 13A to 13E illustrate examples of methods for fabricating power storage devices.
Figure 13B:
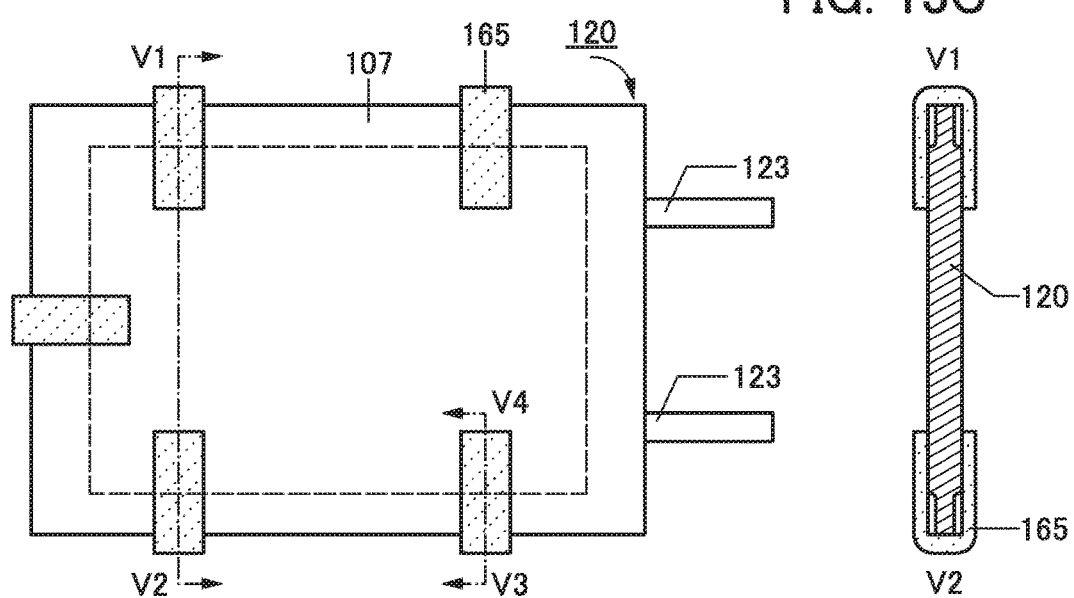
Figure 13C:
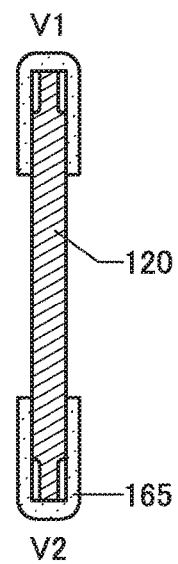

FIG. 13A is a perspective view of the battery unit 120 provided with the spacers 165, and FIG. 13B is a top view thereof. FIG. 13C is a cross-sectional view along dashed-dotted line V1-V2 in FIG. 13B, and FIG. 13D is a cross-sectional view along dashed-dotted line V3-V4 in FIG. 13B.

FIGS. 13A to 13C illustrate an example where the spacers 165 each having a U-shaped cross section are provided on three side surfaces of the battery unit 120. Specifically, the spacer 165 is provided such that side surfaces of the battery unit 120 fit into a depression of the spacer 165.

Figure 13D:
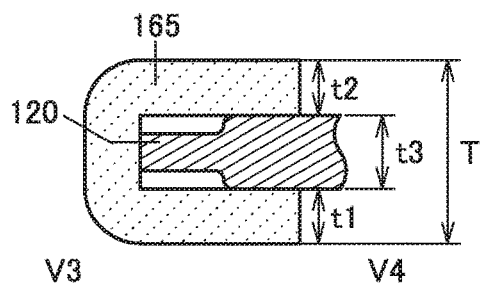

The thickness t1 of a portion of the spacer 165 that extends along one surface of the battery unit 120 is preferably equal to the thickness t2 of a portion of the spacer 165 that extends along the other surface of the battery unit 120 (FIG. 13D). Here, the one surface and the other surface of the battery unit 120 are opposite to each other. Note that the thickness t1 and the thickness t2 can be different from each other according to the purpose, for example, in the case where the direction in which the battery unit 120 is bent is determined.

The sum of the thickness t1, the thickness t2, and a thickness t3, which is the thickness of the battery unit 120, is referred to as a thickness T. Here, the thickness t3 of the battery unit 120 can be, for example, the maximum thickness of the battery unit 120. Alternatively, the thickness t3 of the battery unit 120 can be, for example, the average of the thicknesses of a region of the battery unit 120 in which the battery unit 120 is in contact with the spacer 165. Alternatively, the thickness T can depend on the position on the battery unit 120.

Figure 13E:
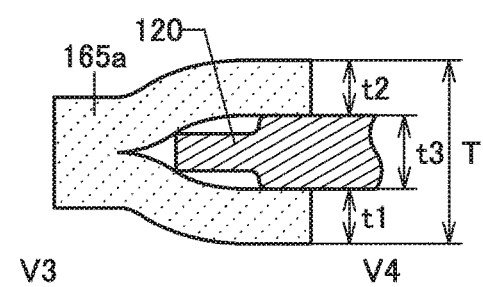

The cross-sectional shape of the spacer 165 is not limited to a U shape. For example, as illustrated in FIG. 13E, a spacer 165a having a Y-shaped cross section may be used instead of the spacer 165 having a U-shaped cross section.

One or more spacers 165 are preferably disposed for at least three sides of the battery unit 120. FIGS. 13A and 13B illustrate an example in which the plurality of spacers 165 are disposed for two longer sides of the battery unit 120 and one spacer is disposed for one shorter side; however, one embodiment of the present invention is not limited to this example. For example, the spacers 165 may be disposed for four sides of the battery unit 120.

Figure 14A:
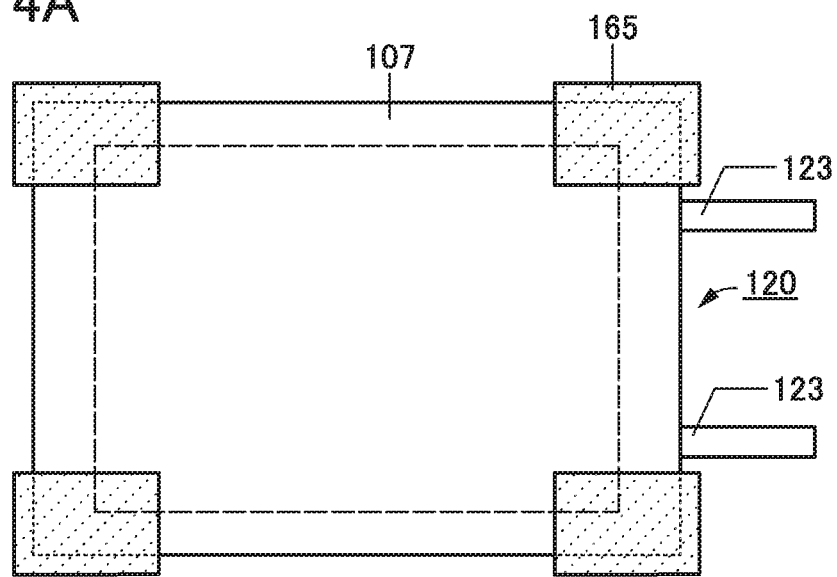
FIGS. 14A and 14B illustrate examples of methods for fabricating power storage devices.
Figure 14B:
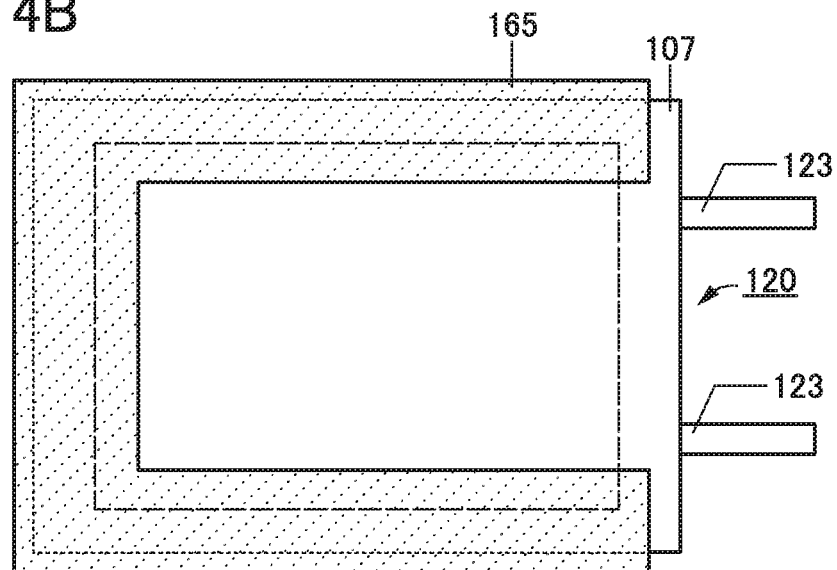

Alternatively, the spacers 165 may be disposed at four corners of the battery unit 120 as illustrated in FIG. 14A. Alternatively, part or the whole of each of three sides of the battery unit 120 may be covered with the spacer 165 as illustrated in FIG. 14B.

Figure 15A:
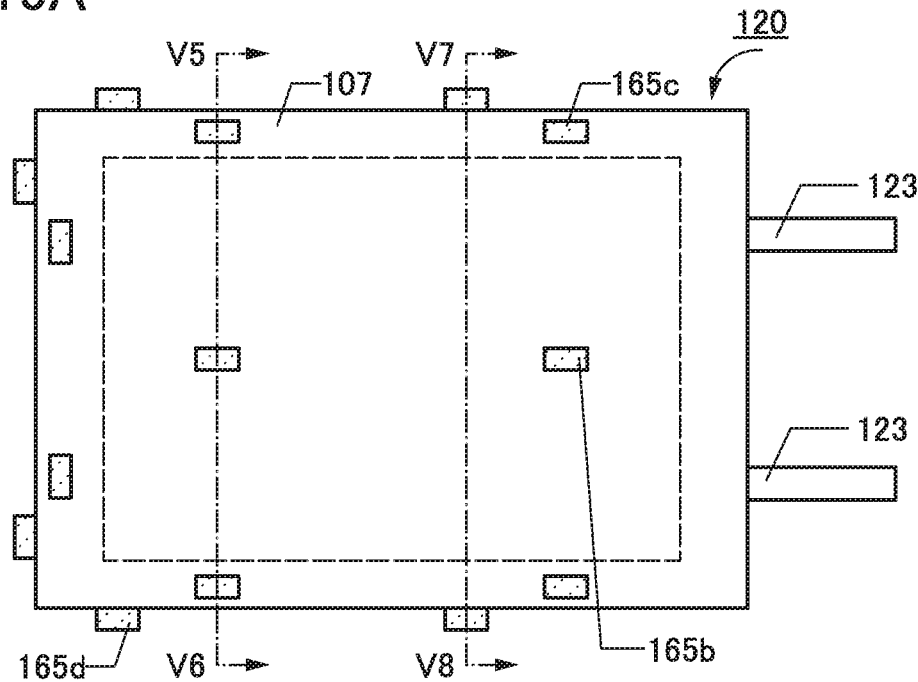
FIGS. 15A to 15C illustrate an example of a method for fabricating a power storage device.
Figure 15B:
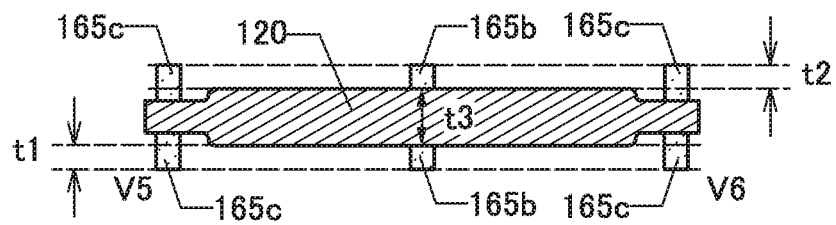
Figure 15C:

Alternatively, rectangular-solid spacers 165b, 165c, and 165d may be provided on the battery unit 120 as illustrated in FIGS. 15A to 15C. FIG. 15A is a top view of the battery unit 120 provided with the spacers 165b, 165c, and 165d. FIG. 15B is a cross-sectional view along dashed dotted line V5-V6 in FIG. 15A, and FIG. 15C is a cross-sectional view along dashed dotted line V7-V8 in FIG. 15A. The spacer 165b and the spacer 165c disposed on the same plane of the battery unit 120 have different thicknesses. In FIG. 15B, the thicknesses of the spacers 165b disposed on a thickest region (a region with the thickness t3) of the battery unit 120 are the thickness t1 and the thickness t2. The thickness of the spacer 165c disposed on the same surface as the spacer 165b with the thickness t1 is larger than the thickness t1. The thickness of the spacer 165c disposed on the same surface as the spacer 165b with the thickness t2 is larger than the thickness t2. The thickness of the spacer 165d is preferably smaller than or equal to the thickness T. The width of the spacer 165d (the length in the direction along V7-V8) is not limited and can be determined as appropriate. For example, as the width of the spacer 165d is smaller, a power storage device can have a smaller size, whereas as the width of the spacer 165d is larger, a power storage device can have higher reliability.

Subsequently, the structure bodies 191 are made to overlap with each other, and the battery unit 120 provided with the spacers is disposed in a space surrounded by the depressions 192. At this time, it is necessary to be careful to prevent the battery unit 120 provided with the spacers from protruding from the edge of the depression of the structure body.

Figure 16A:
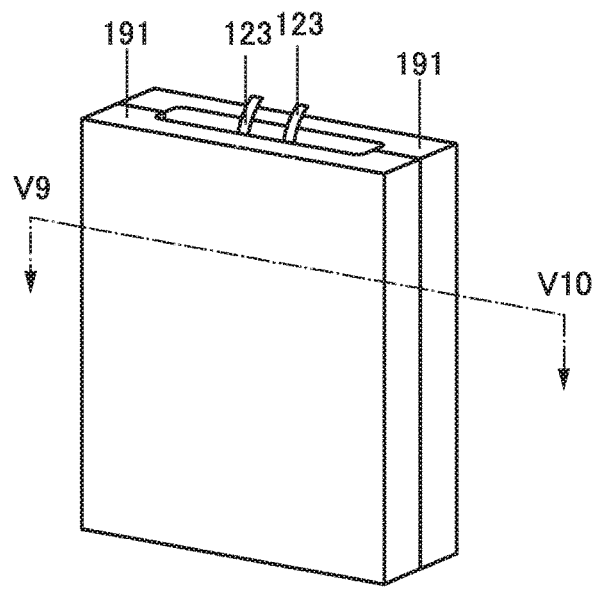
FIGS. 16A to 16C illustrate examples of methods for fabricating power storage devices.
Figure 16B:
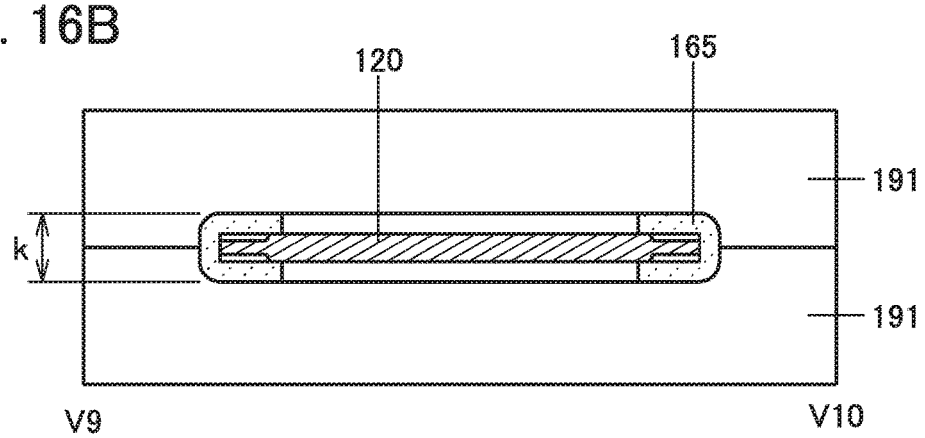
Figure 16C:
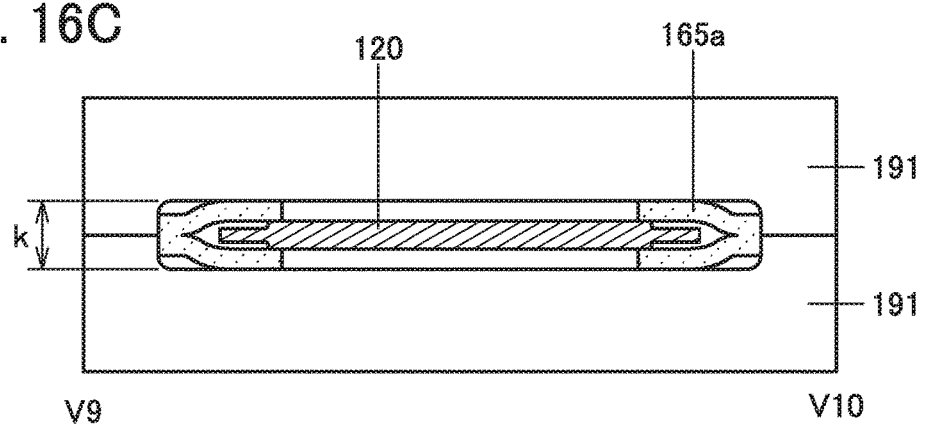

FIG. 16A is a perspective view illustrating a state where the two structure bodies 191 are made to overlap with each other with the battery unit 120 provided with the spacers interposed therebetween. FIGS. 16B and 16C are each a cross-sectional view along dashed dotted line V9-V10 in FIG. 16A. The cross-sectional view is obtained by cutting a portion including the spacers. FIG. 16B illustrates the case where the spacers 165 are used, and FIG. 16C illustrates the case where the spacers 165a are used. The battery unit 120 provided with the spacers is disposed in a space surrounded by two depressions 192. In this case, a distance k of the space is preferably equal to the thickness T.

Next, the liquid filler 195 is put into the space surrounded by the two depressions 192 as illustrated in FIG. 12D. At this time, if the filler 195 has a high viscosity, a gap is generated around the spacer 165, reducing the reliability of the power storage device that is to be fabricated, in some cases. The filler 195 with a low viscosity easily fills spaces around the spacer 165, which can suppress generation of a gap. The viscosity of the filler 195 is preferably lower than or equal to 10 Pa·s (Pascal second), more preferably lower than or equal to 5 Pa·s, and still more preferably lower than or equal to 1 Pa·s.

The filler 195 is cured so as to reflect the shape of the two depressions 192, whereby the member 109 with rubber elasticity can be formed. After the formation of the member 109 with rubber elasticity, the two structure bodies 191 are separated.

The use of a material having the same composition as the spacer for formation of the member 109 with rubber elasticity helps favorably bond the spacer and the member 109 with rubber elasticity. Thus, impurities can be prevented from entering from a boundary interface, whereby the power storage device can have high reliability.

Note that in the case where a material of the spacer is different from a material of the member 109 with rubber elasticity, a difference in refractive index, light transmittance, or the like might cause optical distortion in the vicinity of a boundary between the spacer and the member 109 with rubber elasticity. This might reduce the display quality of the display device in the case where a secondary battery and a display panel are covered with the member 109 with rubber elasticity. For this reason, it is preferred that the spacer and the display region do not overlap each other.

For the member 109 with rubber elasticity, a material having refractive index, light transmittance, and the like equal to those of a material of the spacer is preferably used, in which case the member 109 with rubber elasticity and the spacer can be bonded to each other such that the boundary cannot be seen. Thus, the display device can have high display quality.

For example, when a filler that is the same as the filler 195 is used for the spacer, the spacer can have the same composition as the member 109 with rubber elasticity. The use of the material having the same composition for the spacer and the member 109 with rubber elasticity allows them to have equal refractive index, light transmittance, and the like.

Example 3 of Fabrication Method for Power Storage Device

Examples 3 and 4 of a fabrication method for a power storage device, which will be described below, allow the member 109 with rubber elasticity to be formed with fewer materials and fewer structure bodies than those used in Fabrication method examples 1 and 2. Note that Fabricating method examples 3 and 4 are particularly effective in forming the member 109 with rubber elasticity thin, for example, in the case where the thickness t1 or the thickness t2 is less than or equal to 1 mm, preferably less than or equal to 500 μm. The fabricating method examples 3 and 4 can further increase the productivity of the power storage device or the display device.

Figure 17A:
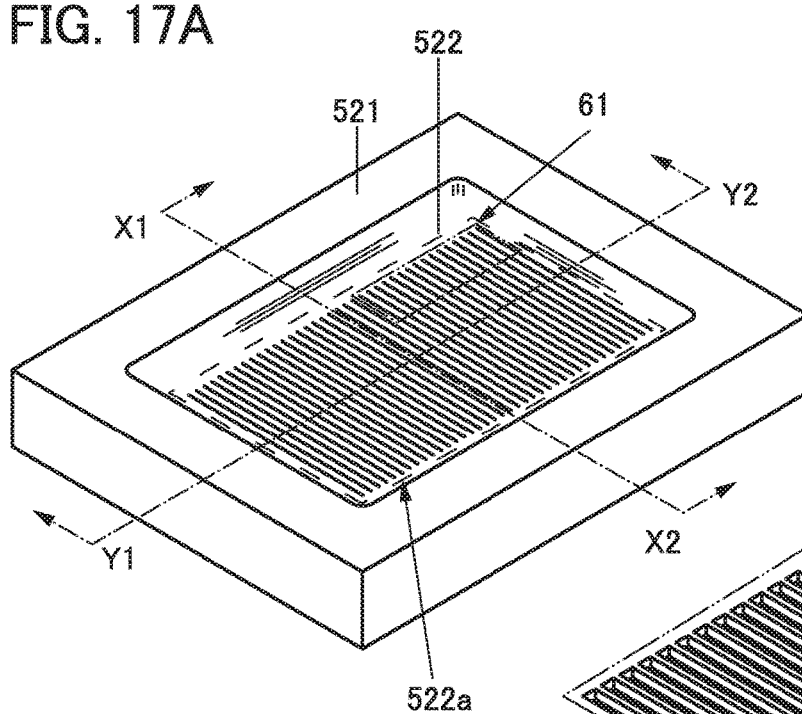
FIGS. 17A to 17E illustrate an example of a structure body.
Figure 17B:
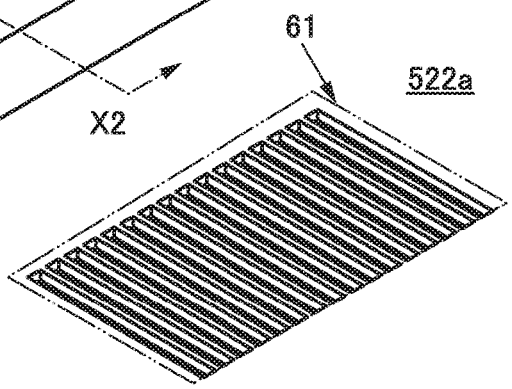
Figure 17C:
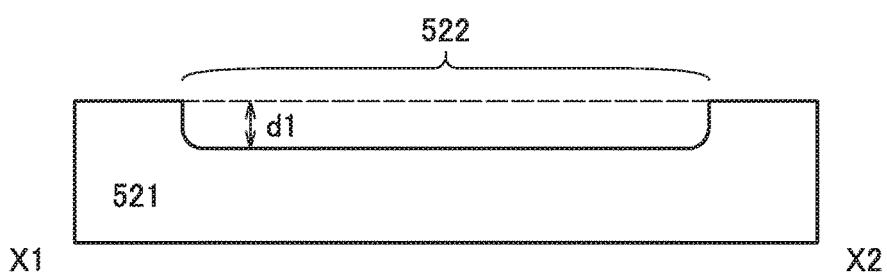
Figure 17D:
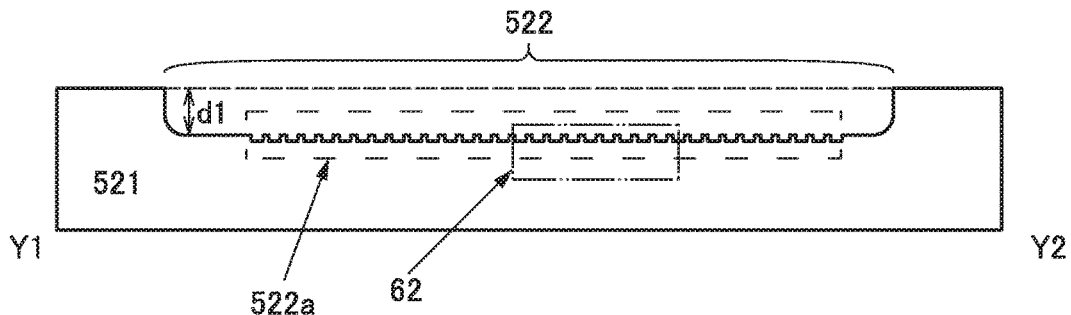
Figure 17E:
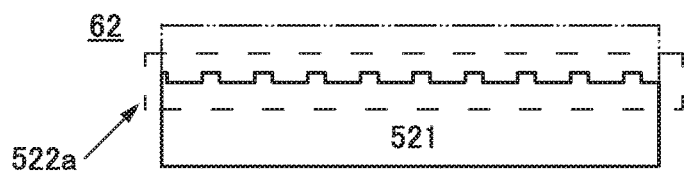

First, FIG. 17A illustrates a structure body 521 used for fabrication of a power storage device. FIG. 17B is an enlarged view of a region 61 illustrated in FIG. 17A. FIG. 17C is a cross-sectional view along dashed-dotted line X1-X2 in FIG. 17A, and FIG. 17D is a cross-sectional view along dashed-dotted line Y1-Y2 in FIG. 17A. FIG. 17E is an enlarged view of a region 62 illustrated in FIG. 17D.

The structure body 521 has a depression 522. The depression 522 is provided with an uneven structure 522a.

Note that the uneven structure 522a is not limited to the structure with a plurality of depressions. The uneven structure 522a may include a plurality of projections.

A depth d1 of the depression 522 is preferably equal to the sum of the thickness t1 and the thickness t3 or the sum of the thickness t2 and the thickness t3. Note that the depth d1 of the depression 522 does not include the depth of the depression of the uneven structure 522a.

For example, a metallic mold can be used as the structure body 521. A material used for the structure body 521 is not limited to metal. For example, a material such as glass, ceramic, an organic resin, or wood may be used for the structure body 521.

Figure 18A:
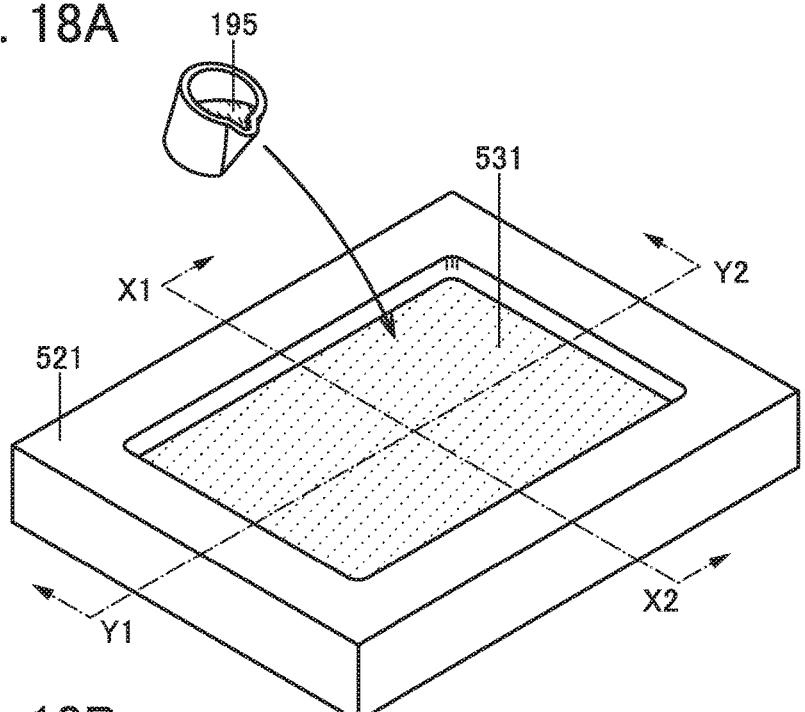
FIGS. 18A to 18D illustrate an example of a method for fabricating a power storage device.
Figure 18B:
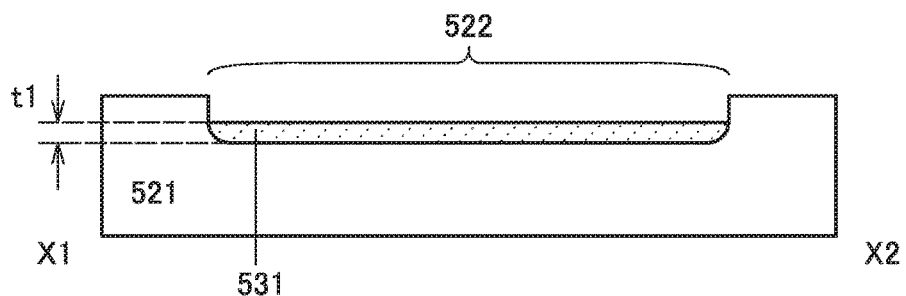
Figure 18C:
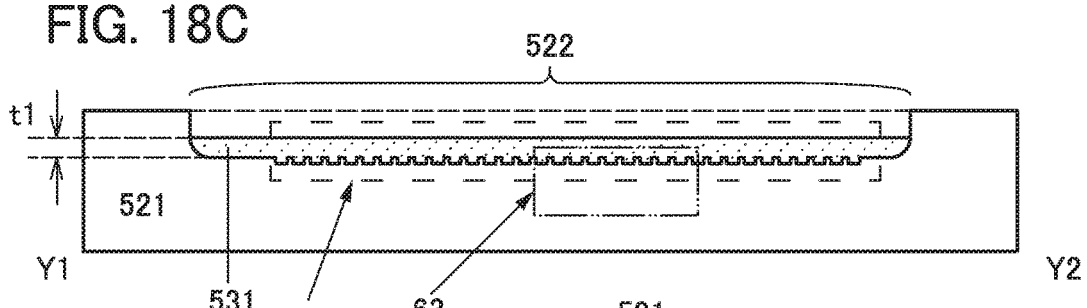
Figure 18D:
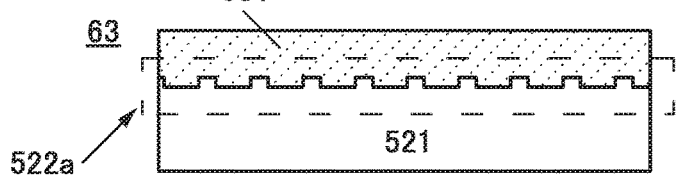

First, the filler 195 is put into the depression 522. Then, the filler 195 is cured to form a layer 531 with rubber elasticity (FIG. 18A). The amount of the filler 195 is determined in accordance with the thickness t1 of the layer 531 with rubber elasticity and the depth of the uneven structure 522a (FIGS. 18B and 18C). FIG. 18D is an enlarged view of a region 63 illustrated in FIG. 18C.

Figure 19:
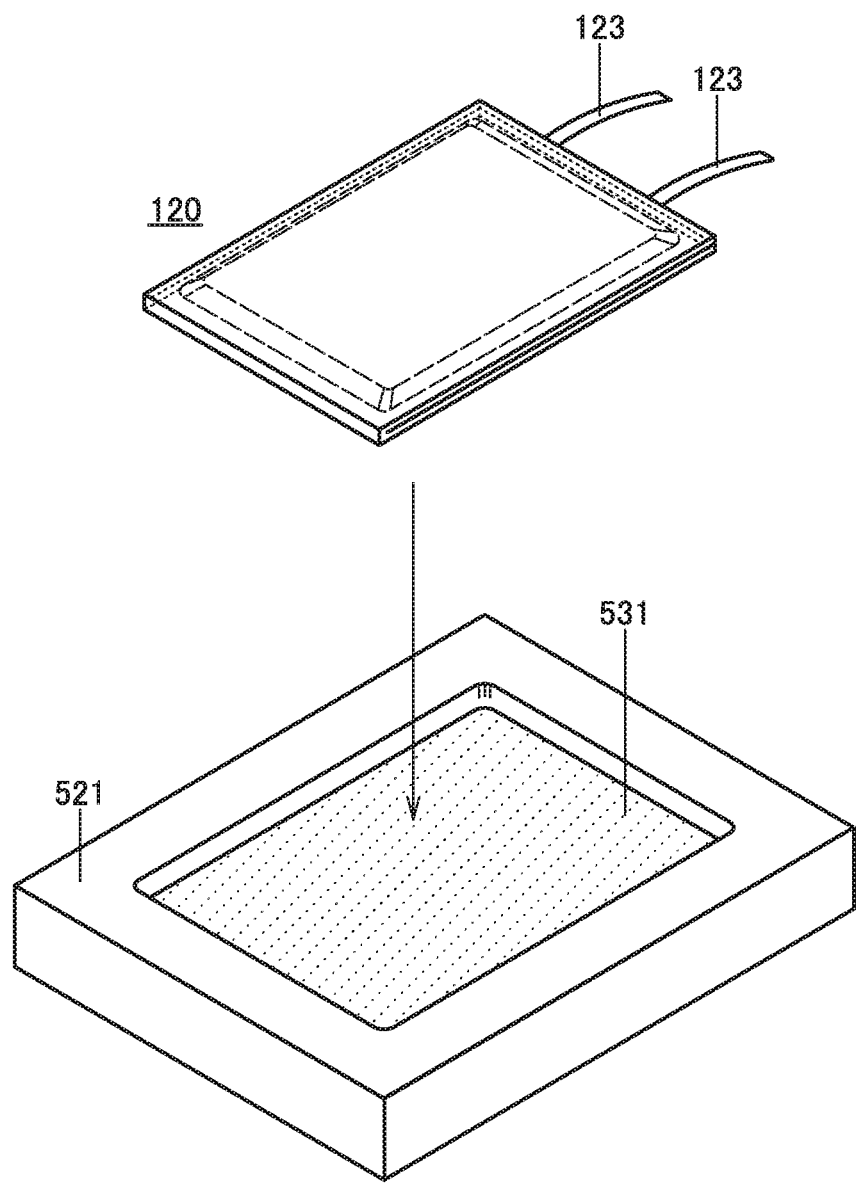
FIG. 19 illustrates an example of a method for fabricating a power storage device.

Next, the battery unit 120 is disposed on the layer 531 with rubber elasticity (FIG. 19). At this time, it is necessary to be careful not to form bubbles between the battery unit 120 and the layer 531 with rubber elasticity.

Figure 20A:
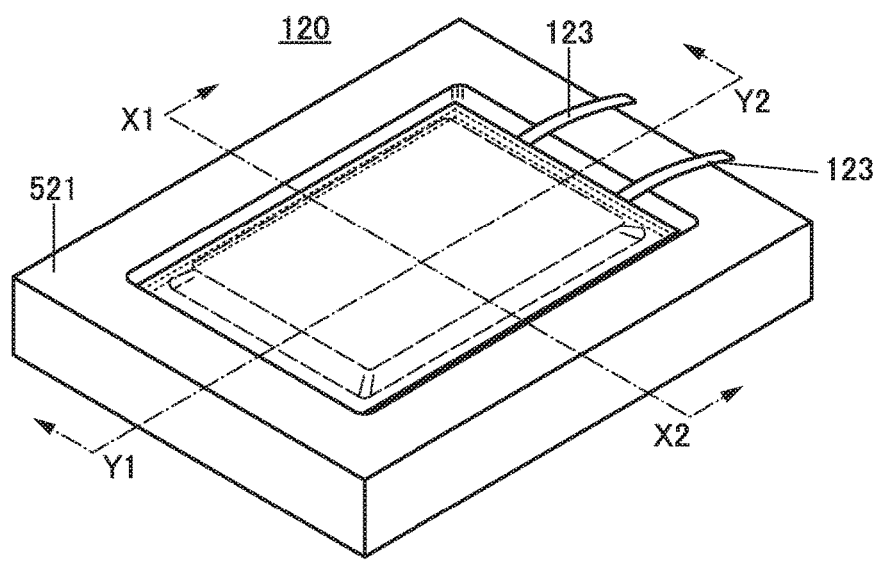
FIGS. 20A to 20C illustrate an example of a method for fabricating a power storage device.
Figure 20B:
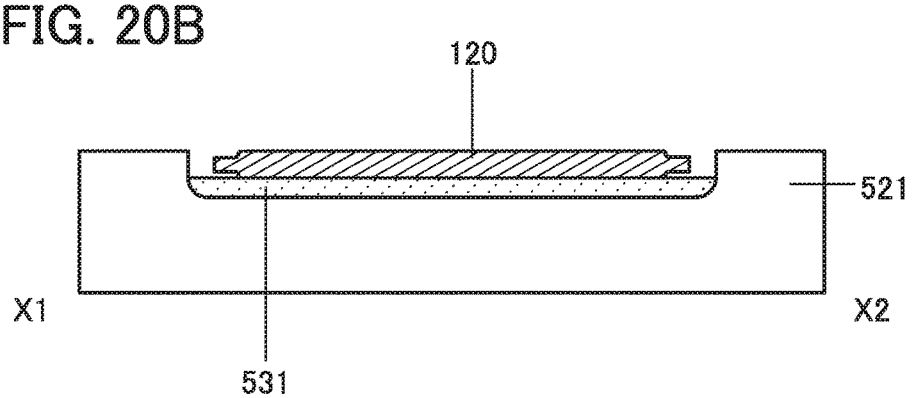
Figure 20C:
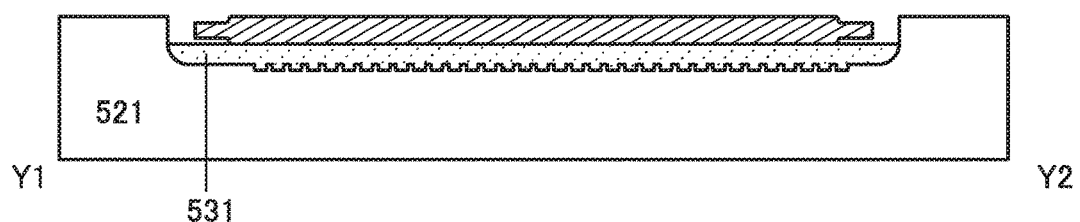

FIG. 20A is a perspective view illustrating a state where the battery unit 120 is disposed on the layer 531 with rubber elasticity. FIG. 20B is a cross-sectional view along dashed dotted line X1-X2 in FIG. 20A. FIG. 20C is a cross-sectional view along dashed dotted line Y1-Y2 in FIG. 20A.

Figure 21A:
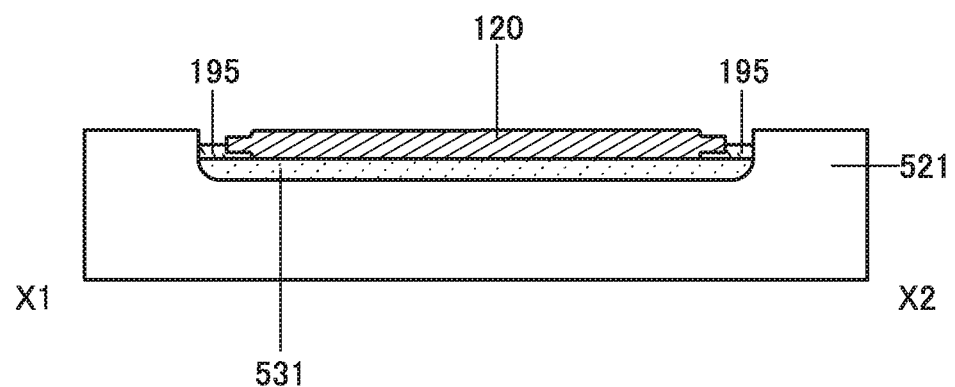
FIGS. 21A and 21B illustrate examples of methods for fabricating power storage devices.
Figure 21B:
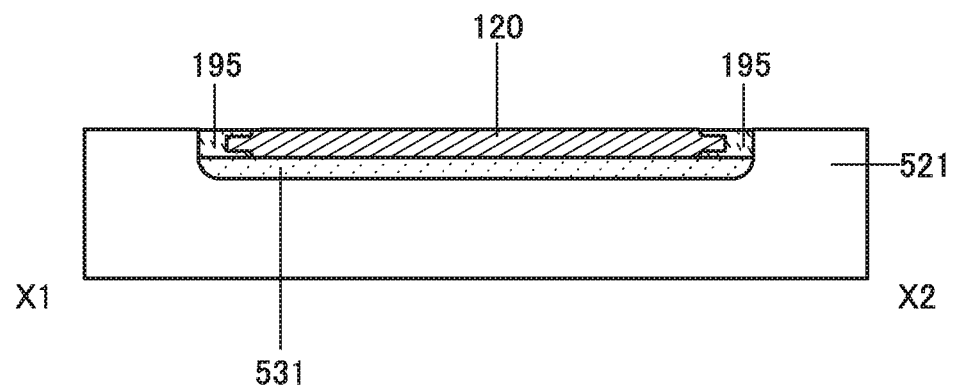

Note that after the battery unit 120 is disposed on the layer 531 with rubber elasticity, the filler 195 may further be put into the depression 522 and then may be cured. This can fix the relative positions of the layer 531 with rubber elasticity and the battery unit 120. Thus, bubbles can be prevented from being formed between the layer 531 with rubber elasticity and the battery unit 120 after separation from the structure body 521. FIG. 21A illustrates an example where the added filler 195 is thinner than the battery unit 120, and FIG. 21B illustrates an example where the added filler 195 has a thickness equal to that of the battery unit 120.

Then, the layer 531 with rubber elasticity and the battery unit 120 are separated from the structure body 521 (FIG. 22A). Note that FIG. 22B is a cross-sectional view along dashed dotted line Y1-Y2 in FIG. 22A, and illustrates the battery unit 120 provided on the layer 531 with rubber elasticity. FIG. 22C is a cross-sectional view of a region 64 illustrated in FIG. 22B.

Next, the filler 195 is put into the depression 522 (see FIG. 23). At this time, a filler different from that put in the previous step may be used. For example, layers with rubber elasticity on the front and back sides of the power storage device may have different kinds of hardness and colors. Alternatively, a material with the same quality as that of a material for the layer 531 with rubber elasticity can be used for the filler 195, in which case favorable bonding between the filler 195 and the layer 531 with rubber elasticity after curing can be achieved, and a substantially seamless member with rubber elasticity can be formed. Then, the battery unit 120 and the layer 531 with rubber elasticity are turned upside down, and the battery unit 120 is disposed on the filler 195 in the depression 522 such that the battery unit 120 faces the filler 195 in the depression 522 with the layer 531 with rubber elasticity not interposed therebetween. At this time, attention is necessary not to form bubbles between the battery unit 120 and the filler 195.

Figure 24A:
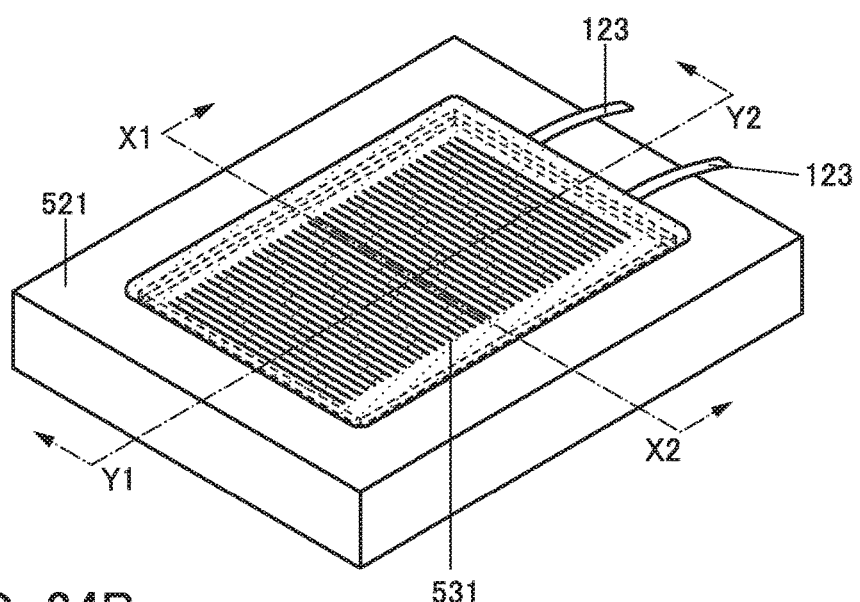
FIGS. 24A to 24C illustrate an example of a method for fabricating a power storage device.
Figure 24B:
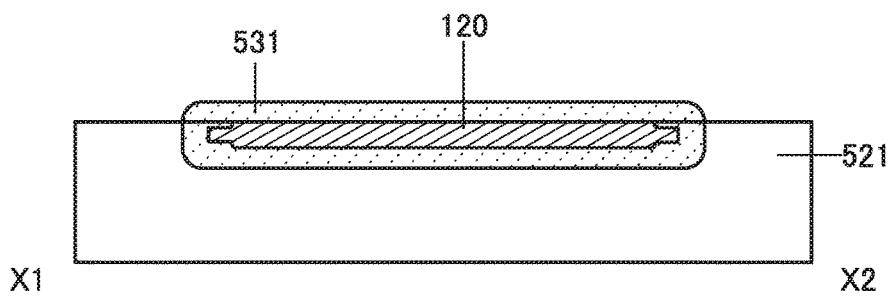
Figure 24C:
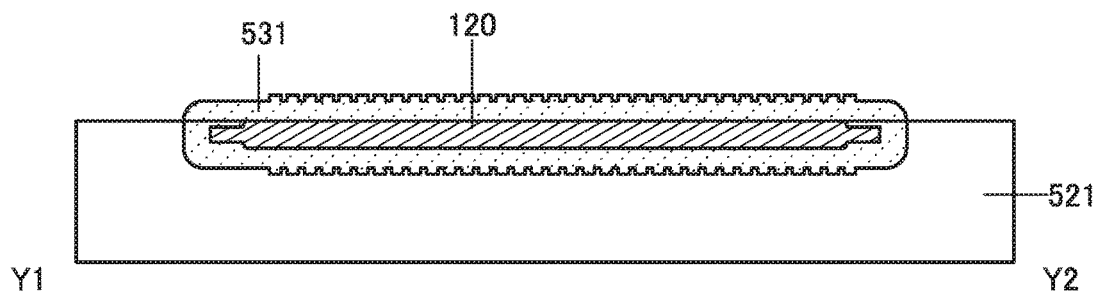

FIG. 24A is a perspective view illustrating a state where the battery unit 120 is disposed on the filler 195 in the depression 522. FIG. 24B is a cross-sectional view along dashed dotted line X1-X2 in FIG. 24A. FIG. 24C is a cross-sectional view along dashed dotted line Y1-Y2 in FIG. 24A.

The thickness t2 after curing is determined by the amount of the filler 195 (FIG. 25B). The amount of the filler 195 is determined such that at least the edges of the battery unit 120 are covered with the filler 195.

Then, the filler 195 in the depression 522 is cured. The cured filler 195 and the layer 531 with rubber elasticity are bonded to be seamless, whereby the member 109 with rubber elasticity is formed. After the formation of the member 109 with rubber elasticity, the member 109 with rubber elasticity and the battery unit 120 are taken out of the structure body 521 (FIG. 25A). FIG. 25B is a cross-sectional view along dashed dotted line Y1-Y2 in FIG. 25A.

Example 4 of Fabrication Method for Power Storage Device

In Example 4 of a fabrication method for a power storage device, the case where an uneven structure is provided on only one surface of a power storage device will be described.

Figure 26A:
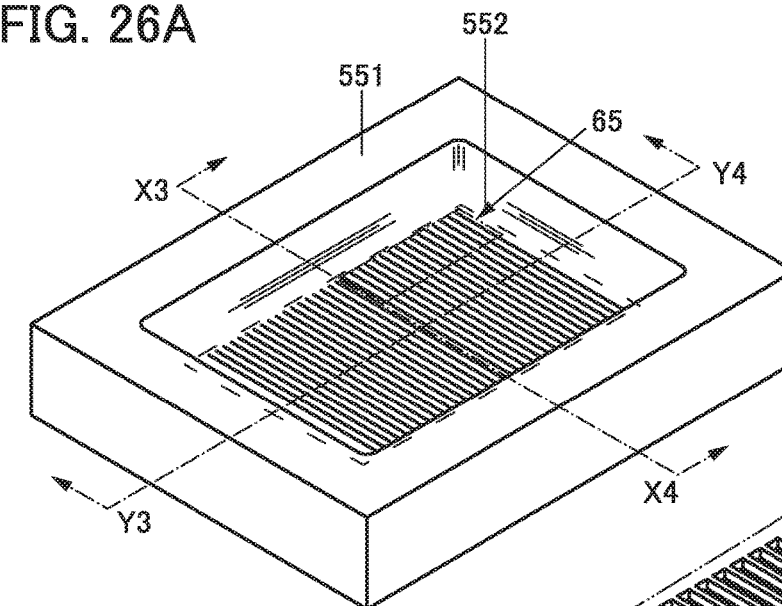
FIGS. 26A to 26E illustrate an example of a structure body.
Figure 26B:
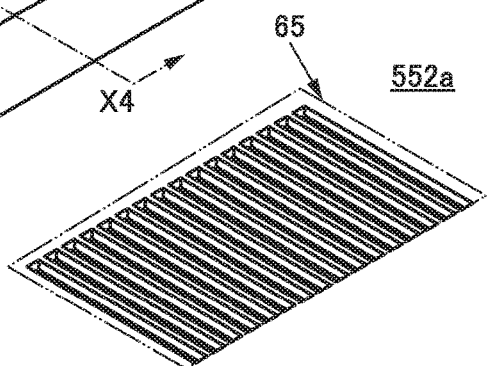
Figure 26C:
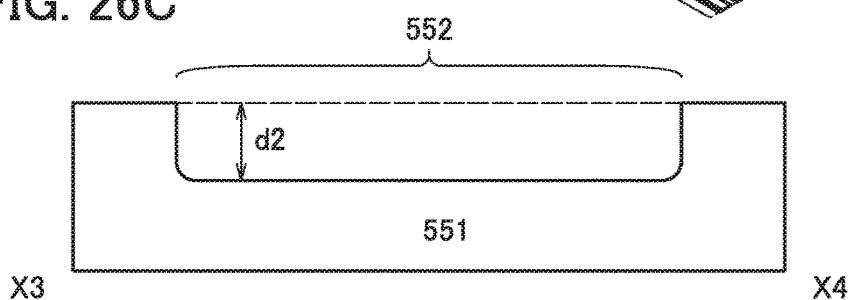
Figure 26D:
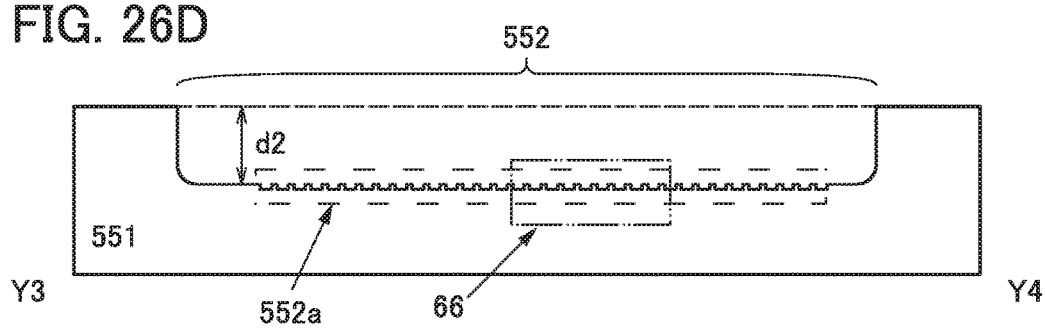
Figure 26E:
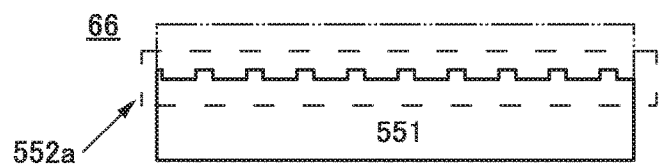

FIG. 26A illustrates a structure body 551 used for fabrication of a power storage device. FIG. 26B is an enlarged view of a region 65 illustrated in FIG. 26A. FIG. 26C is a cross-sectional view along dashed-dotted line X3-X4 in FIG. 26A, and FIG. 26D is a cross-sectional view along dashed-dotted line Y3-Y4 in FIG. 26A. FIG. 26E is an enlarged view of a region 66 illustrated in FIG. 26D.

The structure body 551 has a depression 552. The depression 552 is provided with an uneven structure 552a.

Note that the uneven structure 552a is not limited to the structure with a plurality of depressions. The uneven structure 552a may include a plurality of projections.

A depth d2 of the depression 552 is preferably greater than or equal to the thickness T. For example, when the thickness t3 is 70 μm and the thickness t1 and the thickness t2 are each 100 μm, the depth d2 is preferably 270 μm or more. Note that the depth d2 of the depression 552 does not include the depth of the depression of the uneven structure 552a.

For example, a metallic mold can be used as the structure body 551. A material used for the structure body 551 is not limited to metal. For example, a material such as glass, ceramic, an organic resin, or wood may be used for the structure body 551.

Figure 27A:
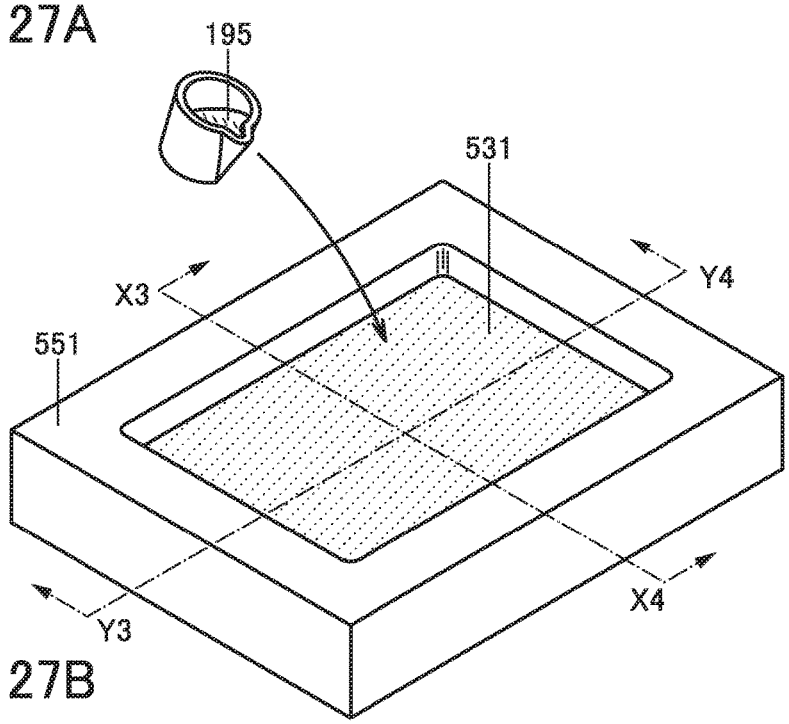
FIGS. 27A to 27D illustrate an example of a method for fabricating a power storage device.
Figure 27B:
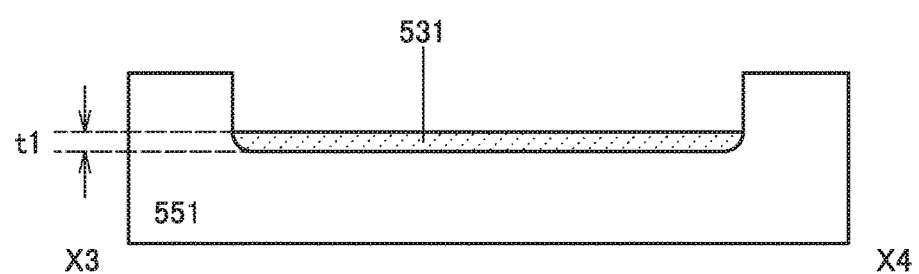
Figure 27C:
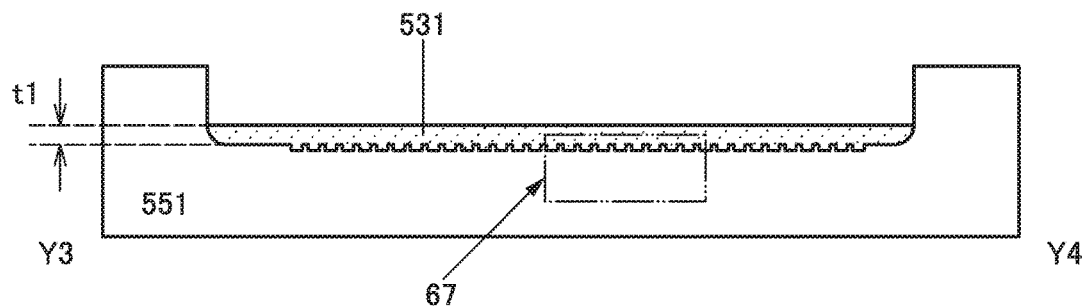
Figure 27D:
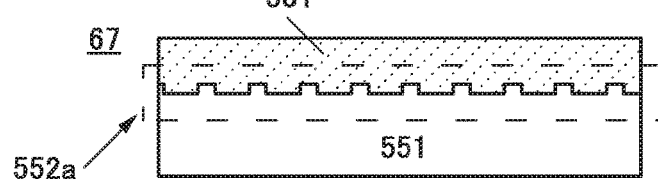

First, the filler 195 is put into the depression 552. Then, the filler 195 is cured to form the layer 531 with rubber elasticity (FIG. 27A). The amount of the filler 195 is determined in accordance with the thickness t1 of the layer 531 with rubber elasticity (FIGS. 27B and 27C). FIG. 27D is an enlarged view of a region 67 illustrated in FIG. 27C.

Figure 28:
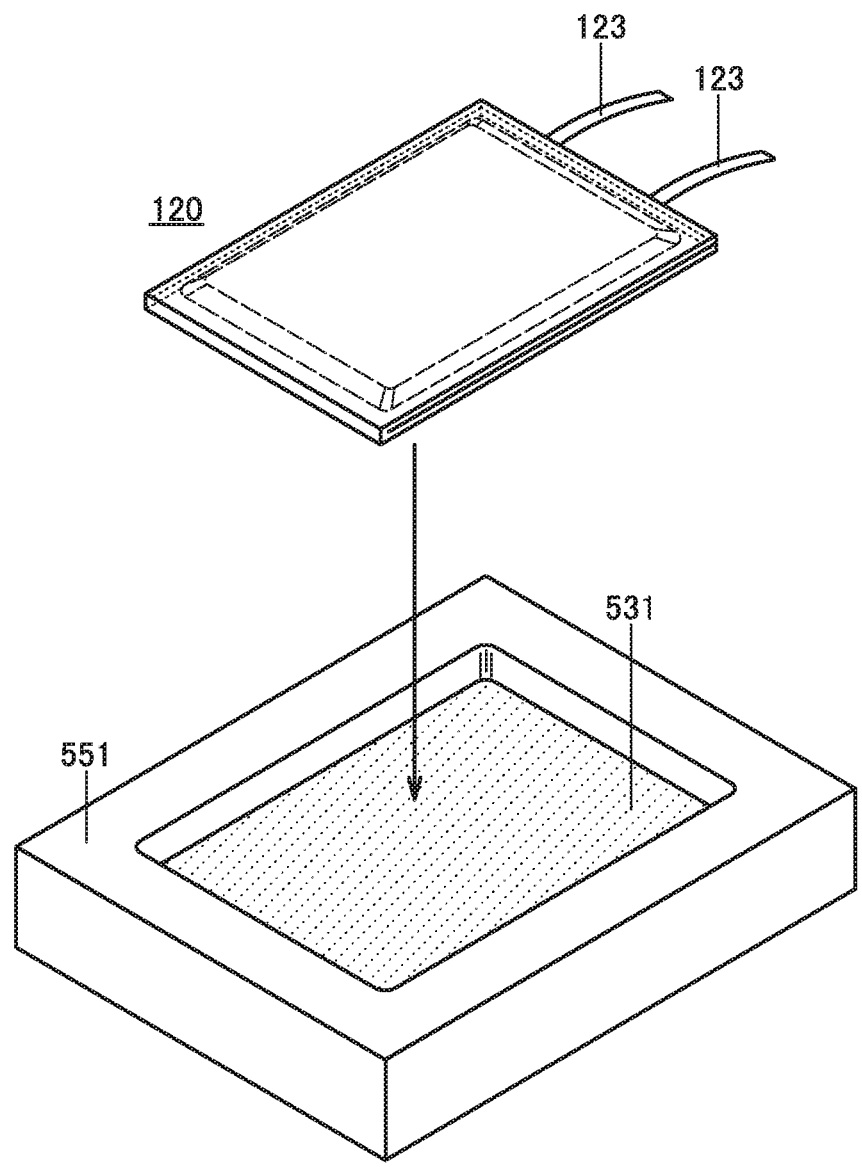
FIG. 28 illustrates an example of a method for fabricating a power storage device.

Next, the battery unit 120 is disposed on the layer 531 with rubber elasticity in the depression 552 (FIG. 28). At this time, it is necessary to be careful not to form bubbles between the battery unit 120 and the layer 531 with rubber elasticity.

Figure 29A:
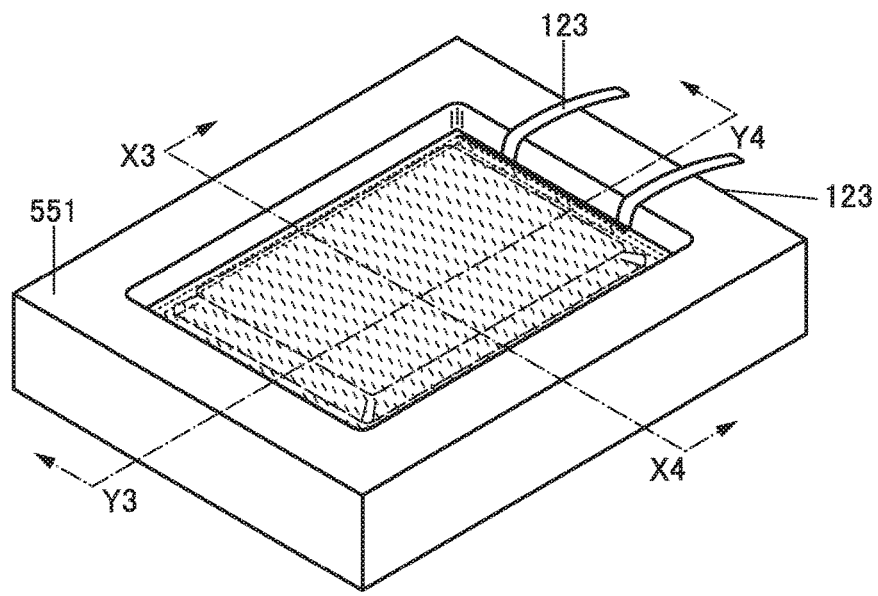
FIGS. 29A to 29C illustrate an example of a method for fabricating a power storage device.
Figure 29B:
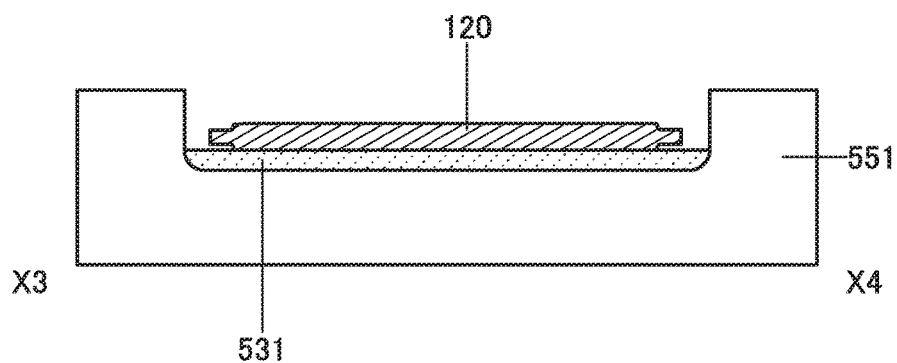
Figure 29C:
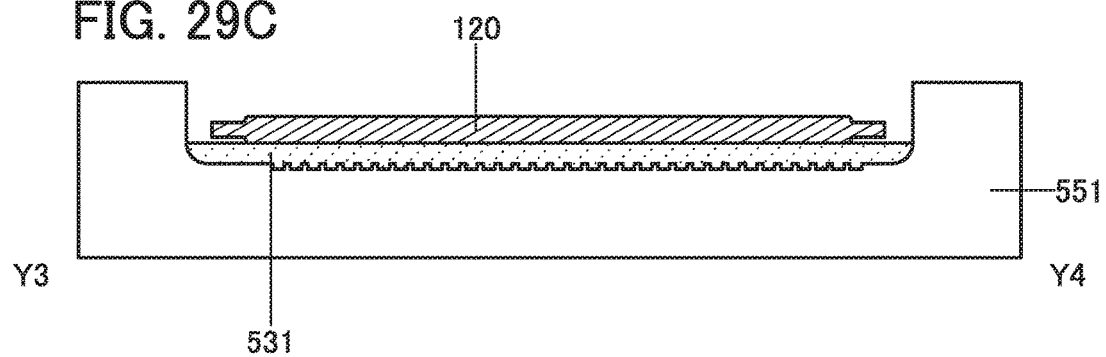

FIG. 29A is a perspective view illustrating a state where the battery unit 120 is disposed on the layer 531 with rubber elasticity. FIG. 29B is a cross-sectional view along dashed dotted line X3-X4 in FIG. 29A. FIG. 29C is a cross-sectional view along dashed dotted line Y3-Y4 in FIG. 29A.

Next, the depression 552 is filled with the filler 195, whereby the display unit 120 is covered with the filler 195. Here, a material for the filler 195 can be either the same as or different from that for the layer 531 with rubber elasticity. When a material with the same quality as that of a material for the layer 531 with rubber elasticity is used for the filler 195, favorable bonding between the filler 195 and the layer 531 with rubber elasticity after curing can be achieved, and a substantially seamless member with rubber elasticity can be formed.

Figure 30A:
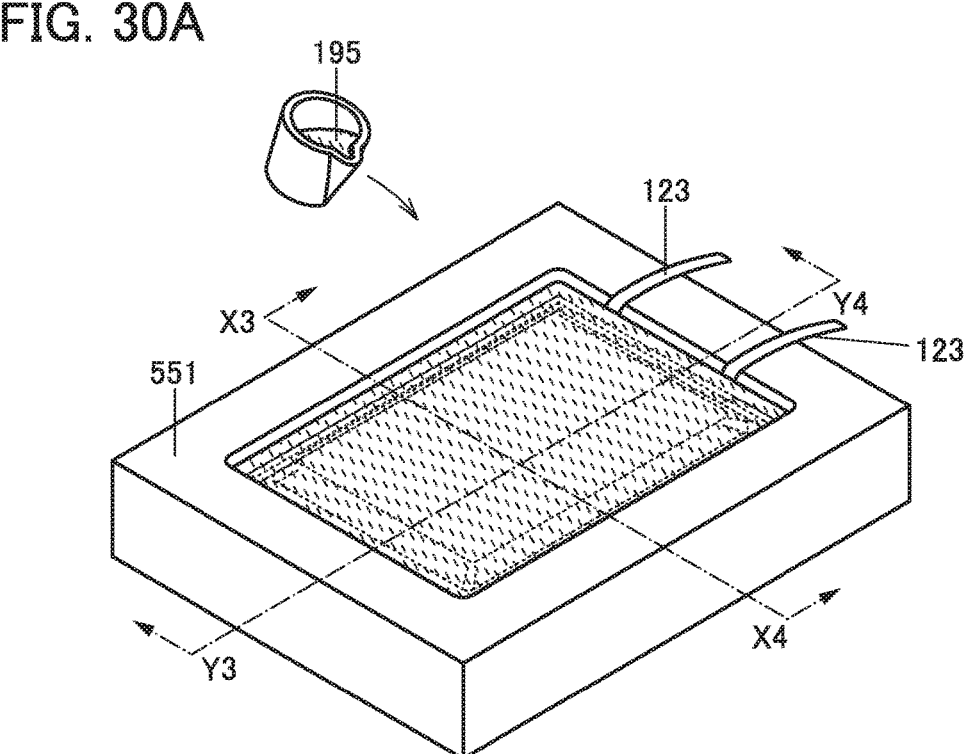
FIGS. 30A to 30C illustrate an example of a method for fabricating a power storage device.
Figure 30B:
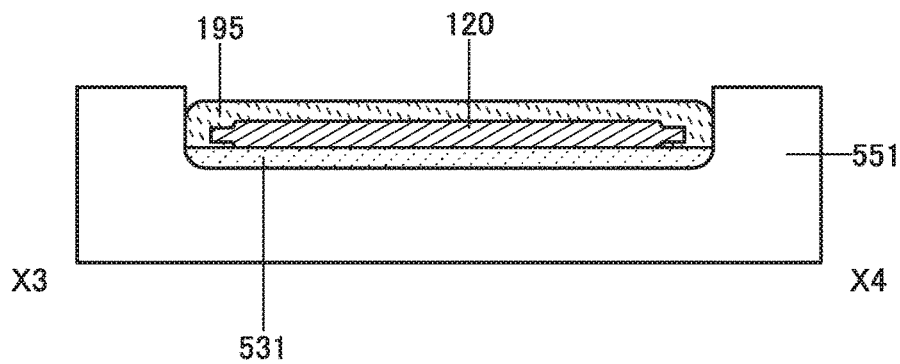
Figure 30C:
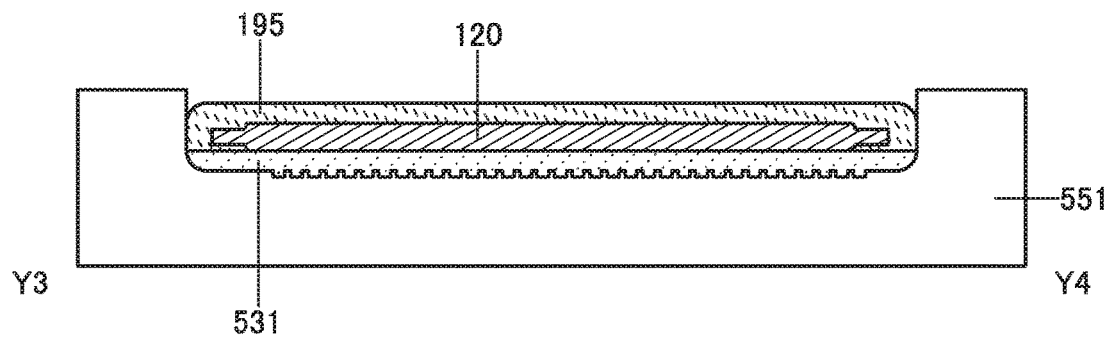

FIG. 30A is a perspective view illustrating a state where the depression 552 is filled with the filler 195. FIG. 30B is a cross-sectional view along dashed dotted line X3-X4 in FIG. 30A. FIG. 30C is a cross-sectional view along dashed dotted line Y3-Y4 in FIG. 30A. The thickness t2 is determined by the amount of the filler 195 (FIG. 31B). The amount of the filler 195 is determined such that at least the edges of the battery unit 120 are covered with the filler 195.

Then, the filler 195 in the depression 552 is cured. The cured filler 195 and the layer 531 with rubber elasticity are bonded to be seamless, whereby the member 109 with rubber elasticity is formed. After the formation of the member 109 with rubber elasticity, the member 109 with rubber elasticity and the battery unit 120 are taken out of the structure body 551 (FIG. 31A). FIG. 31B is a cross-sectional view along dashed dotted line Y3-Y4 in FIG. 31A.

Example 5 of Fabrication Method for Power Storage Device

In Fabrication method examples 1 to 4, the structure body provided with the uneven structure in the depression is used; however, one embodiment of the present invention is not limited thereto. For example, a structure body not provided with an uneven structure in a depression may be used. In that case, after the battery unit 120 is covered with the member 109 with rubber elasticity whose surface is flat, the member 109 with rubber elasticity can be shaved with a sharp cutter or the like to form an uneven structure. The uneven structure can be formed with a hot-wire cutter or an ultrasonic cutter, for example.

As described above, the fabrication method described in this embodiment allows the battery unit or the light-emitting unit to be covered with the member with rubber elasticity. This can suppress entry of impurities such as moisture from the air, increasing the reliability of a device. Furthermore, a device that is not easily broken even after being repeatedly bent and stretched can be fabricated.

This embodiment can be combined with any of the other embodiments as appropriate.

Embodiment 4

In this embodiment, a battery unit that can be used in the power storage device of one embodiment of the present invention will be described with reference to FIGS. 32A to 32C to FIG. 43. Note that the battery unit of one embodiment of the present invention is not limited to the structures described in this embodiment, and various shapes and modes can be used.

Although a lithium-ion secondary battery is described as an example in this embodiment, one embodiment of the present invention is not limited to this example. One embodiment of the present invention can be used for any of a battery, a primary battery, a secondary battery, a lithium air battery, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air cell, a zinc-air battery, a capacitor, a lithium-ion capacitor, an electric double layer capacitor, an ultracapacitor, a supercapacitor, and the like.

Structural Example 1

Figure 32A:
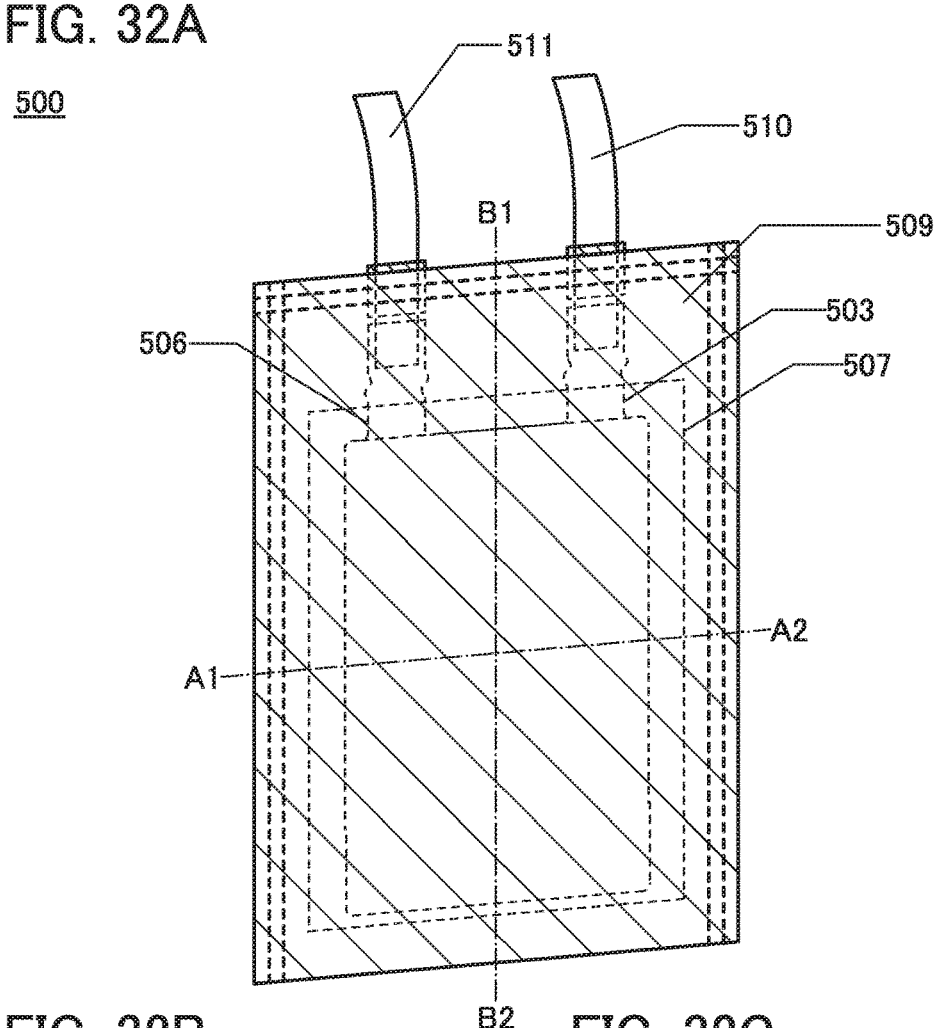
FIGS. 32A to 32C illustrate an example of a power storage device and examples of electrodes.

FIG. 32A illustrates a battery unit 500. Although FIG. 32A illustrates a mode of a thin storage battery as an example of the battery unit 500, one embodiment of the present invention is not limited to this example. For example, a storage battery using a wound body or a cylindrical or coin-type storage battery can be used in the power storage device of one embodiment of the present invention.

As illustrated in FIG. 32A, the battery unit 500 includes a positive electrode 503, a negative electrode 506, a separator 507, and an exterior body 509. The battery unit 500 may include a positive electrode lead 510 and a negative electrode lead 511.

FIGS. 33A and 33B each illustrate an example of a cross-sectional view along dashed-dotted line A1-A2 in FIG. 32A. FIGS. 33A and 33B each illustrate a cross-sectional structure of the battery unit 500 that is formed using a pair of the positive electrode 503 and the negative electrode 506.

As illustrated in FIGS. 33A and 33B, the battery unit 500 includes the positive electrode 503, the negative electrode 506, the separator 507, an electrolytic solution 508, and the exterior bodies 509. The separator 507 is interposed between the positive electrode 503 and the negative electrode 506. A space surrounded by the exterior bodies 509 is filled with the electrolytic solution 508.

The positive electrode 503 includes a positive electrode active material layer 502 and a positive electrode current collector 501. The negative electrode 506 includes a negative electrode active material layer 505 and a negative electrode current collector 504. The active material layer can be formed on one or both surfaces of the current collector. The separator 507 is positioned between the positive electrode current collector 501 and the negative electrode current collector 504.

The battery unit includes one or more positive electrodes and one or more negative electrodes. For example, the battery unit can have a layered structure including a plurality of positive electrodes and a plurality of negative electrodes.

Figure 34A:
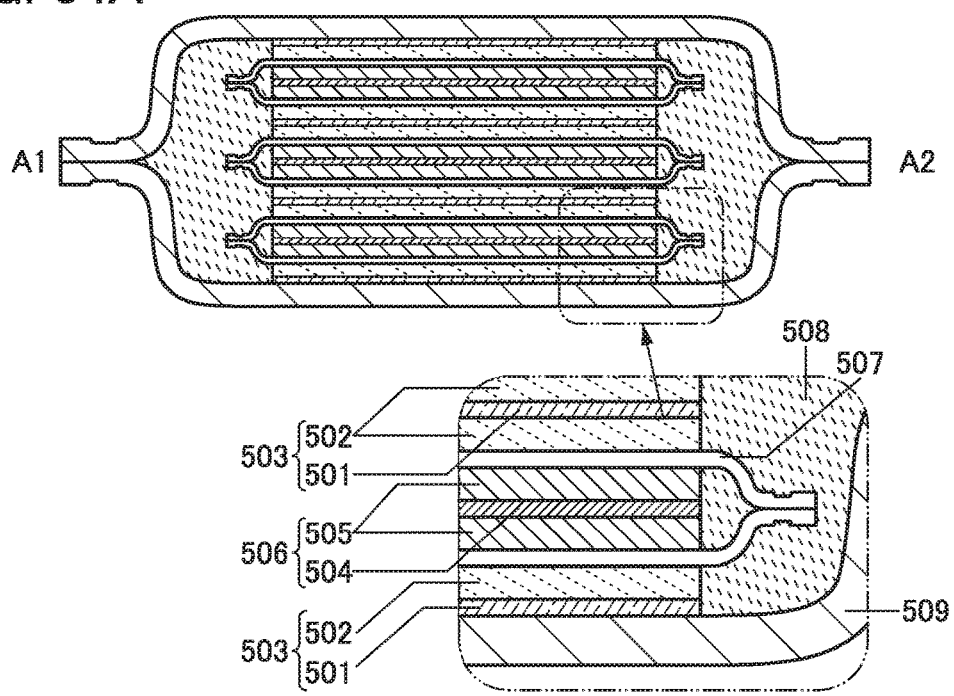
FIGS. 34A and 34B illustrate examples of power storage devices.
Figure 34B:
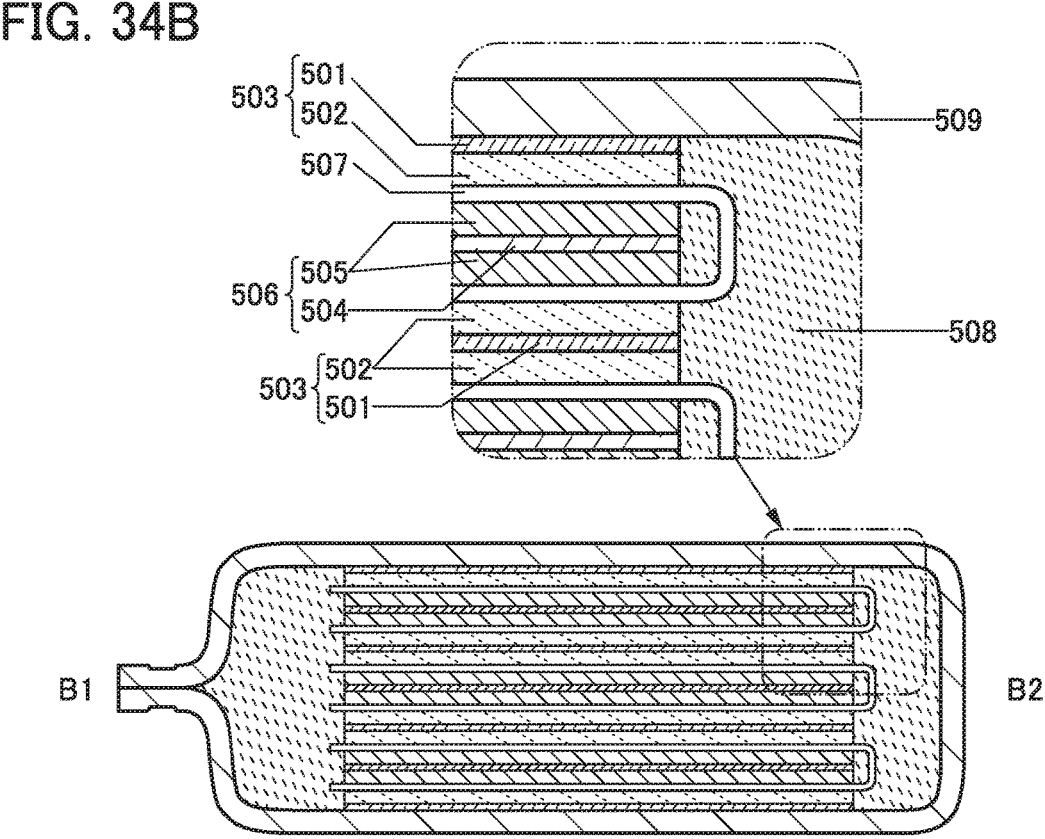

FIG. 34A illustrates another example of a cross-sectional view along dashed-dotted line A1-A2 in FIG. 32A. FIG. 34B is a cross-sectional view along dashed-dotted line B1-B2 in FIG. 32A.

FIGS. 34A and 34B each illustrate a cross-sectional structure of the battery unit 500 that is formed using a plurality of pairs of the positive and negative electrodes 503 and 506. There is no limitation on the number of electrode layers of the battery unit 500. In the case of using a large number of electrode layers, the power storage device can have high capacity. In contrast, in the case of using a small number of electrode layers, the power storage device can have a small thickness and high flexibility.

The examples in FIGS. 34A and 34B each include two positive electrodes 503 in each of which the positive electrode active material layer 502 is provided on one surface of the positive electrode current collector 501; two positive electrodes 503 in each of which the positive electrode active material layers 502 are provided on both surfaces of the positive electrode current collector 501; and three negative electrodes 506 in each of which the negative electrode active material layers 505 are provided on both surfaces of the negative electrode current collector 504. In other words, the battery unit 500 includes six positive electrode active material layers 502 and six negative electrode active material layers 505. Note that although the separator 507 has a bag-like shape in the examples illustrated in FIGS. 34A and 34B, the present invention is not limited to this example and the separator 507 may have a strip shape or a bellows shape.

Figure 32B:
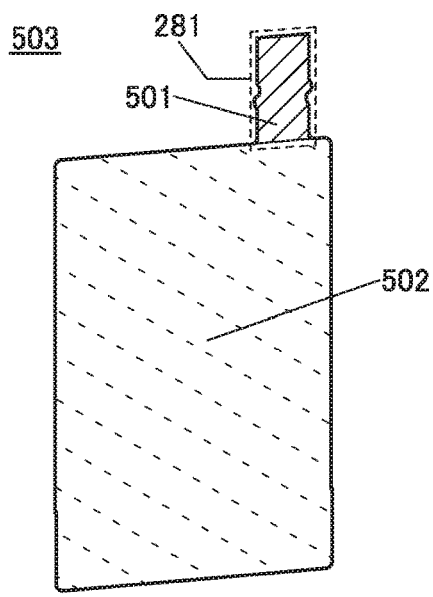

FIG. 32B illustrates the appearance of the positive electrode 503. The positive electrode 503 includes the positive electrode current collector 501 and the positive electrode active material layer 502.

Figure 32C:
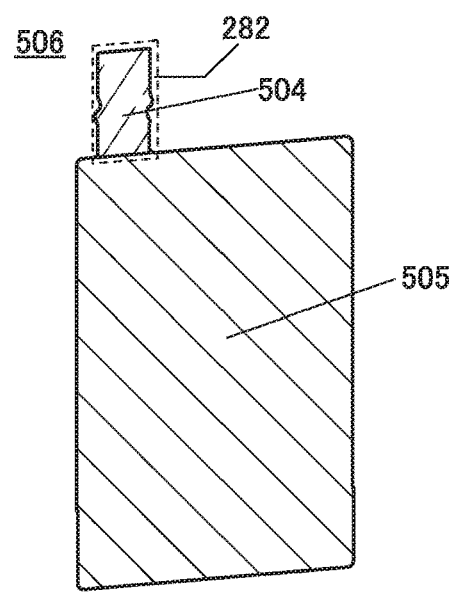

FIG. 32C illustrates the appearance of the negative electrode 506. The negative electrode 506 includes the negative electrode current collector 504 and the negative electrode active material layer 505.

The positive electrode 503 and the negative electrode 506 preferably include tab regions so that a plurality of stacked positive electrodes can be electrically connected to each other and a plurality of stacked negative electrodes can be electrically connected to each other. Furthermore, an electrode lead is preferably electrically connected to the tab region.

As illustrated in FIG. 32B, the positive electrode 503 preferably includes the tab region 281. The positive electrode lead 510 is preferably welded to part of the tab region 281. The tab region 281 preferably includes a region where the positive electrode current collector 501 is exposed. When the positive electrode lead 510 is welded to the region where the positive electrode current collector 501 is exposed, contact resistance can be further reduced. Although FIG. 32B illustrates the example where the positive electrode current collector 501 is exposed in the entire tab region 281, the tab region 281 may partly include the positive electrode active material layer 502.

As illustrated in FIG. 32C, the negative electrode 506 preferably includes the tab region 282. The negative electrode lead electrode 511 is preferably welded to part of the tab region 282. The tab region 282 preferably includes a region where the negative electrode current collector 504 is exposed. When the negative electrode lead electrode 511 is welded to the region where the negative electrode current collector 504 is exposed, contact resistance can be further reduced. Although FIG. 32C illustrates the example where the negative electrode current collector 504 is exposed in the entire tab region 282, the tab region 282 may partly include the negative electrode active material layer 505.

Although FIG. 32A illustrates the example where the ends of the positive electrode 503 and the negative electrode 506 are substantially aligned with each other, part of the positive electrode 503 may extend beyond the end of the negative electrode 506.

In the battery unit 500, the area of a region where the negative electrode 506 does not overlap with the positive electrode 503 is preferably as small as possible.

In the example illustrated in FIG. 33A, the end of the negative electrode 506 is located inward from the end of the positive electrode 503. With this structure, the entire negative electrode 506 can overlap with the positive electrode 503 or the area of the region where the negative electrode 506 does not overlap with the positive electrode 503 can be small.

The areas of the positive electrode 503 and the negative electrode 506 in the battery unit 500 are preferably substantially equal. For example, the areas of the positive electrode 503 and the negative electrode 506 that face each other with the separator 507 therebetween are preferably substantially equal. For example, the areas of the positive electrode active material layer 502 and the negative electrode active material layer 505 that face each other with the separator 507 therebetween are preferably substantially equal.

For example, as illustrated in FIGS. 34A and 34B, the area of the positive electrode 503 on the separator 507 side is preferably substantially equal to the area of the negative electrode 506 on the separator 507 side. When the area of a surface of the positive electrode 503 on the negative electrode 506 side is substantially equal to the area of a surface of the negative electrode 506 on the positive electrode 503 side, the region where the negative electrode 506 does not overlap with the positive electrode 503 can be small (does not exist, ideally), whereby the battery unit 500 can have reduced irreversible capacity. Alternatively, as illustrated in FIGS. 34A and 34B, the area of the surface of the positive electrode active material layer 502 on the separator 507 side is preferably substantially equal to the area of the surface of the negative electrode active material layer 505 on the separator 507 side.

As illustrated in FIGS. 34A and 34B, the end of the positive electrode 503 and the end of the negative electrode 506 are preferably substantially aligned with each other. Ends of the positive electrode active material layer 502 and the negative electrode active material layer 505 are preferably substantially aligned with each other.

In the example illustrated in FIG. 33B, the end of the positive electrode 503 is located inward from the end of the negative electrode 506. With this structure, the entire positive electrode 503 can overlap with the negative electrode 506 or the area of the region where the positive electrode 503 does not overlap with the negative electrode 506 can be small. In the case where the end of the negative electrode 506 is located inward from the end of the positive electrode 503, a current sometimes concentrates at the end portion of the negative electrode 506. For example, concentration of a current in part of the negative electrode 506 results in deposition of lithium on the negative electrode 506 in some cases. By reducing the area of the region where the positive electrode 503 does not overlap with the negative electrode 506, concentration of a current in part of the negative electrode 506 can be inhibited. As a result, for example, deposition of lithium on the negative electrode 506 can be inhibited, which is preferable.

As illustrated in FIG. 32A, the positive electrode lead 510 is preferably electrically connected to the positive electrode 503. Similarly, the negative electrode lead 511 is preferably electrically connected to the negative electrode 506. The positive electrode lead 510 and the negative electrode lead 511 are exposed to the outside of the exterior body 509 so as to serve as terminals for electrical contact with an external portion.

The positive electrode current collector 501 and the negative electrode current collector 504 can double as terminals for electrical contact with an external portion. In that case, the positive electrode current collector 501 and the negative electrode current collector 504 may be arranged such that part of the positive electrode current collector 501 and part of the negative electrode current collector 504 are exposed to the outside of the exterior body 509 without using electrode leads.

Figure 35:
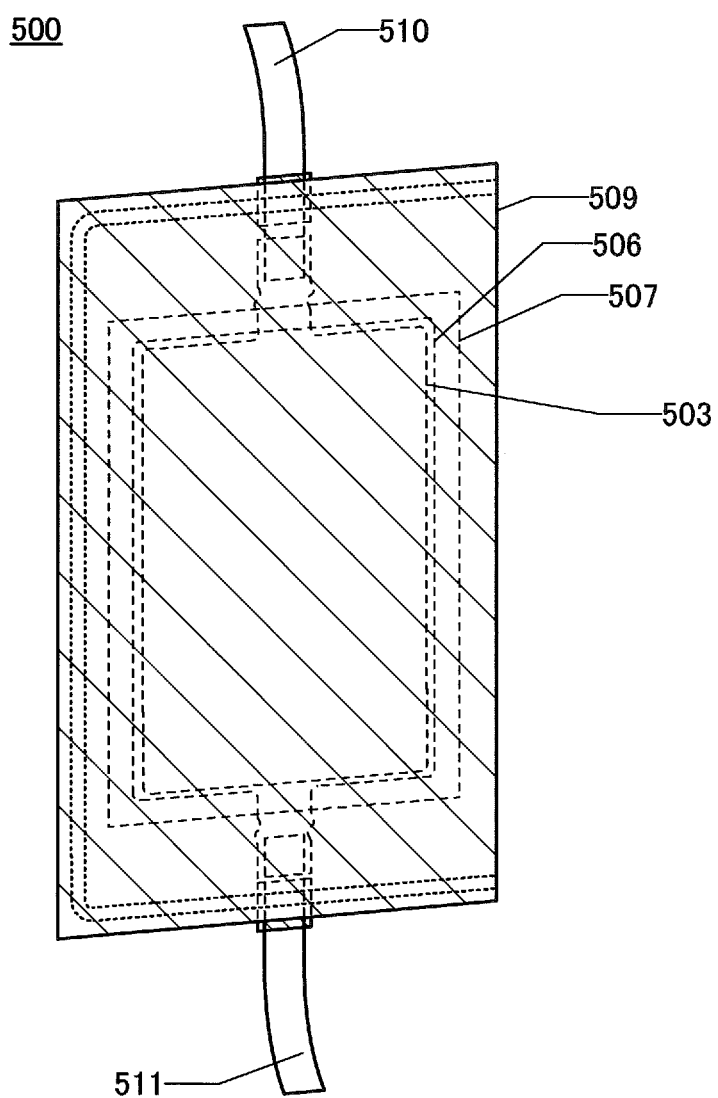
FIG. 35 illustrates an example of a power storage device.

Although the positive electrode lead 510 and the negative electrode lead 511 are provided on the same side of the battery unit 500 in FIG. 32A, the positive electrode lead 510 and the negative electrode lead 511 may be provided on different sides of the battery unit 500 as illustrated in FIG. 35. The electrode leads of the battery unit of one embodiment of the present invention can be freely positioned as described above; therefore, the degree of freedom in design is high. Accordingly, a product including the battery unit of one embodiment of the present invention can have a high degree of freedom in design. Furthermore, a yield of products each including the battery unit of one embodiment of the present invention can be increased.

The components of the battery unit will be described in detail below.

<<Current Collector>>

There is no particular limitation on the current collector as long as it has high conductivity without causing a significant chemical change in a power storage device. For example, the positive electrode current collector and the negative electrode current collector can each be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like may be used. Alternatively, the current collectors can each be formed using an aluminum alloy to which an element that improves heat resistance, such as silicon, titanium, neodymium, scandium, or molybdenum, is added. Still alternatively, a metal element that forms silicide by reacting with silicon can be used to form the current collectors. Examples of the metal element that forms silicide by reacting with silicon include zirconium, titanium, hafnium, vanadium, niobium, tantalum, chromium, molybdenum, tungsten, cobalt, and nickel.

An irreversible reaction with an electrolytic solution is sometimes caused on a surface of the current collector. Thus, the current collector preferably has low reactivity with an electrolytic solution. Stainless steel or the like is preferably used for the current collector, in which case reactivity with an electrolytic solution can be lowered in some cases, for example.

The positive electrode current collector and the negative electrode current collector can each have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The positive electrode current collector and the negative electrode current collector may each be formed to have micro irregularities on the surface thereof in order to enhance adhesion to the active material layer. The positive electrode current collector and the negative electrode current collector each preferably have a thickness of 5 μm to 30 μm inclusive.

An undercoat layer may be provided over part of a surface of the current collector. The undercoat layer is a coating layer provided to reduce contact resistance between the current collector and the active material layer or to improve adhesion between the current collector and the active material layer. Note that the undercoat layer is not necessarily formed over the entire surface of the current collector and may be partly formed to have an island-like shape. In addition, the undercoat layer may serve as an active material to have capacity. For the undercoat layer, a carbon material can be used, for example. Examples of the carbon material include carbon black such as acetylene black, a carbon nanotube, and graphite. Examples of the undercoat layer include a metal layer, a layer containing carbon and high molecular compounds, and a layer containing metal and high molecular compounds.

<<Active Material Layer>>

The active material layer includes the active material. An active material refers only to a material that is involved in insertion and extraction of ions that are carriers. In this specification and the like, a material that is actually an "active material" and the material including a conductive additive, a binder, and the like are collectively referred to as an active material layer.

The positive electrode active material layer includes one or more kinds of positive electrode active materials. The negative electrode active material layer includes one or more kinds of negative electrode active materials.

The positive electrode active material and the negative electrode active material have a central role in battery reactions of a power storage device, and receive and release carrier ions. To increase the lifetime of the power storage device, the active materials preferably have a little capacity involved in irreversible battery reactions, and have high charge and discharge efficiency.

For the positive electrode active material, a material into and from which carrier ions such as lithium ions can be inserted and extracted can be used. Examples of a positive electrode active material include materials having an olivine crystal structure, a layered rock-salt crystal structure, a spinel crystal structure, and a NASICON crystal structure.

As the positive electrode active material, a compound such as $LiFeO_2$, $LiCoO_2$, $LiNiO_2$, or $LiMn_2O_4$, $V_2O_5$, $Cr_2O_5$, or $MnO_2$ can be used.

As an example of a material having an olivine crystal structure, lithium-containing complex phosphate ($LiMPO_4$ (general formula) (M is one or more of Fe(II), Mn(II), Co(II), and Ni(II))) can be given. Typical examples of $LiMPO_4$ are compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

For example, lithium iron phosphate ($LiFePO_4$) is preferable because it properly has properties necessary for the positive electrode active material, such as safety, stability, high capacity density, high potential, and the existence of lithium ions which can be extracted in initial oxidation (charging).

The use of LiFePO$_4$ for the positive electrode active material allows fabrication of a highly safe power storage device that is stable against an external load such as overcharging. Such a power storage device is particularly suitable for, for example, a mobile device, a wearable device, and the like.

Examples of a material with a layered rock-salt crystal structure include lithium cobalt oxide (LiCoO$_2$), LiNiO$_2$, LiMnO$_2$, Li$_2$MnO$_3$, a NiCo-containing material (general formula: LiNi$_x$Co$_{1-x}$O$_2$ (0<x<1)) such as LiNi$_{0.8}$Co$_{0.2}$O$_2$, a NiMn-containing material (general formula: LiNi$_x$Mn$_{1-x}$O$_2$ (0<x<1)) such as LiNi$_{0.5}$Mn$_{0.5}$O$_2$, a NiMnCo-containing material (also referred to as NMC) (general formula: LiNi$_x$Mn$_y$Co$_{1-x-y}$O$_2$ (x>0, y>0, x+y<1)) such as LiNi$_{1/3}$Mn$_{1/3}$Co$_{1/3}$O$_2$. Moreover, Li(Ni$_{0.8}$Co$_{0.15}$Al$_{0.05}$)O$_2$, Li$_2$MnO$_3$-LiMO$_2$ (M=Co, Ni, or Mn), and the like can be given as the examples.

In particular, LiCoO$_2$ is preferable because it has advantages such as high capacity, higher stability in the air than that of LiNiO$_2$, and higher thermal stability than that of LiNiO$_2$.

Examples of a material with a spinel crystal structure include LiMn$_2$O$_4$, Li$_{1+x}$Mn$_{2-x}$O$_4$ (0<x<2), LiMn$_{2-x}$Al$_x$O$_4$ (0<x<2), and LiMn$_{1.5}$Ni$_{0.5}$O$_4$.

It is preferred that a small amount of lithium nickel oxide (LiNiO$_2$ or LiNi$_{1-x}$M$_x$O$_2$ (0<x<1, M=Co, Al, or the like)) be added to a material with a spinel crystal structure that contains manganese, such as LiMn$_2$O$_4$, in which case advantages such as inhibition of the dissolution of manganese and the decomposition of an electrolytic solution can be obtained.

Alternatively, a lithium-containing complex silicate expressed by Li$_{(2-j)}$MSiO$_4$ (general formula) (M is one or more of Fe(II), Mn(II), Co(II), or Ni(II); 0≤j≤2) may be used as the positive electrode active material. Typical examples of the general formula Li$_{(2-j)}$MSiO$_4$ are compounds such as Li$_{(2-j)}$FeSiO$_4$, Li$_{(2-j)}$NiSiO$_4$, Li$_{(2-j)}$CoSiO$_4$, Li$_{(2-j)}$MnSiO$_4$, Li$_{(2-j)}$Fe$_k$Ni$_l$SiO$_4$, Li$_{(2-j)}$Fe$_k$Co$_l$SiO$_4$, Li$_{(2-j)}$Fe$_k$Mn$_l$SiO$_4$, Li$_{(2-j)}$Ni$_k$Co$_l$SiO$_4$, Li$_{(2-j)}$Ni$_k$Mn$_l$SiO$_4$ (k+l≤1, 0<k<1, and 0<l<1), Li$_{(2-j)}$Fe$_m$Ni$_n$Co$_q$SiO$_4$, Li$_{(2-j)}$Fe$_m$Ni$_n$Mn$_q$SiO$_4$, Li$_{(2-j)}$Ni$_m$Co$_n$Mn$_q$SiO$_4$ (m+n+q≤1, 0<m<1, 0<n<1, and 0<q<1), and Li$_{(2-j)}$Fe$_r$Ni$_s$Co$_t$Mn$_u$SiO$_4$ (r+s+t+u≤1, 0<r<1, 0<s<1, 0<t<1, and 0<u<1).

Still alternatively, a NASICON compound expressed by A$_x$M$_2$(XO$_4$)$_3$ (general formula) (A=Li, Na, or Mg, M=Fe, Mn, Ti, V, Nb, or Al, X=S, P, Mo, W, As, or Si) can be used for the positive electrode active material. Examples of the NASICON compound are Fe$_2$(MnO$_4$)$_3$, Fe$_2$(SO$_4$)$_3$, and Li$_3$Fe$_2$(PO$_4$)$_3$.

Further alternatively, for example, a compound expressed by Li$_2$MPO$_4$F, Li$_2$MP$_2$O$_7$, or Li$_5$MO$_4$ (general formula) (M=Fe or Mn), a perovskite fluoride such as FeF$_3$, a metal chalcogenide (a sulfide, a selenide, or a telluride) such as TiS$_2$ and MoS$_2$, a lithium-containing material with an inverse spinel structure such as LiMVO$_4$ (M=Mn, Co, or Ni), a vanadium oxide (V$_2$O$_5$, V$_6$O$_{13}$, LiV$_3$O$_8$, or the like), a manganese oxide, or an organic sulfur compound can be used as the positive electrode active material.

Further alternatively, any of the aforementioned materials may be combined to be used as the positive electrode active material. For example, a solid solution obtained by combining two or more of the above materials can be used as the positive electrode active material. For example, a solid solution of LiCo$_{1/3}$Mn$_{1/3}$Ni$_{1/3}$O$_2$ and Li$_2$MnO$_3$ can be used as the positive electrode active material.

In the case where carrier ions are alkali metal ions other than lithium ions, or alkaline-earth metal ions, a compound containing carriers such as an alkali metal (e.g., sodium and potassium) or an alkaline-earth metal (e.g., calcium, strontium, barium, beryllium, and magnesium) instead of lithium of the lithium compound, the lithium-containing complex phosphate, or the lithium-containing complex silicate may be used as the positive electrode active material.

The average diameter of primary particles of the positive electrode active material is preferably, for example, greater than or equal to 5 nm and less than or equal to 100 μm.

For example, lithium-containing complex phosphate having an olivine crystal structure used for the positive electrode active material has a one-dimensional lithium diffusion path, so that lithium diffusion is slow. Thus, in the case of using lithium-containing complex phosphate having an olivine crystal structure, the average diameter of particles of the positive electrode active material is, for example, preferably greater than or equal to 5 nm and less than or equal to 1 μm so that the charge and discharge rate is increased. The specific surface area of the positive electrode active material is, for example, preferably greater than or equal to 10 m$^2$/g and less than or equal to 50 m$^2$/g.

An active material having an olivine crystal structure is much less likely to be changed in the crystal structure by charging and discharging and has a more stable crystal structure than, for example, an active material having a layered rock-salt crystal structure. Thus, a positive electrode active material having an olivine crystal structure is stable against operation such as overcharging. The use of such a positive electrode active material allows fabrication of a highly safe power storage device.

As the negative electrode active material, for example, a carbon-based material, an alloy-based material, or the like can be used.

Examples of the carbon-based material include graphite, graphitizing carbon (soft carbon), non-graphitizing carbon (hard carbon), a carbon nanotube, graphene, carbon black, and the like. Examples of the graphite include artificial graphite such as meso-carbon microbeads (MCMB), coke-based artificial graphite, or pitch-based artificial graphite and natural graphite such as spherical natural graphite. In addition, examples of the shape of the graphite include a flaky shape and a spherical shape.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferred because of its advantages such as relatively high capacity per unit volume, small volume expansion, low cost, and safety greater than that of a lithium metal.

For example, in the case where carrier ions are lithium ions, a material including at least one of Mg, Ca, Ga, Si, Al, Ge, Sn, Pb, As, Sb, Bi, Ag, Au, Zn, Cd, Hg, In, and the like can be used as the alloy-based material. Such elements have a higher capacity than carbon. In particular, silicon has a high theoretical capacity of 4200 mAh/g, and therefore, the capacity of the power storage device can be increased. Examples of an alloy-based material (compound-based material) using such elements include Mg$_2$Si, Mg$_2$Ge, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used. Here, SiO is a compound containing silicon and oxygen. When the atomic ratio of silicon to oxygen is represented by $\alpha:\beta$, $\alpha$ preferably has an approximate value of $\beta$. Here, when $\alpha$ has an approximate value of $\beta$, an absolute value of the difference between $\alpha$ and $\beta$ is preferably less than or equal to 20% of a value of $\beta$, more preferably less than or equal to 10% of a value of $\beta$.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

When a nitride containing lithium and a transition metal is used, lithium ions are contained in the negative electrode active material and thus the negative electrode active material can be used in combination with a material for a positive electrode active material that does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active material; for example, a transition metal oxide that does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The average diameter of primary particles of the negative electrode active material is preferably, for example, greater than or equal to 5 nm and less than or equal to 100 μm.

The positive electrode active material layer and the negative electrode active material layer may each include a conductive additive.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, more preferably greater than or equal to 1 wt % and less than or equal to 5 wt %.

A network for electric conduction can be formed in the electrode by the conductive additive. The conductive additive also allows maintaining of a path for electric conduction between the negative electrode active material particles. The addition of the conductive additive to the active material layer increases the electric conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively, metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. Thus, the use of graphene as the conductive additive can increase electrical conductivity between the active materials or between the active material and the current collector.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene.

Graphene is capable of making low-resistance surface contact and has extremely high conductivity even with a small thickness. Therefore, even a small amount of graphene can efficiently form a conductive path in an active material layer.

In the case where an active material with a small average particle diameter (e.g., 1 μm or less) is used, the specific surface area of the active material is large and thus more conductive paths for the active material particles are needed. In such a case, it is particularly preferred that graphene with extremely high conductivity that can efficiently form a conductive path even in a small amount is used.

The positive electrode active material layer and the negative electrode active material layer may each include a binder.

In this specification, the binder has a function of binding or bonding the active materials and/or a function of binding or bonding the active material layer and the current collector. The binder is sometimes changed in state during fabrication of an electrode or a battery. For example, the binder can be at least one of a liquid, a solid, and a gel. The binder is sometimes changed from a monomer to a polymer during fabrication of an electrode or a battery.

As the binder, for example, a water-soluble high molecular compound can be used. As the water-soluble high molecular compound, a polysaccharide or the like can be used. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, fluororubber, or ethylene-propylene-diene copolymer can be used. Any of these rubber materials may be used in combination with the aforementioned water-soluble high molecular compound. Since these rubber materials have rubber elasticity and easily expand and contract, it is possible to obtain a highly reliable electrode that is resistant to stress due to expansion and contraction of an active material by charging and discharging, bending of the electrode, or the like. On the other hand, the rubber materials have a hydrophobic group and thus are unlikely to be soluble in water in some cases. In such a case, particles are dispersed in an aqueous solution without being dissolved in water, so that increasing the viscosity of a composition containing a solvent used for the formation of the active material layer 102 (also referred to as an electrode binder composition) up to the viscosity suitable for application might be difficult. A water-soluble high molecular compound having excellent viscosity modifying properties, such as a polysaccharide, can moderately increase the viscosity of the solution and can be uniformly dispersed together with a rubber material. Thus, a favorable electrode with high uniformity (e.g., an electrode with uniform electrode thickness or electrode resistance) can be obtained.

Alternatively, as the binder, a material such as PVdF, polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyacrylonitrile (PAN), polyvinyl chloride, ethylene-propylene-diene polymer, polyvinyl acetate, polymethyl methacrylate, or nitrocellulose can be used.

Two or more of the above materials may be used in combination for the binder.

The content of the binder in the active material layer is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %.

<<Electrolytic Solution>>

As a solvent of the electrolytic solution 508, an aprotic organic solvent is preferably used. For example, one of ethylene carbonate (EC), propylene carbonate (PC), butylene carbonate, chloroethylene carbonate, vinylene carbonate (VC), γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

Alternatively, the use of one or more kinds of ionic liquids (room temperature molten salts) which have features of non-flammability and non-volatility as a solvent of the electrolytic solution can prevent a power storage device from exploding or catching fire even when a power storage device internally shorts out or the internal temperature increases owing to overcharging or the like. An ionic liquid contains a cation and an anion. The ionic liquid of one embodiment of the present invention contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Furthermore, an additive agent such as vinylene carbonate (VC), propane sultone (PS), tert-butylbenzene (TBB), fluoroethylene carbonate (FEC), or LiBOB may be added to the electrolytic solution. The concentration of such an additive agent in the whole solvent is, for example, higher than or equal to 0.1 wt % and lower than or equal to 5 wt %.

Alternatively, a polymer gelled electrolyte obtained in such a manner that a polymer is swelled with an electrolytic solution may be used.

Examples of a host polymer include a polymer having a polyalkylene oxide structure, such as polyethylene oxide (PEO); PVdF; polyacrylonitrile; and a copolymer containing any of them. For example, PVdF-HFP, which is a copolymer of PVdF and hexafluoropropylene (HFP) can be used. The formed polymer may be porous.

An electrolytic solution may be gelated by adding a polymerization initiator and a cross-linking agent to the electrolytic solution. For example, the ionic liquid itself may be polymerized in such a manner that a polymerizable functional group is introduced into a cation or an anion of the ionic liquid and polymerization thereof is caused with the polymerization initiator. Then, the polymerized ionic liquid may be gelated with a cross-linking agent.

In combination with the electrolytic solution, a solid electrolyte including an inorganic material such as a sulfide-based inorganic material and an oxide-based inorganic material, or a solid electrolyte including a macromolecular material such as a polyethylene oxide (PEO)-based macromolecular material may alternatively be used. For example, the solid electrolyte may be formed over a surface of the active material layer. In the case of using the solid electrolyte and the electrolytic solution in combination, at least one of a separator and a spacer does not need to be provided in some cases.

When a macromolecular material that undergoes gelation is used as the solvent for the electrolytic solution, safety against liquid leakage and the like is improved. Furthermore, the power storage device can be thinner and more lightweight. For example, a polyethylene oxide-based polymer, a polyacrylonitrile-based polymer, a polyvinylidene fluoride-based polymer, a polyacrylate based polymer, and a polymethacrylate-based polymer can be used. A polymer which can gelate the electrolytic solution at normal temperature (e.g., 25° C.) is preferably used. Alternatively, a silicone gel may be used. In this specification and the like, the term polyvinylidene fluoride-based polymer, for example, refers to a polymer including polyvinylidene fluoride (PVdF), and includes a poly(vinylidene fluoride-hexafluoropropylene) copolymer and the like.

The above polymer can be qualitatively analyzed using a Fourier transform infrared (FT-IR) spectrometer or the like. For example, the polyvinylidene fluoride-based polymer has an absorption peak showing a C—F bond in a spectrum obtained with the FT-IR spectrometer. Furthermore, the polyacrylonitrile-based polymer has an absorption peak showing a C≡N bond in a spectrum obtained with the FT-IR spectrometer.

<<Separator>>

As the separator 507, paper, nonwoven fabric, a glass fiber, ceramics, a synthetic fiber such as nylon (polyamide), vinylon (a polyvinyl alcohol based fiber), polyester, acrylic, polyolefin, or polyurethane, or the like can be used. The separator 507 may have a single-layer structure or a layered structure.

More specifically, as a material for the separator 507, any of a fluorine-based polymer, polyethers such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, nonwoven fabric, and fiberglass can be used either alone or in combination.

<<Exterior Body>>

It is preferred that the surface of the exterior body 509 that is in contact with the electrolytic solution 508, i.e., the inner surface of the exterior body 509, does not react with the electrolytic solution 508 significantly. When moisture enters the battery unit 500 from the outside, a reaction between a component of the electrolytic solution 508 or the like and water might occur. Thus, the exterior body 509 preferably has low moisture permeability.

As the exterior body 509, a film having a three-layer structure can be used, for example. In the three-layer structure, a highly flexible metal thin film of aluminum, stainless steel, copper, nickel, or the like is provided over a film formed using polyethylene, polypropylene, polycarbonate, ionomer, polyamide, or the like, and an insulating synthetic resin film of a polyamide-based resin, a polyester-based resin, or the like is provided as the outer surface of the exterior body over the metal thin film can be used. With such a three-layer structure, the passage of an electrolytic solution and a gas can be blocked and an insulating property and resistance to the electrolytic solution can be provided. The exterior body is folded inside in two, or two exterior bodies are stacked with the inner surfaces facing each other, in which case application of heat melts the materials on the overlapping inner surfaces to cause fusion bonding between the two exterior bodies. In this manner, a sealing structure can be formed.

The battery unit 500 can be flexible by using the exterior body 509 with flexibility. When the battery unit has flexibility, it can be used in a power storage device or an electronic device at least part of which is flexible, and the battery unit 500 can be bent as the power storage device or electronic device is bent.

Structural Example 2

Figure 36A:
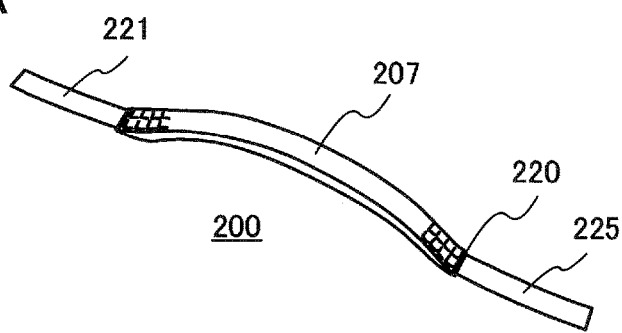
FIGS. 36A and 36B illustrate an example of a power storage device.
Figure 36B:
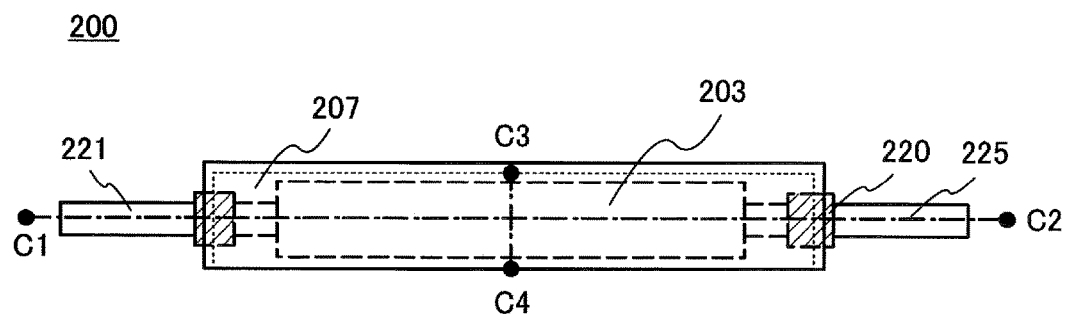

FIG. 36A is a perspective view of a secondary battery 200 and FIG. 36B is a top view of the secondary battery 200.

Figure 37A:
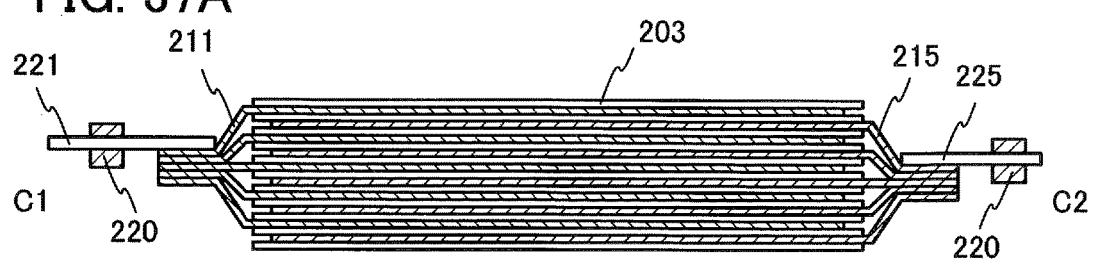
FIGS. 37A and 37B illustrate an example of a power storage device.
Figure 37B:
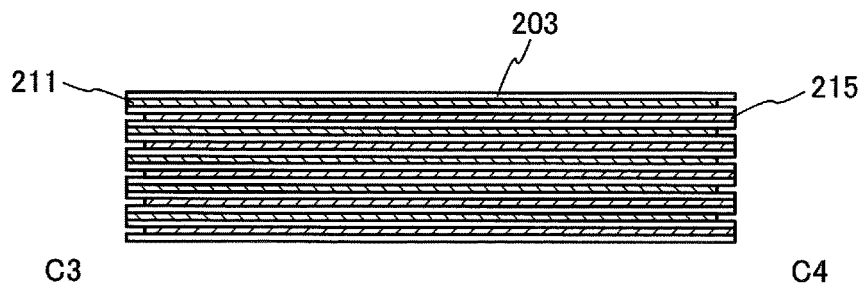

FIG. 37A is a cross-sectional view along dashed-dotted line C1-C2 in FIG. 36B, and FIG. 37B is a cross-sectional view along dashed-dotted line C3-C4 in FIG. 36B. Note that FIGS. 37A and 37B do not illustrate all components for clarity of the drawings.

The secondary battery 200 includes a positive electrode 211, a negative electrode 215, and a separator 203. The secondary battery 200 further includes a positive electrode lead 221, a negative electrode lead 225, and an exterior body 207.

The positive electrode 211 and the negative electrode 215 each include a current collector and an active material layer. The positive electrode 211 and the negative electrode 215 are provided such that the active material layers face each other with the separator 203 provided therebetween.

One of the electrodes (the positive electrode 211 and the negative electrode 215) of the secondary battery 200 that is positioned on the outer diameter side of a curved portion is preferably longer than the other electrode that is positioned on the inner diameter side of the curved portion, in the direction in which the electrode is curved. With such a structure, ends of the positive electrode 211 and those of the negative electrode 215 are aligned when the secondary battery 200 is curved with a certain curvature. That is, the entire region of the positive electrode active material layer included in the positive electrode 211 can face the negative electrode active material layer included in the negative electrode 215. Thus, positive electrode active materials included in the positive electrode 211 can efficiently contribute to a battery reaction. Therefore, the capacity of the secondary battery 200 per volume can be increased. Such a structure is particularly effective in a case where the curvature of the secondary battery 200 is fixed in using the secondary battery 200.

The positive electrode lead 221 is electrically connected to a plurality of positive electrodes 211. The negative electrode lead 225 is electrically connected to a plurality of negative electrodes 215. The positive electrode lead 221 and the negative electrode lead 225 each include a sealing layer 220.

The exterior body 207 covers a plurality of positive electrodes 211, a plurality of negative electrodes 215, and a plurality of separators 203. The secondary battery 200 includes an electrolytic solution (not shown) in a region covered with the exterior body 207. Three sides of the exterior body 207 are bonded, whereby the secondary battery 200 is sealed.

In FIGS. 37A and 37B, the separators 203 each having a strip-like shape are used and each pair of the positive electrode 211 and the negative electrode 215 sandwich the separator 203; however, the present invention is not limited to this structure. One separator sheet may be folded in zigzag (or into a bellows shape) or wound so that the separator is positioned between the positive electrode and the negative electrode.

Figure 38:
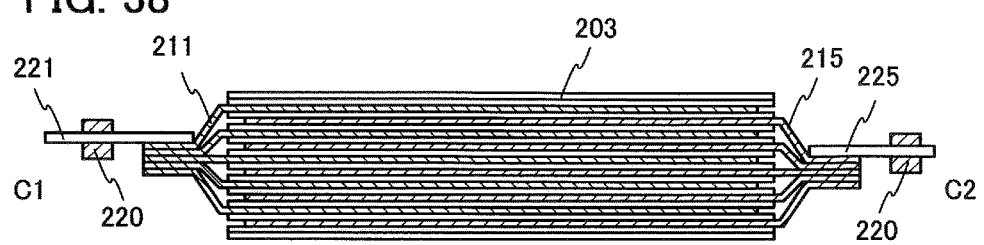
FIG. 38 illustrates an example of a power storage device.

An example of a method for fabricating the secondary battery 200 is illustrated in FIGS. 39A to 39D. FIG. 38 is a cross-sectional view along dashed-dotted line C1-C2 in FIG. 36B of the case of employing this manufacturing method.

First, the negative electrode 215 is positioned over the separator 203 (FIG. 39A) such that the negative electrode active material layer of the negative electrode 215 overlaps with the separator 203.

Then, the separator 203 is folded to overlap with the negative electrode 215. Next, the positive electrode 211 overlaps with the separator 203 (FIG. 39B) such that the positive electrode active material layer of the positive electrode 211 overlaps with the separator 203 and the negative electrode active material layer. Note that in the case of using an electrode in which one surface of a current collector is provided with an active material layer, the positive electrode active material layer of the positive electrode 211 and the negative electrode active material layer of the negative electrode 215 are positioned to face each other with the separator 203 provided therebetween.

Figure 39A:
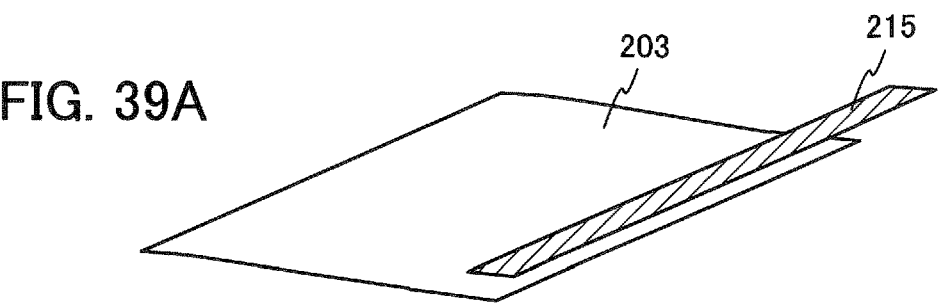
FIGS. 39A to 39D illustrate an example of a method for fabricating a power storage device.
Figure 39B:
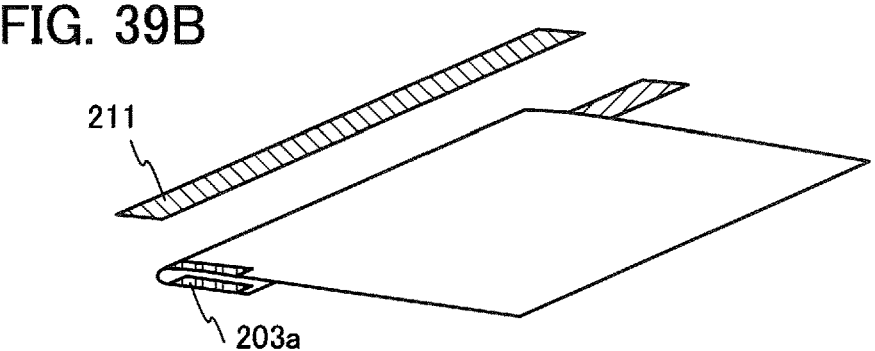

In the case where the separator 203 is formed using a material that can be thermally welded, such as polypropylene, a region where the separator 203 overlaps with itself is thermally welded and then another electrode overlaps with the separator 203, whereby the slippage of the electrode in the fabrication process can be suppressed. Specifically, a region which does not overlap with the negative electrode 215 or the positive electrode 211 and in which the separator 203 overlaps with itself, e.g., a region denoted as 203a in FIG. 39B, is preferably thermally welded.

Figure 39C:
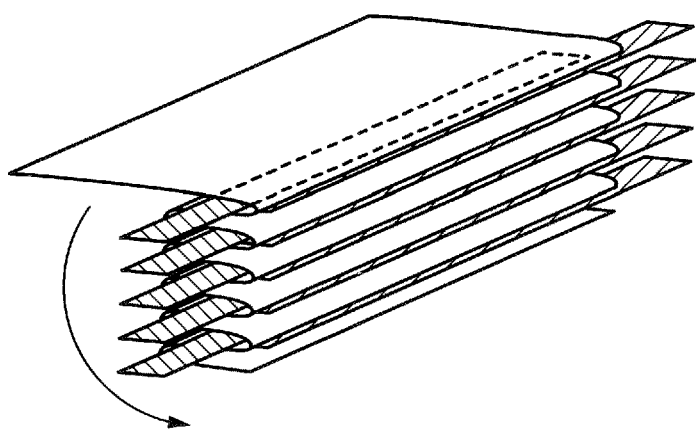

By repeating the above steps, the positive electrode 211 and the negative electrode 215 can overlap with each other with the separator 203 provided therebetween as illustrated in FIG. 39C.

Note that a plurality of positive electrodes 211 and a plurality of negative electrodes 215 may be placed to be alternately sandwiched by the separator 203 that is repeatedly folded in advance.

Then, as illustrated in FIG. 39C, a plurality of positive electrodes 211 and a plurality of negative electrodes 215 are covered with the separator 203.

Figure 39D:
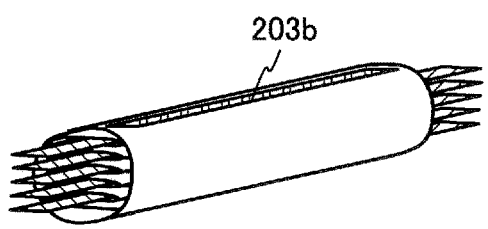

Furthermore, the region where the separator 203 overlaps with itself, e.g., a region 203b in FIG. 39D, is thermally welded as illustrated in FIG. 39D, whereby a plurality of positive electrodes 211 and a plurality of negative electrodes 215 are covered with and tied with the separator 203.

Note that a plurality of positive electrodes 211, a plurality of negative electrodes 215, and the separator 203 may be tied with a binding material.

Since the positive electrodes 211 and the negative electrodes 215 are stacked in the above process, one separator 203 has a region sandwiched between the positive electrode 211 and the negative electrode 215 and a region covering a plurality of positive electrodes 211 and a plurality of negative electrodes 215.

In other words, the separator 203 included in the secondary battery 200 in FIG. 38 and FIG. 39D is a single separator which is partly folded. In the folded regions of the separator 203, a plurality of positive electrodes 211 and a plurality of negative electrodes 215 are provided.

Structural Example 3

FIG. 40A is a perspective view of a secondary battery 250 and FIG. 40B is a top view of the secondary battery 250. Furthermore, FIG. 40C1 is a cross-sectional view of a first electrode assembly 230 and FIG. 40C2 is a cross-sectional view of a second electrode assembly 231.

The secondary battery 250 includes the first electrode assembly 230, the second electrode assembly 231, and the separator 203. The secondary battery 250 further includes the positive electrode lead 221, the negative electrode lead 225, and the exterior body 207.

As illustrated in FIG. 40C1, in the first electrode assembly 230, a positive electrode 211a, the separator 203, a negative electrode 215a, the separator 203, and the positive electrode 211a are stacked in this order. The positive electrode 211a and the negative electrode 215a each include active material layers on both surfaces of a current collector.

As illustrated in FIG. 40C2, in the second electrode assembly 231, a negative electrode 215a, the separator 203, the positive electrode 211a, the separator 203, and the negative electrode 215a are stacked in this order. The positive electrode 211a and the negative electrode 215a each include active material layers on both surfaces of a current collector.

In other words, in each of the first electrode assembly 230 and the second electrode assembly 231, the positive electrode and the negative electrode are provided such that the active material layers face each other with the separator 203 provided therebetween.

The positive electrode lead 221 is electrically connected to a plurality of positive electrodes 211. The negative electrode lead 225 is electrically connected to a plurality of negative electrodes 215. The positive electrode lead 221 and the negative electrode lead 225 each include the sealing layer 220.

Figure 41:
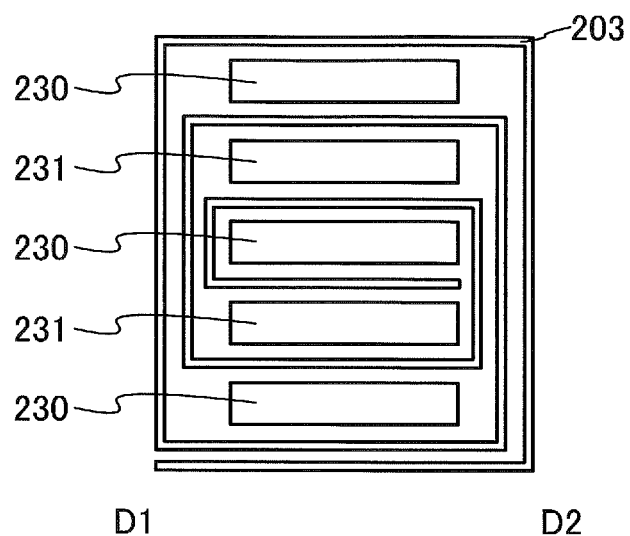
FIG. 41 illustrates an example of a power storage device.

FIG. 41 is an example of a cross-sectional view along dashed-dotted line D1-D2 in FIG. 40B. Note that FIG. 41 does not illustrate all components for clarity of the drawings.

As illustrated in FIG. 41, the secondary battery 250 has a structure in which a plurality of first electrode assemblies 230 and a plurality of second electrode assemblies 231 are covered with the wound separator 203.

The exterior body 207 covers a plurality of first electrode assemblies 230, a plurality of second electrode assemblies 231, and the separator 203. The secondary battery 200 includes an electrolytic solution (not shown) in a region covered with the exterior body 207. Three sides of the exterior body 207 are bonded, whereby the secondary battery 200 is sealed.

An example of a method for fabricating the secondary battery 250 is illustrated in FIGS. 42A to 42D.

Figure 42A:
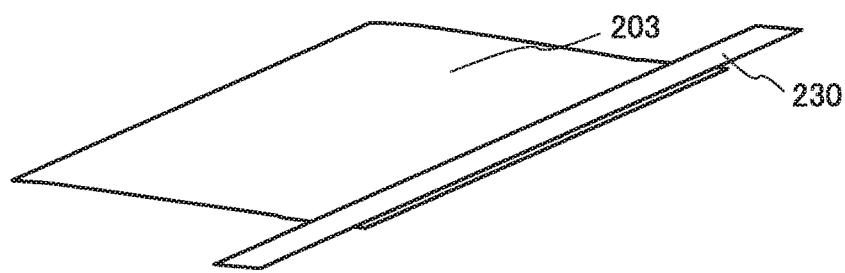
FIGS. 42A to 42D illustrate an example of a method for fabricating a power storage device.

First, the first electrode assembly 230 is positioned over the separator 203 (FIG. 42A).

Figure 42B:
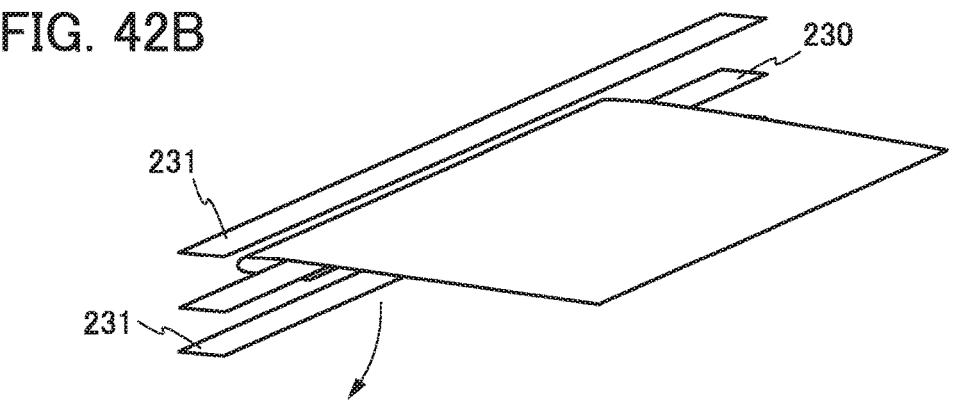

Then, the separator 203 is folded to overlap with the first electrode assembly 230. After that, two second electrode assemblies 231 are positioned over and under the first electrode assembly 230 with the separator 203 positioned between each of the second electrode assemblies 231 and the first electrode assembly 230 (FIG. 42B).

Figure 42C:
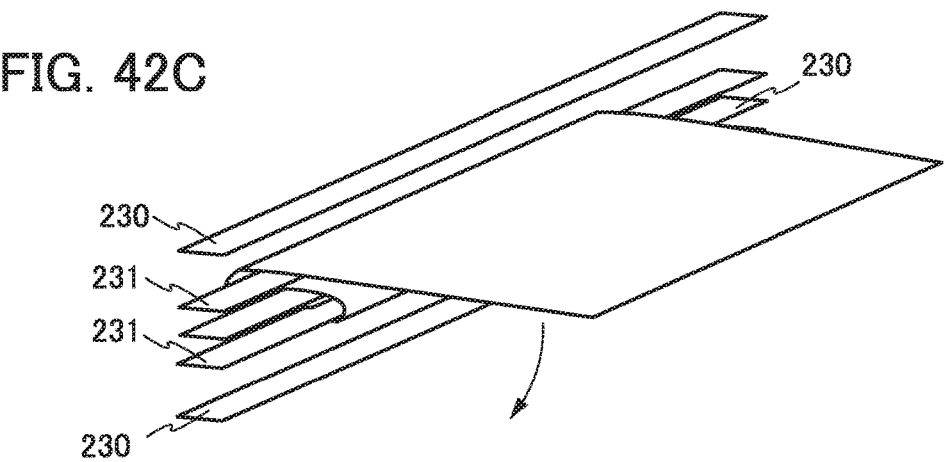

Then, the separator 203 is wound to cover the two second electrode assemblies 231. Moreover, two first electrode assemblies 230 are positioned over and under the two second electrode assemblies 231 with the separator 203 positioned between each of the first electrode assemblies 230 and each of the second electrode assemblies 231 (FIG. 42C).

Figure 42D:
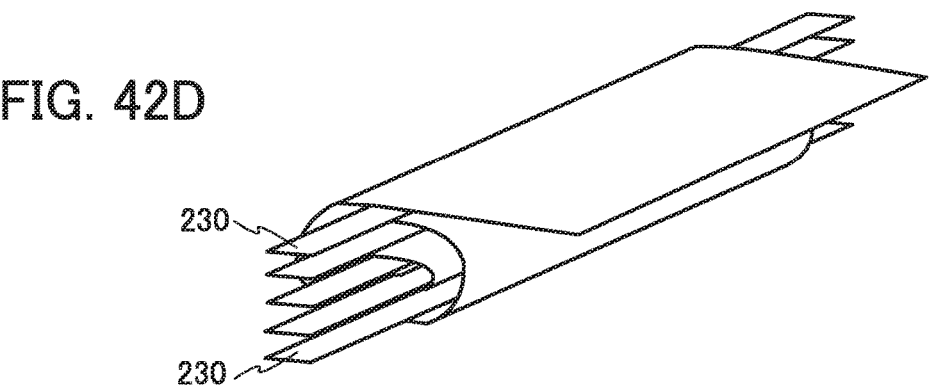

Then, the separator 203 is wound to cover the two first electrode assemblies 230 (FIG. 42D).

Since a plurality of first electrode assemblies 230 and a plurality of second electrode assemblies 231 are stacked in the above process, these electrode assemblies are each positioned surrounded with the spirally wound separator 203.

Note that the outermost electrode preferably does not include an active material layer on the outer side.

Although FIGS. 40C1 and 40C2 each illustrate a structure in which the electrode assembly includes three electrodes and two separators, one embodiment of the present invention is not limited to this structure. The electrode assembly may include four or more electrodes and three or more separators. A larger number of electrodes lead to higher capacity of the secondary battery 250. Alternatively, the electrode assembly may include two electrodes and one separator. A smaller number of electrodes enable higher resistance of the secondary battery against bending.

Although FIG. 41 illustrates the structure in which the secondary battery 250 includes three first electrode assemblies 230 and two second electrode assemblies 231, one embodiment of the present invention is not limited to this structure. The number of the electrode assemblies may be increased. A larger number of electrode assemblies lead to higher capacity of the secondary battery 250. The number of the electrode assemblies may be decreased. A smaller number of electrode assemblies enable higher resistance of the secondary battery against bending.

Figure 43:
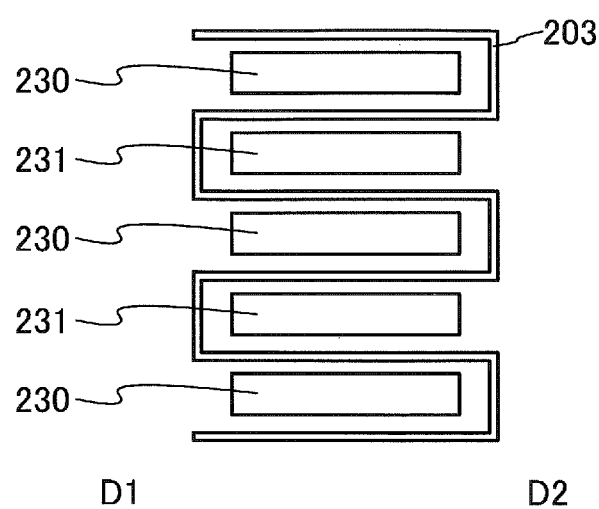
FIG. 43 illustrates an example of a power storage device.

FIG. 43 illustrates another example of a cross-sectional view along dashed-dotted line D1-D2 in FIG. 40B. As illustrated in FIG. 43, the separator 203 may be folded into a bellows shape so that the separator 203 is positioned between the first electrode assembly 230 and the second electrode assembly 231.

This embodiment can be combined with any of the other embodiments as appropriate.

Embodiment 5

In this embodiment, a power feeding system capable of feeding power to a power storage device of one embodiment of the present invention will be described with reference to FIGS. 44A and 44B to FIGS. 47A to 47C.

Power may be fed to the power storage device of one embodiment of the present invention by a method for feeding power to an object (hereinafter, also referred to as a power receiving device) in a state where contact with a power supply source (hereinafter, also referred to as a power transmitting device) is not made (such a method is also referred to as contactless power feeding, wireless feeding, or the like). Examples of the contactless power feeding include a magnetic resonance method, an electromagnetic induction method, an electrostatic induction method, and the like.

In this embodiment, a power feeding system using a magnetic resonance method is described as an example. The magnetic resonance method is a method for forming an energy propagation path by providing resonator coupling between resonance coils provided in a power transmitting device and a power receiving device. The magnetic resonance method has a longer power transmittable distance than other methods capable of contactless power feeding (e.g., an electromagnetic induction method and an electrostatic induction method).

Here, input impedance of the power receiving device can change in accordance with the charge condition of the battery. That is, the input impedance of the power receiving device can change dynamically during the power feeding. In that case, when output impedance of a power transmitting device is constant, an impedance mismatch is inevitably caused. Thus, in the power feeding by a magnetic resonance method, it may be difficult to maintain power feeding efficiency at a high level during the power feeding.

Thus, the power receiving device of one embodiment of the present invention includes a DC-DC converter configured to determine a voltage (a former voltage) proportional to a direct-current voltage input from the outside and a voltage (a latter voltage) proportional to a current input from the outside and to hold the ratio of the former voltage and the latter voltage constant on the basis thereof.

Specifically, in the DC-DC converter included in the power receiving device of one embodiment of the present invention, the ratio of the first voltage proportional to an input voltage (the first direct-current voltage) and the second voltage proportional to an input current (the current generated in the load) is held constant, whereby input impedance can be kept constant. Furthermore, impedance conversion can be performed in the DC-DC converter. Thus, in the case where a battery to which power is supplied exists on the output side of the DC-DC converter, input impedance of the DC-DC converter can be kept constant regardless of the charging state of the battery. Accordingly, when power is supplied to a power receiving device including the DC-DC converter and the battery by a magnetic resonance method, power feeding efficiency can be kept high during the power feeding.

<Power Feeding System>

Figure 44A:
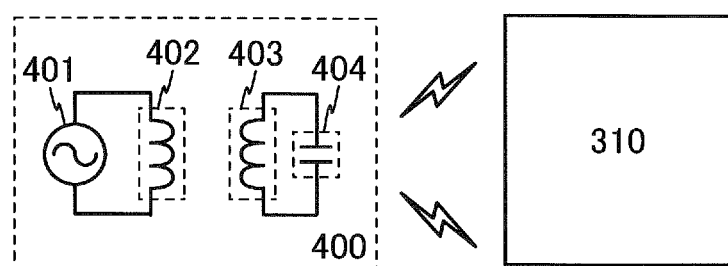
FIGS. 44A and 44B illustrate examples of a power feeding system and a power receiving system.

FIG. 44A illustrates a configuration example of a power feeding system where power feeding is performed by a magnetic resonance method. The power feeding system illustrated in FIG. 44A includes a power transmitting device 400 and a power receiving device 310 illustrated in FIG. 44B. Furthermore, the power transmitting device 400 includes a high-frequency power supply 401, a coil 402 to which a high-frequency voltage generated by the high frequency power supply 401 is applied, and a resonance coil 403 in which a high-frequency voltage is induced by electromagnetic induction with the coil 402. Note that, in the resonance coil 403, stray capacitance 404 exists between wirings forming the resonance coil 403. Note that as illustrated in FIG. 44A, it is preferred that the resonance coil 403 is not directly connected to other components.

<Power Receiving Device>

Figure 44B:
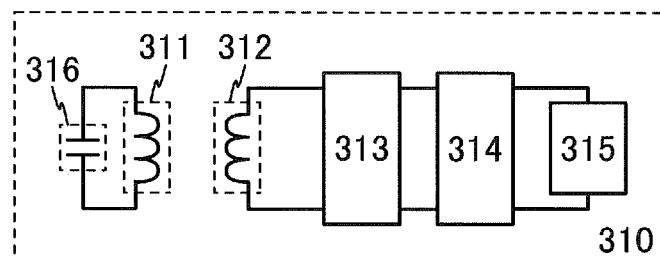

FIG. 44B is a diagram illustrating a configuration example of a power receiving device in which power feeding is performed by a magnetic resonance method. A power receiving device 310 illustrated in FIG. 44B includes a resonance coil 311 in which a high-frequency voltage is induced by magnetic resonance, a coil 312 in which a high-frequency voltage is induced by electromagnetic induction with the resonance coil 311, a rectifier circuit 313 for rectifying the high-frequency voltage induced by the coil 312, a DC-DC converter 314 to which a direct-current voltage output from the rectifier circuit 313 is input, and a battery 315 in which power feeding is performed utilizing the direct-current voltage output from the DC-DC converter. Note that, in the resonance coil 311, stray capacitance 316 exists between wirings forming the resonance coil 311.

Note that as illustrated in FIG. 44B, it is preferred that the resonance coil 311 is not directly connected to another component. If another component is directly connected to the resonance coil 311, the series resistance and capacitance of the resonance coil 311 are increased. In this case, a Q value of a circuit including the resonance coil 311 and another component is lower than that of a circuit only including the resonance coil 311. This is because the configuration where the resonance coil 311 is directly connected to another component has lower power feeding efficiency than the configuration where the resonance coil 311 is not directly connected to another component.

The DC-DC converter 314 is capable of keeping input impedance constant. Furthermore, the input impedance of the DC-DC converter 314 does not depend on the impedance of the battery 315 which exists on the output side. In other words, impedance conversion is performed by the DC-DC converter 314. Thus, the input impedance of the DC-DC converter 314 also serves as the input impedance of the power receiving device 310. Accordingly, input impedance of the power receiving device 310 does not vary even in the case where the impedance of the battery 315 varies in accordance with the charging state of the battery 315. As a result, power feeding with high power feeding efficiency is achieved regardless of the charging state of the battery 315 in the power receiving device 310.

In the power feeding system illustrated in FIG. 44A, the power receiving device 310 illustrated in FIG. 44B is used as a power receiving device. Thus, in the power feeding system in FIG. 44A, power feeding can be performed regardless of variations in input impedance of the power receiving device. That is, in the power feeding system illustrated in FIG. 44A, power feeding with high power feeding efficiency can be performed without a dynamic change in the power feeding condition.

Next, a configuration example of a DC-DC converter which can be used as the DC-DC converter 314 will be described.

Configuration Example of DC-DC Converter

Figure 45A:
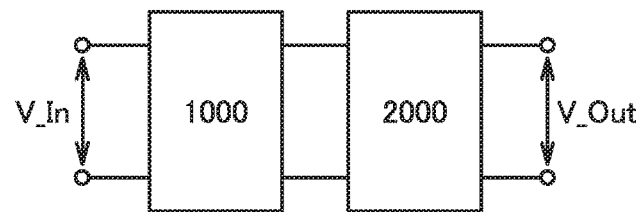
FIGS. 45A to 45D illustrate examples of DC-DC converters.

FIG. 45A illustrates a configuration example of the DC-DC converter. The DC-DC converter in FIG. 45A includes an input power determination unit 1000 to which a direct-current voltage (V_In) is input and a voltage conversion unit 2000 that converts the direct-current voltage (V_In) into a direct-current voltage (V_Out) and outputs the direct-current voltage (V_Out).

Figure 45B:
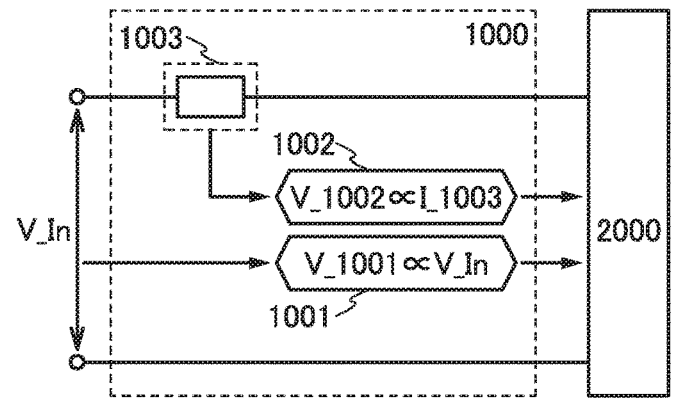
Figure 45C:
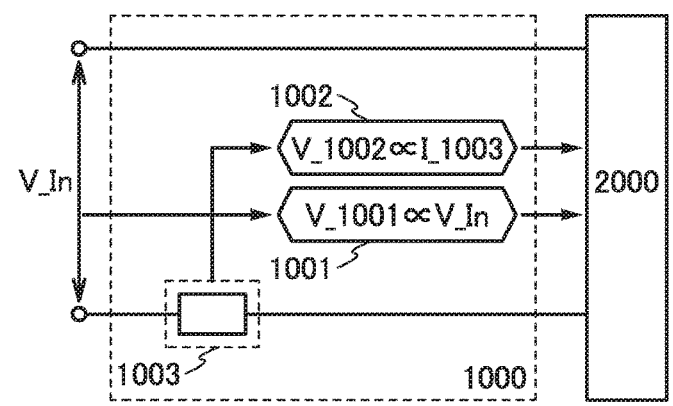

FIGS. 45B and 45C each illustrate a configuration example of the input power determination unit 1000 in FIG. 45A. The input power determination unit 1000 illustrated in FIG. 45B includes a load 1003 whose one end is electrically connected to a high-potential-side input node and whose the other end is electrically connected to the voltage conversion unit 2000, a means 1001 that determines a voltage (V_1001) proportional to the direct-current voltage (V_In), and a means 1002 that determines a voltage (V_1002) proportional to a current (I_1003) generated in the load 1003. Note that the voltage (V_1001) determined by the means 1001 and the voltage (V_1002) determined by the means 1002 are input to the voltage conversion unit 2000. Note that the input power determination unit 1000 illustrated in FIG. 45C has the same configuration as the input power determination unit 1000 illustrated in FIG. 45B except that one end of the load 1003 is electrically connected to a low-potential-side input node. In one embodiment of the present invention, as illustrated in FIGS. 45B and 45C, the load 1003 included in the input power determination unit 1000 is provided so as to be electrically connected to either the high-potential-side input node or the low-potential-side input node.

Figure 45D:
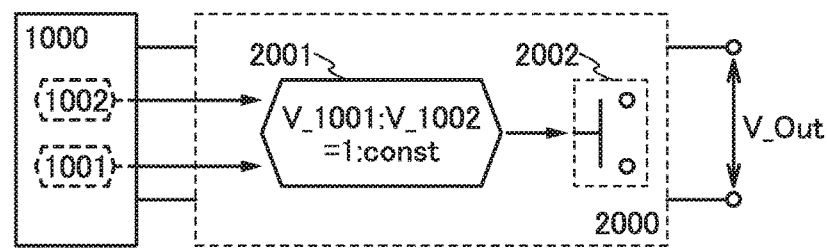

FIG. 45D illustrates a configuration example of the voltage conversion unit 2000 in FIG. 45A. The voltage conversion unit 2000 in FIG. 45D includes a switch 2002 that controls a current generated in the load 1003 by switching and a means 2001 that controls the switching of the switch 2002 in accordance with the voltage (V_1001) and the voltage (V_1002).

Note that as the voltage conversion unit 2000 illustrated in FIG. 45D, a circuit including the means 2001 and a voltage conversion circuit such as a step-up converter, a flyback converter, or an inverting converter is used, and a switch included in the voltage conversion circuit can be used as the switch 2002.

In the DC-DC converter illustrated in FIG. 45A, even in the case where an input voltage (an input direct-current voltage (V_In)) varies, input impedance can be kept constant by the control of an input current (the current (I_1003) generated in the load 1003). Specifically, in the DC-DC converter illustrated in FIGS. 45A to 45D, the current (I_1003) generated in the load 1003 can be controlled by the switching of the switch 2002. Further the switching of the switch 2002 is controlled by the means 2001. Here, the means 2001 controls the switching of the switch 2002 in accordance with the voltage (V_1001) determined by the means 1001 and the voltage (V_1002) determined by the means 1002. That is, the means 2001 controls the switching of the switch 2002 in accordance with the voltage (V_1001) proportional to the input voltage and the voltage (V_1002) proportional to the input current. Thus, in the DC-DC converter illustrated in FIGS. 45A to 45D, input impedance can be kept constant by such a design that the ratio of the voltage (V_1001) and the voltage (V_1002) is held constant by the switching of the switch 2002 controlled by the means 2001.

Example of DC-DC Converter

Figure 46A:
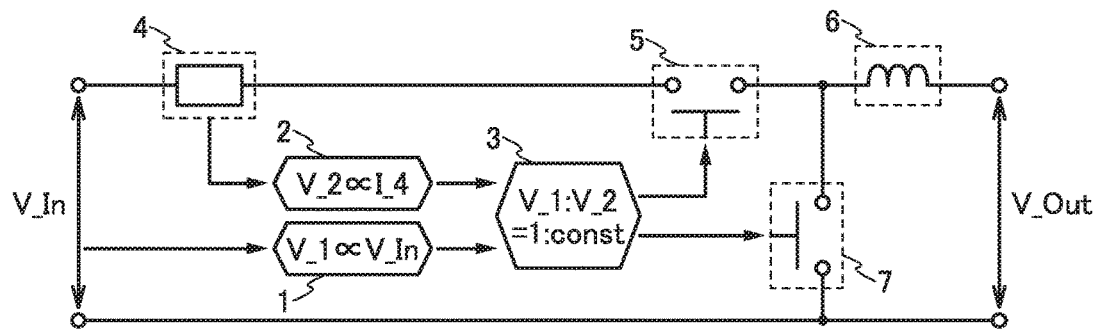
FIGS. 46A to 46D illustrate examples of DC-DC converters.

FIG. 46A illustrates an example of a DC-DC converter. The DC-DC converter illustrated in FIG. 46A includes a load 4 whose one end is electrically connected to a high-potential-side input node, a switch 5 whose one end is electrically connected to the other end of the load 4, an inductor 6 whose one end is connected to the other end of the switch 5 and whose the other end is electrically connected to a high-potential-side output node, and a switch 7 whose one end is electrically connected to the other end of the switch 5 and the one end of the inductor 6 and whose the other end is electrically connected to a low-potential-side input node and a low-potential-side output node (hereinafter this state is also referred to as "grounded"). Note that a resistance load, an inductive load, or the like can be used as the load 4. Further, a transistor, a relay, or the like can be used as the switch 5 and the switch 7. Further, an air core coil, a core coil, or the like can be used as the inductor 6.

Further, the DC-DC converter illustrated in FIG. 46A includes a means 1 which determines a voltage (V_1) proportional to an input direct-current voltage (V_In), a means 2 which determines a voltage (V_2) proportional to a current (I_4) generated in the load 4, and a means 3 which holds the ratio of the voltage (V_1) and the voltage (V_2) constant by controlling switching of the switch 5 in accordance with the voltage (V_1) and the voltage (V_2), makes the switch 7 off in a period when the switch 5 is on, and makes the switch 7 on in a period when the switch 5 is off.

In the DC-DC converter illustrated in FIG. 46A, the current (I_4) generated in the load 4 is zero in the period when the switch 5 is off; then, the current (I_4) generated in the load 4 increases with time in the period following the change of the switch 5 from the off state to the on state. This is due to self-induction of the inductor 6, and an average value of the current (I_4) that is generated in the load 4 and increases with time converges at a constant value. Thus, in the DC-DC converter illustrated in FIG. 46A, the amount of current to be output can be controlled by the switching of the switch 5.

In the DC-DC converter illustrated in FIG. 46A, the switching of the switch 5 by the means 3 is controlled in accordance with the voltage (V_1) determined by the means 1 and the voltage (V_2) determined by the means 2. Here, the means 1 is a means which determines a voltage proportional to an input voltage (voltage at an input node) and the means 2 is a means which determines a voltage proportional to an input current (current generated in the load 4). Thus, the means 3 controls the switching of the switch 5 so as to hold the ratio of the voltage (V_1) and the voltage (V_2) constant, so that the input impedance of the DC-DC converter illustrated in FIG. 46A can be kept constant.

In the DC-DC converter illustrated in FIG. 46A, the switch 7 is provided so as to prevent a breakdown of the switch 5. Specifically, in the case where the switch 5 changes from an on state to an off state, current continuously flows through the inductor 6 due to self-induction of the inductor 6. If the switch 7 is not provided, a sharp rise or drop in the potential of the node to which the other end of the switch 5 and the one end of the inductor 6 are electrically connected may occur when the switch 5 changes from an on state to an off state. Thus, in that case, a high voltage is applied to the switch 5. As a result, the switch 5 may be broken down. On the other hand, in the DC-DC converter illustrated in FIG. 46A, a current path generated in the inductor 6 can be secured by the switch 7 turned on. That is, the breakdown of the switch 5 can be prevented.

Specific Example of Means 1

Figure 46B:
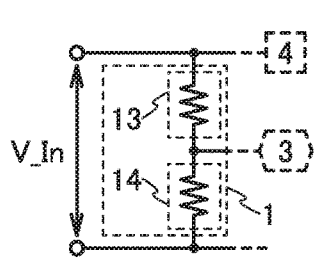

As the means 1, a circuit illustrated in FIG. 46B can be used. The circuit illustrated in FIG. 46B includes a resistor 13 whose one end is electrically connected to the high-potential-side input node and a resistor 14 whose one end is electrically connected to the other end of the resistor 13 and whose the other end is grounded. Furthermore, the potential of a node where the other end of the resistor 13 and the one end of the resistor 14 are electrically connected to each other is input to the means 3. That is, the circuit illustrated in FIG. 46B is a circuit which determines the voltage (V_1) proportional to the input voltage (V_In) utilizing resistance voltage division and outputs the voltage (V_1) to the means 3.

Specific Example of Means 2

Figure 46C:
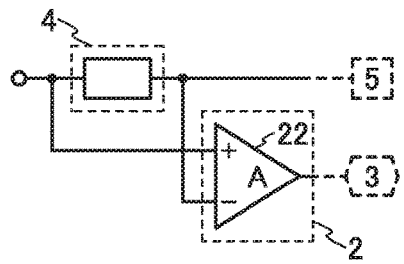

The circuit illustrated in FIG. 46C can be used as the means 2. The circuit illustrated in FIG. 46C includes an instrumentation amplifier 22 to which a voltage of the one end of the load 4 is input as a non-inverting input signal and a voltage of the other end of the load 4 is input as an inverting input signal. The instrumentation amplifier 22 outputs to the means 3 a voltage proportional to a difference between the voltage input to a non-inverting input terminal and the voltage input to an inverting input terminal. That is, the instrumentation amplifier 22 outputs to the means 3 a voltage proportional to the voltage applied between both ends of the load 4. Note that since the voltage applied between the both ends of the load 4 is proportional to the current (I_4) generated in the load 4, it can also be said that the instrumentation amplifier 22 outputs the current (I_4) generated in the load 4 to the means 3. That is, in the circuit illustrated in FIG. 46C, the instrumentation amplifier 22 determines the voltage (V_2) proportional to the current (I_4) generated in the load 4 and outputs the voltage (V_2) to the means 3.

Specific Example of Means 3

Figure 46D:
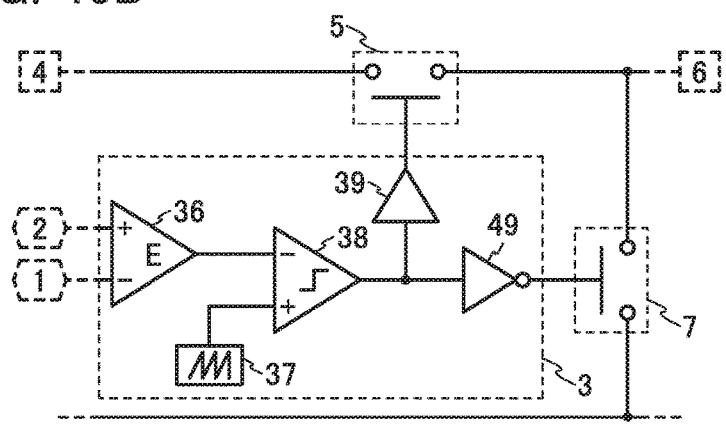

The circuit illustrated in FIG. 46D can be used as the means 3. The circuit illustrated in FIG. 46D includes an error amplifier 36 to which the voltage (V_2) determined by the means 2 and the voltage (V_1) determined by the means 1 are input as a non-inverting input signal and an inverting input signal, respectively; a triangle wave oscillator 37; a comparator 38 to which a voltage (triangle wave) output from the triangle wave oscillator 37 and a voltage output from the error amplifier 36 are input as a non-inverting input signal and an inverting input signal, respectively; a buffer 39 to which a voltage output from the comparator 38 is input and which controls the switching of the switch 5 by outputting a voltage which has the same phase as that of the voltage output from the comparator 38; and an inverter 49 which controls switching of the switch 7 by outputting a voltage that has a phase opposite to that of the voltage output from the comparator 38. Note that a configuration in which the switching of the switch 5 is directly controlled by the voltage output from the comparator 38 (a configuration in which the buffer 39 is omitted from the means 3 in FIG. 46D) can also be employed.

The error amplifier 36 amplifies a difference between the voltage input to the non-inverting input terminal and the voltage input to the inverting input terminal and outputs the amplified difference. That is, the error amplifier 36 amplifies the difference between the voltage (V_2) and the voltage (V_1) and outputs the amplified difference.

The comparator 38 compares the voltage input to the non-inverting input terminal and the voltage input to the inverting input terminal, and outputs a binary voltage. Specifically, a voltage at a high level is output in a period where the voltage output from the error amplifier 36 is lower than the triangle wave, and a voltage at a low level is output in a period where the voltage output from the error amplifier 36 is higher than the triangle wave. That is, the lower the voltage output from the error amplifier 36 is, the higher the duty cycle of the output signal of the comparator 38 becomes. The amount of current output from the DC-DC converter is determined in accordance with the duty cycle. Specifically, the higher the duty cycle is, the larger the current (the current (I_4) generated in the load 4) output from the DC-DC converter is. That is, the lower the voltage output from the error amplifier 36 is, the larger the current (I_4) generated in the load 4 is.

Here, the voltage output from the error amplifier 36 changes in accordance with the voltage (V_1) that is determined by the means 1 and is proportional to the input voltage (V_In) and the voltage (V_2) that is determined by the means 2 and is proportional to the current (I_4) generated in the load 4. For example, when the input voltage (V_In) becomes higher, the voltage output from the error amplifier 36 is lowered. In other words, when the input voltage (V_In) becomes higher, the duty cycle of the output signal of the comparator 38 becomes higher. Accordingly, in the circuit illustrated in FIG. 46D, the duty cycle of the output signal of the comparator 38 becomes high when the input voltage (V_In) becomes high; thus, the current (I_4) generated in the load 4 also becomes large. In short, in the circuit illustrated in FIG. 46D, the value of the current (I_4) generated in the load 4 can be changed in accordance with the variation in the value of the input voltage (V_In). Thus, in the circuit illustrated in FIG. 46D, by adjusting the design condition, the ratio of the voltage (V_1) that is determined by the means 1 and is proportional to the input voltage and the voltage (V_2) that is determined by the means 2 and is proportional to the current (I_4) generated in the load 4 can be held constant.

Figure 47A:
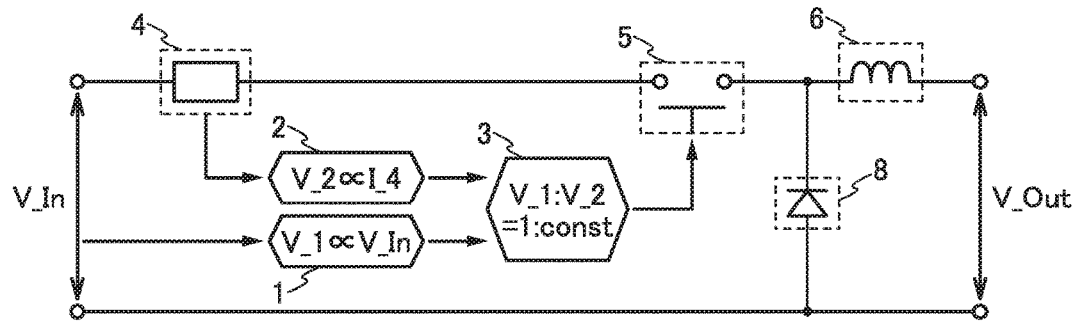
FIGS. 47A to 47C illustrate examples of DC-DC converters.
Figure 47B:
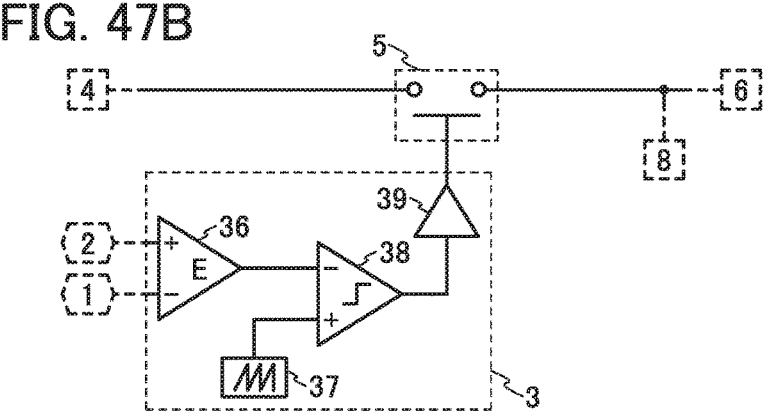

The DC-DC converter illustrated in FIG. 47A has a configuration in which the switch 7 of the DC-DC converter illustrated in FIG. 46A is replaced with a diode 8. The DC-DC converter illustrated in FIG. 47A has the same function and effect as those in FIG. 46A.

Note that in the DC-DC converter illustrated in FIG. 47A, the circuit illustrated in FIG. 46B can be used as the means 1, and the circuit illustrated in FIG. 46C can be used as the means 2. Furthermore, the circuit illustrated in FIG. 47B can be used as the means 3. In short, the circuit illustrated in FIG. 47B has a configuration in which the inverter 49 is omitted from the circuit illustrated in FIG. 46D.

Figure 47C:
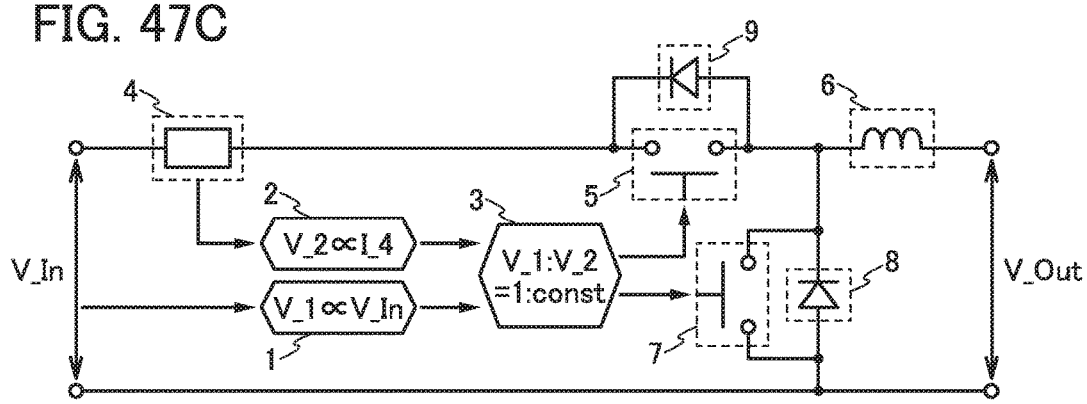

Further, as illustrated in FIG. 47C, the DC-DC converter illustrated in FIG. 46A to which the diode 8 illustrated in FIG. 47A and a diode 9 whose anode is electrically connected to the other end of the switch 5, the one end of the inductor 6, the one end of the switch 7, and a cathode of the diode 8, and whose cathode is electrically connected to the other end of the load 4 and the one end of the switch 5 are added may be used. Accordingly, an effect of suppressing breakdown of the switch 5 can be enhanced.

The DC-DC converter illustrated in FIG. 47C from which only the diode 8 or 9 is omitted may be used as the DC-DC converter 314.

This embodiment can be combined with any of the other embodiments as appropriate.

Embodiment 6

In this embodiment, a light-emitting panel that can be used for the light-emitting device of one embodiment of the present invention will be described with reference to FIGS. 48A to 48D to FIGS. 50A to 50C. In this embodiment, an example where an organic EL element is used as a light-emitting element will be described. In addition, a display panel that can be used for the display device of one embodiment of the present invention will be described with reference to FIGS. 51A to 51C and FIG. 52. In this embodiment, an example where a liquid crystal element is used as the display element will be mainly described.

<<Light-Emitting Panel>>

The organic EL element includes a layer containing a light-emitting organic compound (also referred to as an EL layer) between a pair of electrodes (a lower electrode and an upper electrode). When a voltage higher than the threshold voltage of the light-emitting element is applied between the lower electrode and the upper electrode, holes are injected to the EL layer from the anode side and electrons are injected to the EL layer from the cathode side. The injected electrons and holes are recombined in the EL layer, so that a light-emitting substance contained in the EL layer emits light.

The organic EL element may have any of a top emission structure, a bottom emission structure, and a dual emission structure. A conductive film that transmits visible light is used as the electrode through which light is extracted. A conductive film that reflects visible light is preferably used as the electrode through which light is not extracted.

Each of the layers included in the EL layer can be formed by any of the following methods: an evaporation method (including a vacuum evaporation method), a transfer method, a printing method, an inkjet method, a coating method, and the like.

The EL layer includes at least a light-emitting layer. The light-emitting layer includes a light-emitting organic compound.

In addition to the light-emitting layer, the EL layer may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

Structural Example 1 of Light-Emitting Panel

FIG. 48A is a top view illustrating a light-emitting panel. FIG. 48B is a cross-sectional view along dashed-dotted line P1-Q1 in FIG. 48A. FIG. 48C is a cross-sectional view along dashed-dotted line P2-Q2 in FIG. 48A. FIG. 48D is a cross-sectional view along dashed-dotted line P3-Q3 in FIG. 48A.

The light-emitting panel illustrated in FIGS. 48A to 48D includes a substrate 901, an insulating layer 903, an auxiliary electrode 921 (also referred to as an auxiliary wiring), a light-emitting element 930, an insulating layer 925, an adhesive layer 927, a conductive layer 911, a conductive layer 912, a drying agent 913, and a substrate 991.

The light-emitting element 930 is an organic EL element having a bottom-emission structure; specifically, a lower electrode 931 transmitting visible light is provided over the substrate 901, an EL layer 933 is provided over the lower electrode 931, and an upper electrode 935 reflecting visible light is provided over the EL layer 933.

In the light-emitting panel illustrated in FIGS. 48A to 48D, the light-emitting element 930 is provided over the substrate 901 with the insulating layer 903 provided therebetween. The auxiliary electrode 921 provided over the insulating layer 903 is electrically connected to the lower electrode 931. The conductive layer 911 provided over the insulating layer 903 is electrically connected to the lower electrode 931. As illustrated in FIGS. 48A and 48C, part of the conductive layer 911 is exposed and functions as a terminal. The conductive layer 912 provided over the insulating layer 903 is electrically connected to the upper electrode 935. As illustrated in FIGS. 48A and 48D, part of the conductive layer 912 is exposed and functions as a terminal. The end portion of the lower electrode 931 is covered with the insulating layer 925. The insulating layer 925 is provided to cover the auxiliary electrode 921 with the lower electrode 931 provided therebetween.

The light-emitting element 930 is sealed with the substrate 901, the substrate 991, and the adhesive layer 927. A method for sealing the light-emitting panel is not limited, and either solid sealing or hollow sealing can be employed. For example, a glass material such as a glass frit, or a resin material such as a two-component-mixture-type resin which is curable at room temperature, a light curable resin, or a thermosetting resin can be used for the adhesive layer 927. The sealed space 929 may be filled with an inert gas such as nitrogen or argon, or a resin that can be used for the adhesive layer. Furthermore, a drying agent may be contained in the resin.

The drying agent 913 is provided in contact with the substrate 991. Since the light-emitting panel illustrated in FIGS. 48A to 48D has a bottom-emission structure, the drying agent 913 can be provided in the space 929 without reducing light extraction efficiency. With the drying agent 913, the lifetime of the light-emitting element 930 can be increased, which is preferable.

Structural Example 2 of Light-Emitting Panel

FIGS. 49A to 49D illustrate an example of a passive matrix light-emitting panel. In a passive matrix light-emitting panel, a plurality of anodes arranged in stripes (in stripe form) are provided to be perpendicular to a plurality of cathodes arranged in stripes, and an EL layer is interposed at each intersection. Therefore, a pixel at an intersection of an anode selected (to which a voltage is applied) and a cathode selected emits light.

Figure 49A:
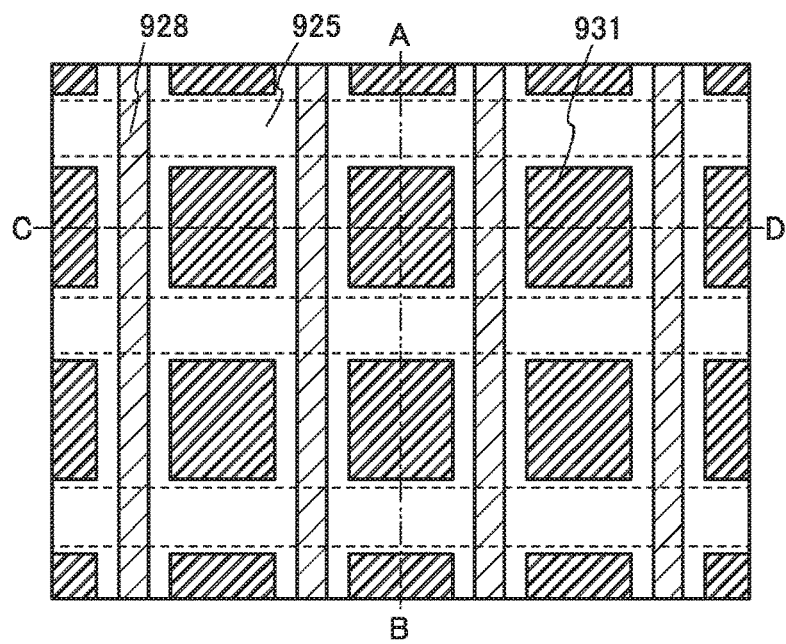
FIGS. 49A to 49D illustrate an example of a light-emitting panel.

FIG. 49A is a plan view illustrating a light-emitting panel before an EL layer is formed. The lower electrode 931 is provided over a substrate. The insulating layer 925 having openings corresponding to light-emitting regions of light-emitting elements is provided over the lower electrode 931. Over the insulating layer 925, a plurality of inversely tapered partitions 928 which are parallel to each other are provided to intersect with the lower electrode 931.

Figure 49B:
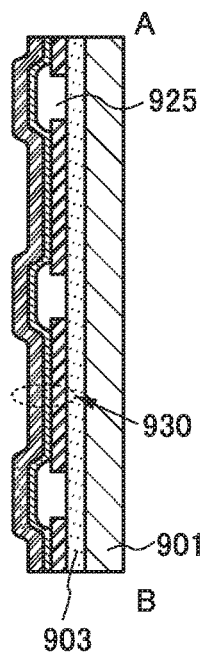
Figure 49C:
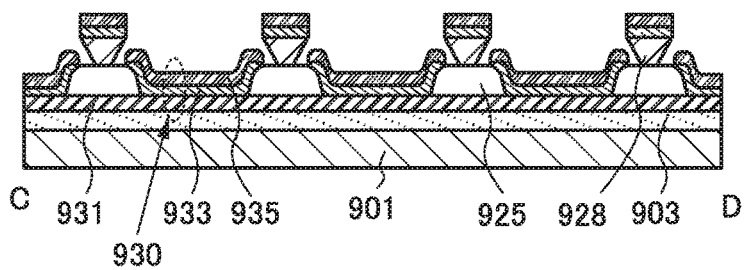

FIG. 49B is a cross-sectional view along dashed-dotted line A-B in FIG. 49A, and FIG. 49C is a cross-sectional view along dashed-dotted line C-D in FIG. 49A. FIGS. 49B and 49C illustrate a structure after the EL layer 933 and the upper electrode 935 are formed over the lower electrode 931 to constitute the light-emitting element 930.

FIGS. 49B and 49C illustrate an example where the insulating layer 903 is provided over the substrate 901 and a plurality of lower electrodes 931 are arranged in stripes at regular intervals over the insulating layer 903.

As illustrated in FIG. 49C, the total thickness of the insulating layer 925 and the partition 928 is set to be larger than the total thickness of the EL layer 933 and the upper electrode 935; thus, the EL layer 933 and the upper electrode 935 are each divided into a plurality of regions. The upper electrodes 935 are electrodes in stripes which are parallel to each other and extend in a direction intersecting with the lower electrodes 931. The plurality of separated regions are electrically isolated from one another. Although layers of materials used for the EL layers 933 and the upper electrodes 935 are formed over the partitions 928, they are isolated from the EL layers 933 and the upper electrodes 935.

By forming the EL layers 933 (at least light-emitting layers) side by side, different light-emitting elements exhibit light of different colors; thus, a light-emitting panel capable of full-color display can be provided. Alternatively, the light-emitting elements 930 emit white light and light emitted from the light-emitting elements 930 is extracted through color filters; thus, a light-emitting panel capable of full-color display can be provided.

Figure 49D:
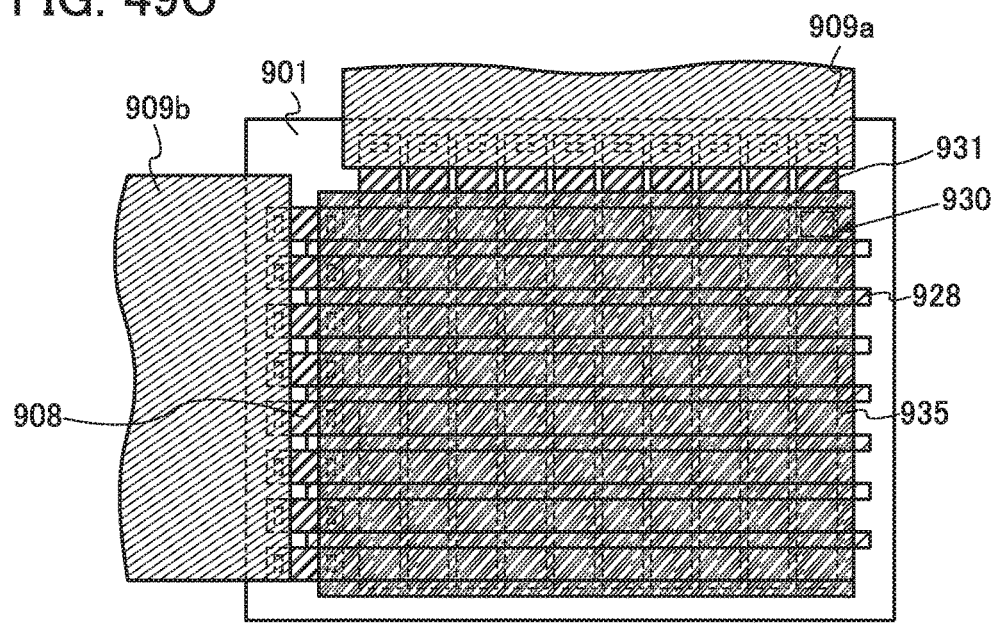

FIG. 49D is a plan view of the case where a passive matrix light-emitting panel is provided with an FPC and the like. In FIG. 49D, a plurality of lower electrodes 931 and a plurality of upper electrodes 935 intersect with each other so that they are perpendicular to each other. In FIG. 49D, some components (the EL layer 933 and the like) are not illustrated.

The plurality of lower electrodes 931 are connected to an FPC 909a through an anisotropic conductive film (not illustrated). The plurality of upper electrodes 935 are electrically connected at their ends to wirings 908, and the wirings 908 are connected to an FPC 909b through an anisotropic conductive film (not illustrated).

Although FIG. 49D illustrates an example in which a driver circuit is not provided over the substrate 901, an IC chip including a driver circuit may be mounted on the substrate 901.

Structural Example 3 of Light-Emitting Panel

As methods for forming a light-emitting element over a substrate having flexibility (also referred to as a flexible substrate) in the case of fabricating a flexible light-emitting panel, there are methods such as a first method in which the light-emitting element is directly formed over a flexible substrate, and a second method in which the light-emitting element is formed over a highly heat-resistant substrate (hereinafter referred to as a formation substrate) that is different from a flexible substrate and the light-emitting element is then separated from the formation substrate and transferred to the flexible substrate.

When a substrate that is resistant to heat applied in the process of forming the light-emitting element, such as a glass substrate thin enough to have flexibility, is used, the first method is preferably employed, in which case the process can be simplified.

When the second method is employed, an insulating film with low water permeability or the like that is formed over a formation substrate at high temperature can be transferred to a flexible substrate. Thus, even when an organic resin with high water permeability and low heat resistance or the like is used as a material of the flexible substrate, a flexible light-emitting panel with high reliability can be fabricated.

FIG. 50A illustrates an example of a light-emitting panel which can be fabricated by the second method. The light-emitting panel illustrated in FIG. 50A is a top-emission light-emitting panel using a color filter method. The light-emitting panel can have, for example, a structure in which sub-pixels of three colors of red (R), green (G), and blue (B) express one color, or a structure in which sub-pixels of four colors of R, G, B, and white (W) or sub-pixels of four colors of R, G, B, and yellow (Y) express one color. There is no particular limitation on the color element and colors other than R, G, B, W, and Y may be used. For example, cyan, magenta, or the like may be used.

The light-emitting panel illustrated in FIG. 50A includes the substrate 901, an adhesive layer 902, the insulating layer 903, a transistor 920, an insulating layer 907, an insulating layer 909, a conductive layer 941, an insulating layer 943, an insulating layer 945, the light-emitting element 930, the insulating layer 925, a spacer 926, the adhesive layer 927, coloring layers 845R, 845G, 845B, and 845Y, a light-blocking layer 847, an insulating layer 993, an adhesive layer 992, and the substrate 991. The substrate 901 and the substrate 991 are flexible substrates, and the light-emitting panel illustrated in FIG. 50A has flexibility.

The light-emitting element 930 includes the lower electrode 931, an optical adjustment layer 932, the EL layer 933, and the upper electrode 935. It is preferable to use a conductive material having a light-transmitting property for the optical adjustment layer 932. Owing to the combination of a color filter (the coloring layer) and a microcavity structure (the optical adjustment layer), light with high color purity can be extracted from the light-emitting panel. The thickness of the optical adjustment layer is varied in accordance with the emission color of the pixel.

The substrate 901 and the insulating layer 903 are bonded to each other with the adhesive layer 902. The substrate 991 and the insulating layer 993 are bonded to each other with the adhesive layer 992. The transistor 920 and the light-emitting element 930 are formed over the insulating layer 903. At least one of the insulating layer 903 and the insulating layer 993 is preferably highly resistant to moisture, in which case impurities such as water can be prevented from entering the light-emitting element 930 or the transistor 920, leading to higher reliability of the light-emitting panel.

One of a source and a drain of the transistor 920 is electrically connected to the lower electrode 931 of the light-emitting element 930 through the conductive layer 941. The transistor 920 includes a second gate on the same plane as the conductive layer 941. An end portion of the lower electrode 931 is covered with the insulating layer 925. The lower electrode 931 preferably reflects visible light. The upper electrode 935 transmits visible light. The spacer 926 can adjust the distance between the substrate 901 and the substrate 991.

Each coloring layer has a portion overlapping with the light-emitting element 930. The light-blocking layer 847 has a portion overlapping with the insulating layer 925. The space between the light-emitting element 930 and each coloring layer is filled with the adhesive layer 927.

The insulating layers 907 and 909 each have an effect of suppressing diffusion of impurities into a semiconductor included in the transistor. As the insulating layers 943 and 945, an insulating layer having a planarization function is preferably selected in order to reduce surface unevenness due to the transistors and the wirings.

According to one embodiment of the present invention, the light-emitting panel may include a touch sensor. For example, as illustrated in FIG. 50B, a capacitor may be provided between the insulating layer 993 and the light-blocking layer 847 and between the insulating layer 993 and the coloring layer. A plurality of conductive layers 981 are provided in contact with the insulating layer 993. The plurality of conductive layers 981 are electrically connected by a conductive layer 983 through openings in the insulating layer 982. An insulating layer 984 is provided to reduce surface unevenness due to the capacitors. The coloring layer or the light-blocking layer 847 is provided in contact with the insulating layer 984. The capacitor is formed using a material which transmits light emitted from the light-emitting element 930.

The EL layers 933 may be formed side by side as illustrated in FIG. 50C; in other words, the EL layers 933 that emit light of different colors may be provided.

For each of the substrates, a material such as glass, quartz, an organic resin, a metal, or an alloy can be used. The substrate on the side from which light from the light-emitting element is extracted is formed using a material which transmits the light. It is particularly preferable to use a flexible substrate. For example, an organic resin; a glass material, a metal, or an alloy that is thin enough to have flexibility; or the like can be used.

Any of a variety of curable adhesives, e.g., light curable adhesives such as a UV curable adhesive, a reactive curable adhesive, a thermal curable adhesive, and an anaerobic adhesive can be used for the adhesive layer. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. Alternatively, a two-component-mixture-type resin may be used. Still alternatively, an adhesive sheet or the like may be used.

There is no particular limitation on the structure of the transistor in the light-emitting panel. For example, a forward staggered transistor or an inverted staggered transistor may be used. Furthermore, a top-gate transistor or a bottom-gate transistor may be used. A semiconductor material used for the transistors is not particularly limited, and for example, silicon, germanium, or an organic semiconductor can be used. Alternatively, an oxide semiconductor containing at least one of indium, gallium, and zinc, such as an In—Ga—Zn-based metal oxide, may be used.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferred that a semiconductor having crystallinity is used, in which case deterioration of the transistor characteristics can be inhibited.

<<Display Panel>>

Figure 51A:
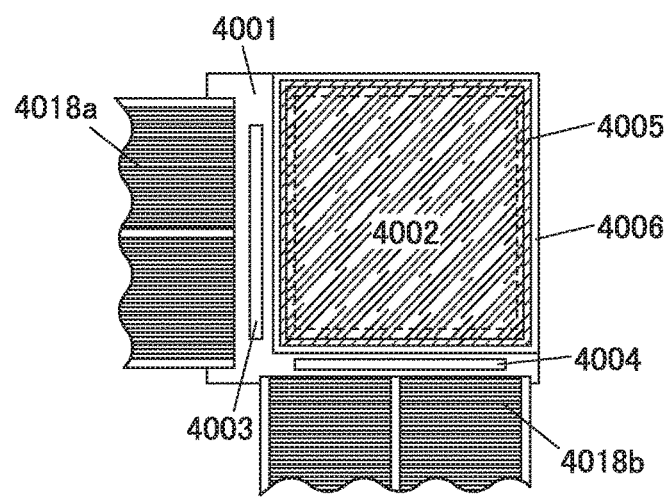
FIGS. 51A to 51C illustrate examples of display panels.

In FIG. 51A, a sealant 4005 is provided so as to surround a pixel portion 4002 provided over a first substrate 4001. The pixel portion 4002 is sealed with the first substrate 4001, the sealant 4005, and a second substrate 4006. In FIG. 51A, a signal line driver circuit 4003 and a scan line driver circuit 4004 each are formed using a single-crystal semiconductor or a polycrystalline semiconductor over a substrate prepared separately, and mounted in a region different from the region surrounded by the sealant 4005 over the first substrate 4001. Further, various signals and potentials are supplied to the signal line driver circuit 4003, the scan line driver circuit 4004, and the pixel portion 4002 from FPCs 4018a and 4018b.

Figure 51B:
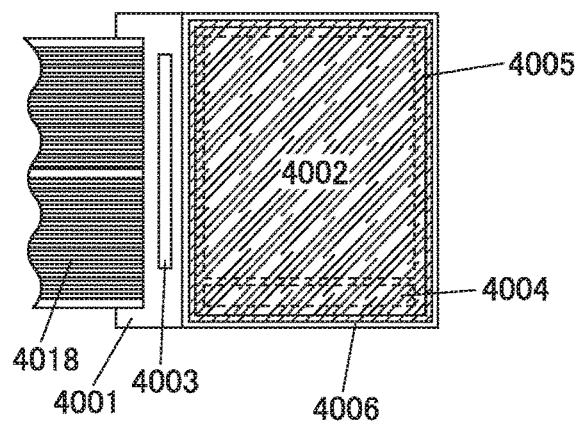
Figure 51C:
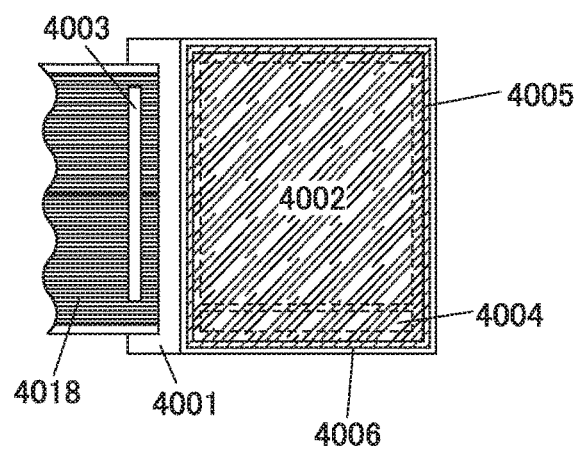

In FIGS. 51B and 51C, the sealant 4005 is provided so as to surround the pixel portion 4002 and the scan line driver circuit 4004 which are provided over the first substrate 4001. The pixel portion 4002 and the scan line driver circuit 4004 are sealed with the first substrate 4001, the sealant 4005, and the second substrate 4006. In FIGS. 51B and 51C, a signal line driver circuit 4003 formed using a single crystal semiconductor or a polycrystalline semiconductor over a substrate separately prepared is mounted in a region different from the region surrounded by the sealant 4005 over the first substrate 4001. In FIGS. 51B and 51C, various signals and potentials are supplied to the signal line driver circuit 4003, the scan line driver circuit 4004, and the pixel portion 4002 from an FPC 4018.

Although FIGS. 51B and 51C each illustrate an example in which the signal line driver circuit 4003 is formed separately and mounted on the first substrate 4001, this structure is not necessarily employed. The scan line driver circuit may be separately formed and then mounted, or only part of the signal line driver circuit or part of the scan line driver circuit may be separately formed and then mounted.

Note that a connection method of a separately formed driver circuit is not particularly limited, and wire bonding method, COG, TCP, COF, or the like can be used. FIG. 51A illustrates an example in which the signal line driver circuit 4003 and the scan line driver circuit 4004 are mounted by COG. FIG. 51B illustrates an example in which the signal line driver circuit 4003 is mounted by a COG method. FIG. 51C illustrates an example in which the signal line driver circuit 4003 is mounted by TCP.

The pixel portion 4002 and the scan line driver circuit 4004 which are provided over the first substrate 4001 include a plurality of transistors.

Figure 52:
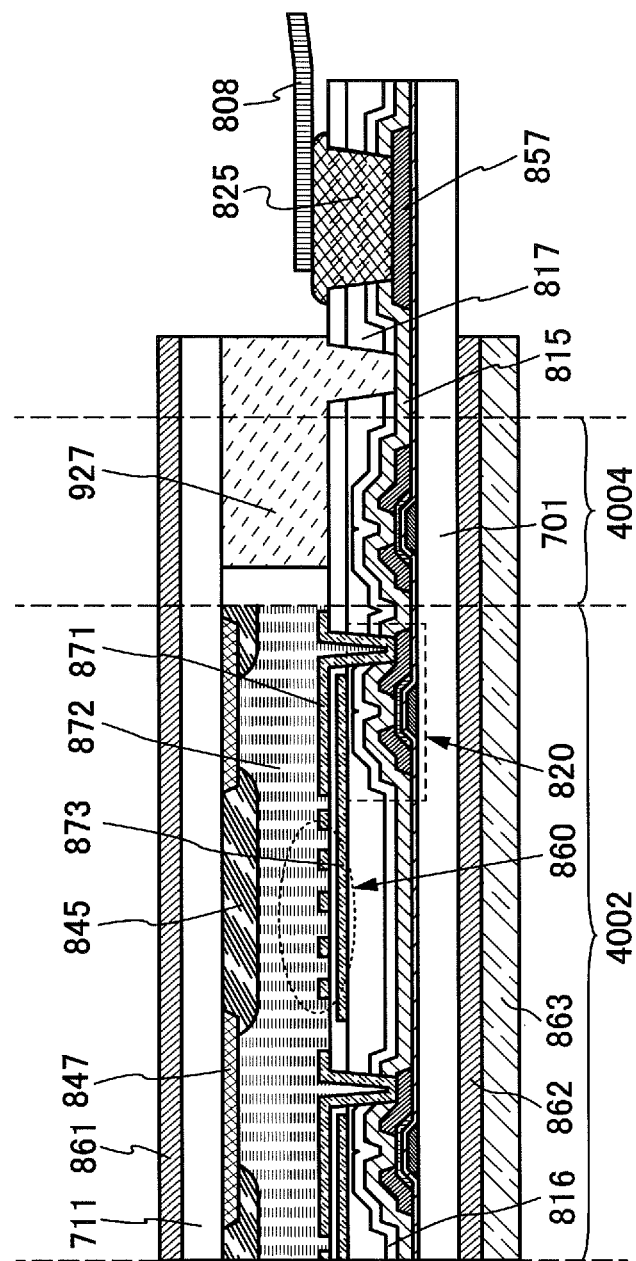
FIG. 52 illustrates an example of a liquid crystal panel.

FIG. 52 illustrates an example of a display panel including a liquid crystal element as a display element. In FIG. 52, a liquid crystal element using a fringe field switching (FFS) mode is used. The display panel in FIG. 52 includes the scan line driver circuit 4004 and the pixel portion 4002; specifically, the display panel includes a substrate 701, a substrate 711, a transistor 820, a liquid crystal element 860, polarizing plates 861 and 862, a backlight 863, insulating layers 815, 816, and 817, a conductive layer 857, a bonding layer 927, a connector 826, an FPC 808, and the like. The liquid crystal element 860 includes a comb-shaped first electrode 871, liquid crystal 872, and a second electrode 873.

In the case where a liquid crystal element is used as the display element, thermotropic liquid crystal, low-molecular liquid crystal, high-molecular liquid crystal, polymer dispersed liquid crystal, ferroelectric liquid crystal, anti-ferroelectric liquid crystal, or the like can be used. Such a liquid crystal material exhibits a cholesteric phase, a smectic phase, a cubic phase, a chiral nematic phase, an isotropic phase, or the like depending on a condition. Alternatively, liquid crystal which exhibits a blue phase and for which an alignment film is unnecessary may be used.

In a transistor including an oxide semiconductor, relatively high field-effect mobility can be obtained; thus, high-speed operation is possible. Consequently, when the transistor including an oxide semiconductor is used in a pixel portion of a semiconductor device having a display function, high-quality images can be obtained. Furthermore, a driver circuit portion and the pixel portion can be formed over one substrate; thus, the number of components of the semiconductor device can be reduced.

For the liquid crystal display panel, other than an FFS mode, a twisted nematic (TN) mode, an in-plane-switching (IPS) mode, an axially symmetric aligned micro-cell (ASM) mode, an optical compensated birefringence (OCB) mode, a ferroelectric liquid crystal (FLC) mode, an antiferroelectric liquid crystal (AFLC) mode, or the like can be used.

The display panel can be a normally black liquid crystal display panel such as a transmissive liquid crystal display panel utilizing a vertical alignment (VA) mode. Here, the vertical alignment mode is a method of controlling alignment of liquid crystal molecules of a liquid crystal display panel, in which liquid crystal molecules are aligned vertically to a panel surface when no voltage is applied. Some examples are given as the vertical alignment mode. For example, a multi-domain vertical alignment (MVA) mode, a patterned vertical alignment (PVA) mode, an Advanced Super View (ASV) mode, or the like can be used. Furthermore, it is possible to use a method called domain multiplication or multi-domain design, in which a pixel is divided into some regions (subpixels) and molecules are aligned in different directions in their respective regions.

In the display panel, a black matrix (a light-blocking layer), an optical member (an optical substrate) such as a polarizing member, a retardation member, or an anti-reflection member, and the like are provided as appropriate. For example, circular polarization may be employed by using a polarizing substrate and a retardation substrate. In addition, a backlight, a side light, or the like may be used as a light source.

As a display method in the pixel portion, a progressive method, an interlace method or the like can be employed. Furthermore, color elements controlled in a pixel at the time of color display are not limited to three colors: R, G, and B (R, G, and B correspond to red, green, and blue, respectively). For example, R, G, B, and W (W corresponds to white); or R, G, B, and one or more of yellow, cyan, magenta, and the like can be used. Note that the size of a display region may be different between dots of the color components. However, one embodiment of the present invention is not limited to a color display panel and can be applied to a monochrome display panel.

In this specification and the like, a display panel and a light-emitting panel can employ various modes or can include various elements. Examples of the display element include an EL element (an EL element containing organic and inorganic materials, an organic EL element, or an inorganic EL element), an LED (a white LED, a red LED, a green LED, a blue LED, or the like), a liquid crystal element, an electrophoretic element, and a display element using a micro electro mechanical systems (MEMS).

This embodiment can be combined with any of the other embodiment as appropriate.

Embodiment 7

In this embodiment, electronic devices of embodiments of the present invention will be described with reference to FIGS. 53A to 53E to FIGS. 55A to 55G.

A power storage device, a light-emitting device, a display device, or the like to which one embodiment of the present invention is applied can be used for an electronic device. A power storage device, a light-emitting device, a display device, or the like for which one embodiment of the present invention is used includes a member with rubber elasticity.

The member with rubber elasticity has a plurality of projections. When the electronic device is bent, two adjacent projections come in contact with each other, preventing a user from excessively bending the electronic device. One embodiment of the present invention can prevent the electronic device from being broken by being excessively bent, improving the safety and reliability of the electronic device.

Examples of electronic devices include a television set (also referred to as a television or a television receiver), a monitor of a computer or the like, a digital camera, a digital video camera, a digital photo frame, a mobile phone (also referred to as a mobile phone device), a portable game machine, a portable information terminal, an audio reproducing device, a large game machine such as a pinball machine, and the like.

Since the power storage device, light-emitting device, display device, or the like of one embodiment of the present invention is flexible, any of the devices or the electronic device using any of the above devices can be incorporated along a curved inside/outside wall surface of a house or a building or a curved interior/exterior surface of a moving object (e.g., a motor vehicle, an airplane, a train, or a watercraft).

First, an arm-worn portable information terminal of one embodiment of the present invention will be described with reference to FIGS. 53A to 53E. Note that one embodiment of the present invention can be used for a portable information terminal that is worn on a waist, an ankle, or the like as well as an arm-worn portable information terminal that is worn on a wrist, an upper arm, or the like.

The arm-worn (or watch-type) portable information terminal described as an example in this embodiment may have a communication function and may be capable of sending and receiving e-mails by itself, for example. The portable information terminal is preferably capable of executing a variety of applications such as mobile phone calls, e-mailing, reading and editing texts, music reproduction, Internet communication, and a computer game.

Alternatively, the arm-worn (or watch-type) portable information terminal may be connected with or without wire to another portable information terminal or a mobile phone such as a smartphone so as to send and receive e-mails, for example. For example, when a display portion of the arm-worn (or watch-type) portable information terminal is used together with a display portion of a smartphone, the display portion of the arm-worn (or watch-type) portable information terminal may be used as a subdisplay.

Furthermore, the portable information terminal may be capable of employing near field communication conformable to a communication standard. In that case, for example, mutual communication between the portable information terminal and a headset capable of wireless communication can be performed, and thus hands-free calling is possible.

The arm-worn (or watch-type) portable information terminal includes at least one of a button, a switch, and a touch panel. With the button or switch, a variety of functions such as time setting, on/off of the power, on/off of wireless communication, setting and cancellation of a silent mode, and setting and cancellation of a power saving mode can be performed. Alternatively, any of these operations can be performed by controlling the touch panel. The functions of the button or switch can be set freely by setting an operating system incorporated in the portable information terminal.

The arm-worn (or watch-type) portable information terminal described as an example in this embodiment preferably includes a sensor that measures the user's biological information such as the heart rate, the breath rate, the pulse, the temperature, or the blood pressure.

For example, an optical sensor can be used to measure a heart rate from contraction of capillaries of an arm or the like.

Alternatively, a sensor that can sense whether the portable information terminal is worn on the user's arm from the electric conductivity of his/her skin can be used so that the portable information terminal can be automatically powered on and off.

Any of these sensors is preferably provided on the surface side of the portable information terminal on which it is in contact with the user's arm.

Furthermore, the portable information terminal may be capable of measuring data of the usage environment, and may include a UV sensor or an illuminance sensor, for example. The amount of ultraviolet light can be determined to be used by a user for measures against sunburn. Alternatively, the brightness of the display portion may be capable of being automatically adjusted according to the ambient illuminance. Any of these sensors is preferably provided on the display surface side of the portable information terminal, for example.

Furthermore, the portable information terminal may be capable of receiving GPS (Global positioning System) signals.

Furthermore, the portable information terminal is preferably capable of charging a secondary battery without contact. Alternatively, the portable information terminal preferably includes a photoelectric conversion element so that a secondary battery can be charged using the photoelectric conversion element. It is preferred that the secondary battery can be charged by photovoltaic power generation, for example.

The arm-worn (or watch-type) portable information terminal 300 in FIG. 53A includes a display portion 301, a battery 303, a hinge 305, a housing 307, and the like. The display portion 301, the battery 303, and the housing 307 each have flexibility. This allows the portable information terminal 300 to be easily curved to have a desired shape. For example, a flexible light-emitting panel or display panel can be used as the display portion 301. As the battery 303, a flexible secondary battery can be used. One embodiment of the present invention can prevent the display portion 301 and the battery 303 from being broken by being excessively bent; thus, the portable information terminal 300 can have high reliability.

Although two batteries 303 are provided in the housing 307 in FIG. 53A, the number of batteries is not particularly limited as long as it is one or more. The battery 303 may be provided to overlap with the display portion 301.

As a material of the housing 307, one or more of a metal, a resin, a natural material, and the like can be used. As the metal, stainless steel, aluminum, a titanium alloy, or the like can be used. As the resin, an acrylic resin, a polyimide resin, or the like can be used. As the natural material, processed wood, stone, bone, leather, paper, or cloth can be used, for example.

FIG. 53B is a perspective view illustrating a portable information terminal 350 bent to have a ring shape, and FIG. 53C is a top view illustrating the stretched (extended) portable information terminal 350. FIGS. 53D and 53E are each a cross-sectional view along dashed dotted line Z1-Z2 in FIG. 53C.

The arm-worn (or watch-type) portable information terminal 350 includes the display portion 301, housings 302*a* and 302*b*, and the battery 303. The housing 302*b* and the battery 303 each have flexibility. Thus, the portable information terminal 350 can be easily curved to have a desired shape. Furthermore, the display portion 301 and the housing 302*a* may each have flexibility. One embodiment of the present invention can prevent the display portion 301 and the battery 303 from being broken by being excessively bent; thus, the portable information terminal 350 can have high reliability. The portable information terminal 350 may include an operation button 309 as illustrated in FIG. 53C.

The power storage device of one embodiment of the present invention is preferably used as the battery 303 as illustrated in FIG. 53D. The battery 303 includes the secondary battery 20 and the member 40 with rubber elasticity. The light-emitting device of one embodiment of the present invention is preferably used as the display portion 301. The display portion 301 includes the light-emitting panel 10 and the member 40 with rubber elasticity.

The portable information terminal 350 may further include a sensor 70 as illustrated in FIG. 53E. As the sensor 70, any of a variety of sensors such as the aforementioned sensor that senses biological information can be used. The sensor 70 may have flexibility. The sensor 70 can be provided either inside or outside the member 40 with rubber elasticity. FIG. 53E illustrates an example where one embodiment of the present invention is used for the battery 303 and the display portion 301, the housing 302*a*, and the sensor 70 do not have flexibility.

FIGS. 54A to 54D illustrate examples of an electronic device including a curved display portion 7000. The display surface of the display portion 7000 is curved, and images can be displayed on the curved display surface. The display portion 7000 may be flexible.

The electronic device described as an example in this embodiment includes at least one of the light-emitting device of one embodiment of the present invention and the power storage device of one embodiment of the present invention. For example, a light-emitting device with a light-emitting panel may be used as the display portion 7000. The light-emitting device may further include a secondary battery. Alternatively, a power storage device with a battery unit may be provided as a battery.

Figure 54A:
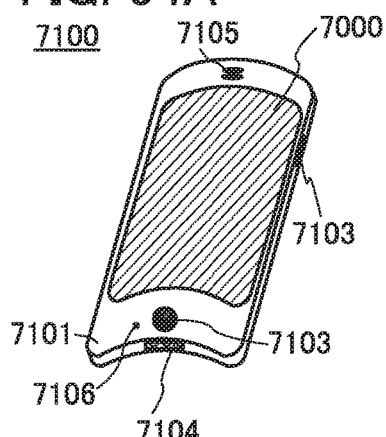
FIGS. 54A to 54H illustrate examples of electronic devices.

FIG. 54A illustrates an example of a mobile phone. A mobile phone 7100 includes the display portion 7000, a housing 7101, operation buttons 7103, an external connection port 7104, a speaker 7105, a microphone 7106, and the like.

The mobile phone 7100 includes a touch sensor in the display portion 7000. Operations such as making a call and inputting text can be performed by touch on the display portion 7000 with a finger, a stylus, or the like.

With the operation buttons 7103, power ON or OFF can be switched. In addition, the type of image displayed on the display portion 7000 can be switched; switching the type of image from a mail creation screen to a main menu screen, for example.

Figure 54B:
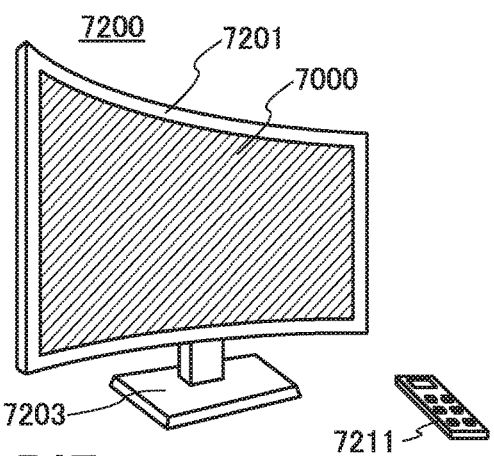

FIG. 54B illustrates an example of a television set. In the television set 7200, the display portion 7000 is incorporated into the housing 7201. Here, the housing 7201 is supported by a stand 7203.

The television set 7200 can be operated with an operation switch of the housing 7201 or a separate remote controller 7211. Furthermore, the display portion 7000 may include a touch sensor. The display portion 7000 can be operated by touching the display portion 7000 with a finger or the like. Furthermore, the remote controller 7211 may be provided with a display portion for displaying data output from the remote controller 7211. With operation keys or a touch panel of the remote controller 7211, channels and volume can be controlled and images displayed on the display portion 7000 can be controlled.

Note that the television set 7200 is provided with a receiver, a modem, and the like. A general television broadcast can be received with the receiver. Furthermore, when the television set is connected to a communication network with or without wires via the modem, one-way (from a transmitter to a receiver) or two-way (between a transmitter and a receiver or between receivers) data communication can be performed.

The television set 7200 is preferably capable of displaying an image with full high-definition image quality, 4K image quality, or 8K image quality, for example.

Figure 54C:
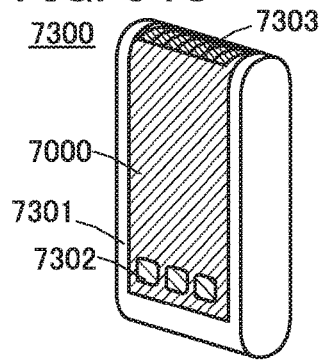
Figure 54E:
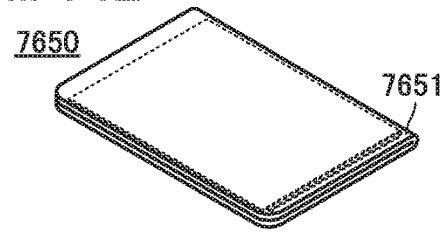
Figure 54D:
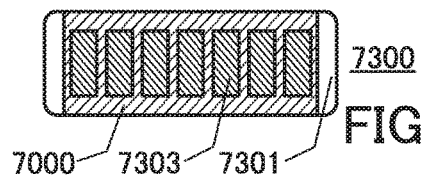

FIG. 54C is a perspective view of a portable information terminal 7300, and FIG. 54D is a top view of the portable information terminal 7300. The portable information terminal 7300 includes a housing 7301 and the display portion 7000. Furthermore, the portable information terminal 7300 may also include an operation button, an external connection port, a speaker, a microphone, an antenna, a battery, or the like. The display portion 7000 is provided with a touch sensor. The operation of the portable information terminal 7300 can be performed by touching the display portion 7000 with a finger, a stylus, or the like.

Each of the portable information terminals described as examples in this embodiment functions as, for example, one or more of a telephone set, a notebook, and an information browsing system. Specifically, each of the portable information terminals can be used as a smartphone. Each of the portable information terminals described as examples in this embodiment is capable of executing a variety of applications such as mobile phone calls, e-mailing, reading and editing text, music reproduction, Internet communication, and a computer game, for example.

The portable information terminal 7300 can display text and image information on its plurality of surfaces. For example, as illustrated in FIG. 54C, three operation buttons 7302 can be displayed on one surface, and information 7303 indicated by a rectangle can be displayed on another surface. FIGS. 54C and 54D illustrate an example in which information is displayed at the top of the portable information terminal.

Examples of the information include notification from a social networking service (SNS), display indicating reception of an e-mail or an incoming call, the title of an e-mail or the like, the sender of an e-mail or the like, the date, the time, remaining battery, and the reception strength of an antenna. Alternatively, the operation button, an icon, or the like may be displayed in place of the information.

For example, a user of the portable information terminal 7300 can see the display (here, the information 7303) with the portable information terminal 7300 put in a breast pocket of his/her clothes.

Specifically, a caller's phone number, name, or the like of an incoming call is displayed in a position that can be seen from above the portable information terminal 7300. Thus, the user can see the display without taking out the portable information terminal 7300 from the pocket and decide whether to answer the call.

FIGS. 54E to 54H each illustrate an example of a portable information terminal including a display portion 7001 having flexibility.

The portable information terminal described below includes at least one of the light-emitting device of one embodiment of the present invention and the power storage device of one embodiment of the present invention. For example, a light-emitting device with a light-emitting panel may be used as the display portion 7001. The light-emitting device may further include a secondary battery. Alternatively, a power storage device with a battery unit may be provided as a battery. For example, a light-emitting panel that can be bent with a curvature radius of larger than or equal to 0.01 mm and smaller than or equal to 150 mm, a secondary battery that can be bent with a curvature radius of larger than or equal to 1 mm and smaller than or equal to 150 mm, and the like can be used for the portable information terminal. The display portion 7001 may include a touch sensor so that the portable information terminal can be operated by touching the display portion 7001 with a finger or the like.

Figure 54F:
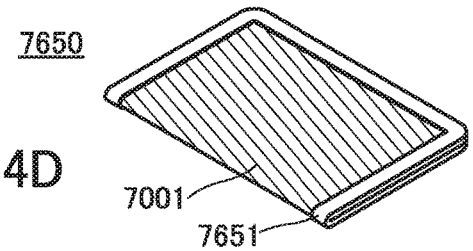

FIGS. 54E and 54F illustrate an example of a foldable portable information terminal. FIG. 54E illustrates a portable information terminal 7650 that is folded so that the display portion 7001 is on the inside. FIG. 54F illustrates the portable information terminal 7650 folded so that the display portion 7001 is on the outside. The portable information terminal 7650 includes the display portion 7001 and a non-display portion 7651. When the portable information terminal 7650 is not used, the portable information terminal 7650 is folded so that the display portion 7001 is on the inside, whereby the display portion 7001 can be prevented from being contaminated or damaged.

Figure 54G:
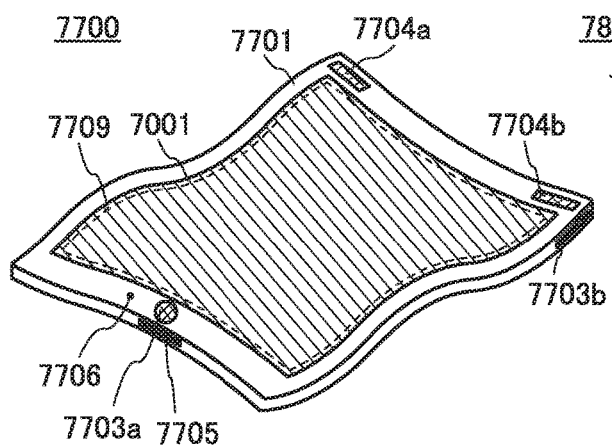

FIG. 54G illustrates an example of a flexible portable information terminal. A portable information terminal 7700 includes a housing 7701 and the display portion 7001. In addition, the portable information terminal 7700 may include buttons 7703*a* and 7703*b* which serve as input means, speakers 7704*a* and 7704*b* which serve as sound output means, an external connection port 7705, a microphone 7706, or the like. A flexible battery 7709 can be mounted on the portable information terminal 7700. The battery 7709 may be arranged to overlap with the display portion 7001, for example.

The housing 7701, the display portion 7001, and the battery 7709 are flexible. Thus, it is easy to curve the portable information terminal 7700 into a desired shape or to twist the portable information terminal 7700. For example, the portable information terminal 7700 can be curved so that the display portion 7001 is on the inside or in the outside. The portable information terminal 7700 can be used in a rolled state. Since the housing 7701 and the display portion 7001 can be changed in shape freely in this manner, the portable information terminal 7700 is less likely to be broken even when the portable information terminal 7700 falls down or external stress is applied to the portable information terminal 7700.

The portable information terminal 7700 can be used effectively in various situations because the portable information terminal 7700 is lightweight. For example, the portable information terminal 7700 can be used in the state where the upper portion of the housing 7701 is suspended by a clip or the like, or in the state where the housing 7701 is fixed to a wall by magnets or the like.

The light-emitting device of one embodiment of the present invention includes a light-emitting panel serving as the display portion 7001 and a secondary battery serving as the battery 7709. One embodiment of the present invention can prevent the display portion 7001 and the battery 7709 from being broken by being excessively bent; thus, the portable information terminal can have high reliability.

Figure 54H:
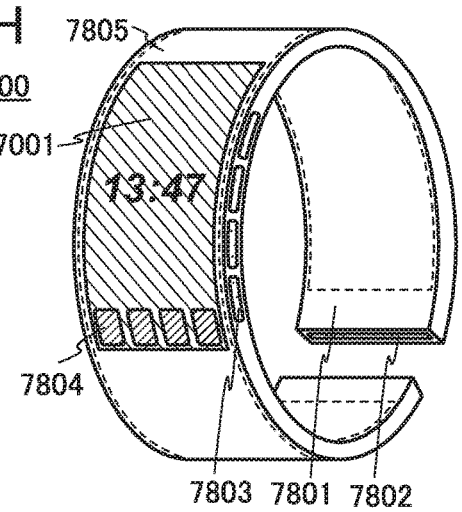

FIG. 54H illustrates an example of a watch-type portable information terminal. The portable information terminal 7800 includes a band 7801, a display portion 7001, an input-output terminal 7802, operation buttons 7803, and the like. The band 7801 has a function of a housing. In addition, a flexible battery 7805 can be mounted on the portable information terminal 7800. The battery 7805 may overlap with at least one of the display portion 7001 and the band 7801, for example.

The band 7801, the display portion 7001, and the battery 7805 have flexibility. Thus, the portable information terminal 7800 can be easily curved to have a desired shape. One embodiment of the present invention can prevent the display portion 7001 and the battery 7805 from being broken by being excessively bent; thus, the portable information terminal can have high reliability.

By touching an icon 7804 displayed on the display portion 7001 with a finger or the like, application can be started.

Alternatively, the portable information terminal 7800 may include the input-output terminal 7802. In the case where the input-output terminal 7802 is included, data can be directly transmitted to and received from another information terminal via a connector. Charging through the input-output terminal 7802 is also possible. Note that charging of the portable information terminal described as an example in this embodiment can be performed by non-contact power transmission without using the input-output terminal.

The electronic devices illustrated in FIGS. 55A, 55D, 55F, and 55G each include at least one of the light-emitting device of one embodiment of the present invention and the power storage device of one embodiment of the present invention. For example, a light-emitting device with a light-emitting panel may be used as the display portion 7000. The light-emitting device may further include a secondary battery. Alternatively, a power storage device with a battery unit may be provided as a battery.

Figure 55A:
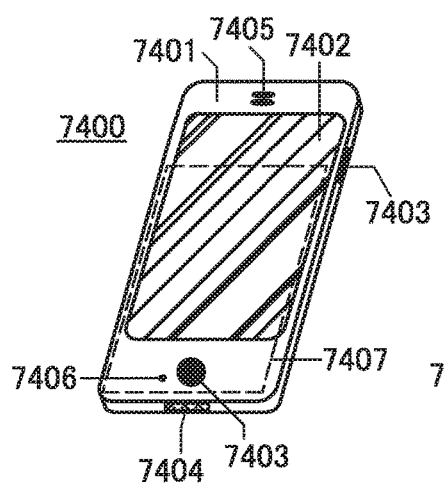
FIGS. 55A to 55G illustrate examples of electronic devices.

FIG. 55A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 55B:
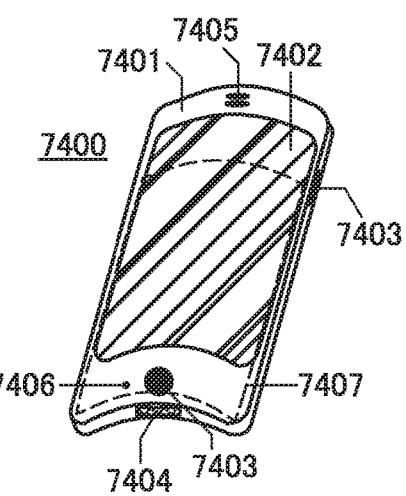
Figure 55C:
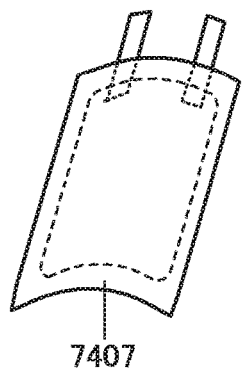
Figure 55D:
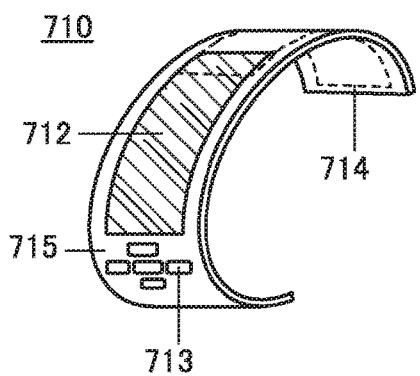
Figure 55E:
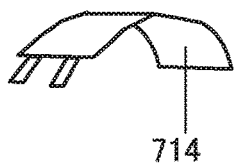

FIG. 55B illustrates the mobile phone 7400 in the state of being bent. When the whole mobile phone 7400 is bent by the external force, the power storage device 7407 included in the mobile phone 7400 is also bent. The power storage device 7407 is a thin storage battery. The power storage device 7407 is fixed in a state of being bent. FIG. 55C illustrates the power storage device 7407 in the state of being bent FIG. 55D illustrates an example of a bangle display device. A portable display device 710 includes a housing 715, a display portion 712, an operation button 713, and a power storage device 714. FIG. 55E illustrates the bent power storage device 714.

Figure 55F:
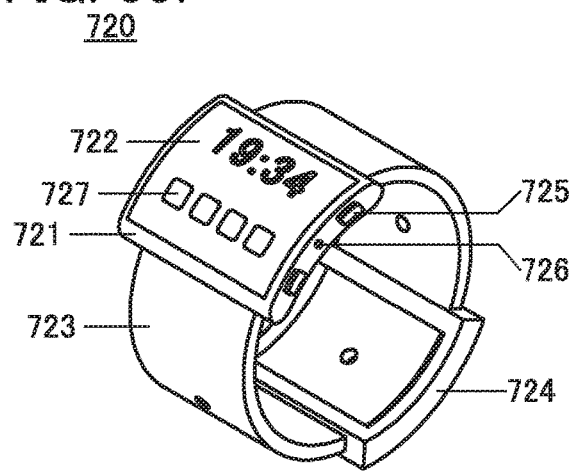

FIG. 55F illustrates an example of a watch-type portable information terminal. A portable information terminal 720 includes a housing 721, a display portion 722, a band 723, a buckle 724, an operation button 725, an input output terminal 726, and the like.

The display surface of the display portion 722 is curved, and images can be displayed on the curved display surface. In addition, the display portion 722 includes a touch sensor, and operation can be performed by touching the screen with a finger, a stylus, or the like. For example, by touching an icon 727 displayed on the display portion 722, application can be started.

Moreover, the portable information terminal 720 includes the input output terminal 726, and data can be directly transmitted to and received from another information terminal via a connector. In addition, charging via the input output terminal 726 is possible. Note that the charging operation may be performed by wireless power feeding without using the input output terminal 726.

The portable information terminal 720 is provided with a power storage device. For example, the power storage device 714 illustrated in FIG. 55E that is in the state of being curved can be provided in the housing 721. Alternatively, the power storage device 714 illustrated in FIG. 55E can be provided in the band 723 such that it can be curved.

Figure 55G:
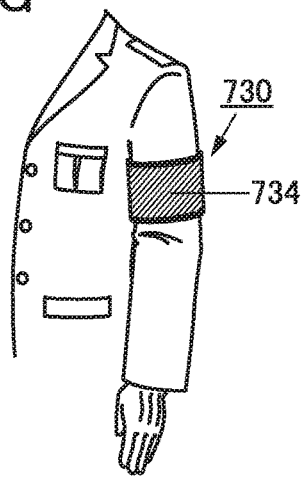

FIG. 55G illustrates an example of an armband display device. A display device 730 includes a display portion 734 and a power storage device. The display device 730 can include a touch sensor in the display portion 734 and can serve as a portable information terminal.

The display surface of the display portion 734 is bent, and images can be displayed on the bent display surface. A display state of the display device 730 can be changed by, for example, near field communication, which is a communication method based on an existing communication standard.

The display device 730 includes an input output terminal, and data can be directly transmitted to and received from another information terminal via a connector. In addition, charging via the input output terminal is possible. Note that the charging operation may be performed by wireless power feeding without using the input output terminal.

This embodiment can be combined with any of the other embodiments as appropriate.

This application is based on Japanese Patent Application serial no. 2015-038094 filed with Japan Patent Office on Feb. 27, 2015, the entire contents of which are hereby incorporated by reference.

What is claimed is:

1. A power storage device comprising:
   a battery unit comprising a positive electrode, a negative electrode, an electrolyte and an exterior body enclosing the positive electrode, the negative electrode and the electrolyte; and
   a first member with rubber elasticity,
   wherein the first member with rubber elasticity comprises a first projection and a second projection,
   wherein the first projection and the second projection are arranged on a first surface of the battery unit,
   wherein the first projection and the second projection come in contact with each other when the power storage device is bent such that the first surface of the battery unit faces inward, and
   wherein the first member with rubber elasticity has a smaller Young's modulus than the exterior body.

2. The power storage device according to claim 1,
   wherein the first surface and a second surface of the battery unit are opposite to each other, and
   wherein a second member with rubber elasticity is located on the second surface of the battery unit.

3. The power storage device according to claim 2,
   wherein the second member with rubber elasticity comprises a third projection and a fourth projection arranged on the second surface of the battery unit, and
   wherein the third projection and the fourth projection come in contact with each other when the power storage device is bent such that the second surface of the battery unit faces inward.

4. The power storage device according to claim 2,
   wherein the first member with rubber elasticity and the second member with rubber elasticity are separated from each other.

5. The power storage device according to claim 2,
wherein the first member with rubber elasticity and the second member with rubber elasticity are part of a third member with rubber elasticity.

6. The power storage device according to claim 5,
wherein the battery unit is enclosed within the third member with rubber elasticity.

7. The power storage device according to claim 1,
wherein the power storage device can be reversibly changed in shape from a first state where the first projection and the second projection are not in contact with each other to a second state where the first projection and the second projection are in contact with each other.

8. The power storage device according to claim 1, further comprising:
a power-receiving resonance coil;
a power-receiving coil;
a rectifier circuit; and
a DC-DC converter,
wherein in the power-receiving resonance coil, a high-frequency voltage is induced by magnetic field resonance,
wherein in the power-receiving coil, a high-frequency voltage is induced by electromagnetic induction with the power-receiving resonance coil,
wherein the rectifier circuit rectifies the high-frequency voltage induced in the power-receiving coil, and
wherein a DC voltage output from the rectifier circuit is input to the DC-DC converter.

9. The power storage device according to claim 8,
wherein the DC-DC converter includes an input power determination portion and a voltage conversion portion,
wherein a first DC voltage is input to the input power determination portion,
wherein the voltage conversion portion converts the first DC voltage into a second DC voltage and outputs the second DC voltage,
wherein the input power determination portion includes a load, first means, and second means,
wherein the first means determines a first voltage proportional to the first DC voltage,
wherein the second means determines a second voltage proportional to a current generated in the load,
wherein the voltage conversion portion includes a switch and third means,
wherein the switch controls the current generated in the load by being turned on and off, and
wherein the third means keeps a ratio of the first voltage to the second voltage constant by controlling the switch in accordance with the first voltage and the second voltage.

10. A power storage device comprising:
a battery unit comprising a positive electrode, a negative electrode, an electrolyte and an exterior body enclosing the positive electrode, the negative electrode and the electrolyte; and
a first member with rubber elasticity,
wherein the first member with rubber elasticity comprises a first projection and a second projection,
wherein the first projection and the second projection are arranged on a first surface of the battery unit,
wherein a cross-sectional shape of the first projection is in contact with three sides of a first isosceles triangle and is included in the first isosceles triangle,
wherein a cross-sectional shape of the second projection is in contact with three sides of a second isosceles triangle and is included in the second isosceles triangle,
wherein the first isosceles triangle and the second isosceles triangle have a same shape, have bases on a same line, and are in contact with each other at one point,
wherein a curvature radius of the first surface of the battery unit is a sum of a shortest distance from the first surface to a bottom surface of the first projection and a length of an equilateral side of the first isosceles triangle when the power storage device is bent such that the first surface of the battery unit faces inward,
wherein a first side of the first projection is located on a first equilateral side of the first isosceles triangle,
wherein a second side of the second projection is located on a second equilateral side of the second isosceles triangle,
wherein the first equilateral side and the second equilateral side are in contact with each other at one point, and
wherein the first member with rubber elasticity has a smaller Young's modulus than the exterior body.

11. The power storage device according to claim 10,
wherein a second member with rubber elasticity is located on a second surface of the battery unit, and
wherein the first surface and the second surface of the battery unit are opposite to each other.

12. The power storage device according to claim 11,
wherein the second member with rubber elasticity comprises a third projection and a fourth projection arranged on the second surface of the battery unit,
wherein a cross-sectional shape of the third projection is in contact with three sides of a third isosceles triangle and is included in the third isosceles triangle,
wherein a cross-sectional shape of the fourth projection is in contact with three sides of a fourth isosceles triangle and is included in the fourth isosceles triangle,
wherein the third isosceles triangle and the fourth isosceles triangle have a same shape, have bases on a same line, and are in contact with each other at one point,
wherein a curvature radius of the second surface of the battery unit is a sum of a shortest distance from the second surface to a bottom surface of the third projection and a length of an equilateral side of the third isosceles triangle when the power storage device is bent such that the second surface of the battery unit faces inward,
wherein a third side of the third projection is located on a third equilateral side of the third isosceles triangle,
wherein a fourth side of the fourth projection is located on a fourth equilateral side of the fourth isosceles triangle, and
wherein the third equilateral side and the fourth equilateral side are in contact with each other at one point.

13. The power storage device according to claim 11,
wherein the first member with rubber elasticity and the second member with rubber elasticity are separated from each other.

14. The power storage device according to claim 11,
wherein the first member with rubber elasticity and the second member with rubber elasticity are part of a third member with rubber elasticity.

15. The power storage device according to claim 14,
wherein the battery unit is contained in the third member with rubber elasticity.

16. The power storage device according to claim 10,
wherein the power storage device can be reversibly changed in shape from a first state where the first projection and the second projection are not in contact with each other to a second state where the first projection and the second projection are in contact with each other.

17. The power storage device according to claim 10, further comprising:

a power-receiving resonance coil;

a power-receiving coil;

a rectifier circuit; and a DC-DC converter, wherein in the power-receiving resonance coil, a high-frequency voltage is induced by magnetic field resonance, wherein in the power-receiving coil, a high-frequency voltage is induced by electromagnetic induction with the power-receiving resonance coil, wherein the rectifier circuit rectifies the high-frequency voltage induced in the power-receiving coil, and wherein a DC voltage output from the rectifier circuit is input to the DC-DC converter.

18. The power storage device according to claim 17, wherein the DC-DC converter includes an input power determination portion and a voltage conversion portion, wherein a first DC voltage is input to the input power determination portion, wherein the voltage conversion portion converts the first DC voltage into a second DC voltage and outputs the second DC voltage, wherein the input power determination portion includes a load, first means, and second means, wherein the first means determines a first voltage proportional to the first DC voltage, wherein the second means determines a second voltage proportional to a current generated in the load, wherein the voltage conversion portion includes a switch and third means, wherein the switch controls the current generated in the load by being turned on and off, and wherein the third means keeps a ratio of the first voltage to the second voltage constant by controlling the switch in accordance with the first voltage and the second voltage.

* * * * *